United States Patent
Funakoshi et al.

(10) Patent No.: US 7,176,472 B2
(45) Date of Patent: Feb. 13, 2007

(54) RADIOACTIVE SUBSTANCE CONTAINER, MANUFACTURING APPARATUS THEREOF AND MANUFACTURING METHOD THEREOF

(75) Inventors: Yoshihiko Funakoshi, Fukuoka (JP);
Takeshi Tsunezumi, Fukuoka (JP);
Naohiro Mizuno, Fukuoka (JP);
Katsuhiko Tokuno, Fukuoka (JP);
Chikayuki Matsumoto, Fukuoka (JP);
Yoshiharu Taura, Hiroshima (JP);
Shigenori Shirogane, Hiroshima (JP);
Katsunari Ohsono, Hyogo (JP);
Toshihiro Matsuoka, Hyogo (JP)

(73) Assignee: Mitsubishi Heavy Industries Ltd., Tokyo (JP)

( * ) Notice: Subject to any disclaimer, the term of this patent is extended or adjusted under 35 U.S.C. 154(b) by 0 days.

(21) Appl. No.: 11/010,351

(22) Filed: Dec. 14, 2004

(65) Prior Publication Data
US 2005/0087704 A1    Apr. 28, 2005

Related U.S. Application Data

(62) Division of application No. 09/926,811, filed on Jul. 1, 2002.

(51) Int. Cl.
*G21K 5/00* (2006.01)
(52) U.S. Cl. .............................. 250/506.1; 250/518.1; 376/272
(58) Field of Classification Search ............. 250/505.1, 250/506.1, 518.1
See application file for complete search history.

(56) References Cited

U.S. PATENT DOCUMENTS

| 4,272,683 A | * | 6/1981 | Baatz et al. ............. 250/506.1 |
| 4,447,733 A | * | 5/1984 | Baatz et al. ............. 250/506.1 |
| 4,579,274 A | | 4/1986 | Anspach et al. |
| 5,567,952 A | * | 10/1996 | Kirchner et al. ......... 250/506.1 |
| 6,325,194 B1 | | 12/2001 | Thomire |
| 6,625,247 B1 | * | 9/2003 | Ohsono et al. ............. 376/272 |

FOREIGN PATENT DOCUMENTS

| DE | 19882537 | 5/2000 |
| JP | 51-046670 | 4/1976 |
| JP | 54-127859 | 10/1979 |
| JP | 006135/1990 | 1/1990 |
| JP | 03-106532 | 5/1991 |
| JP | 2000-9897 | 1/2000 |
| JP | 2001-0832810 | 3/2001 |
| WO | WO 99/66226 | 12/1999 |

* cited by examiner

*Primary Examiner*—David A. Vanore
(74) *Attorney, Agent, or Firm*—Oblon, Spivak, McClelland, Maier & Neustadt, P.C.

(57) ABSTRACT

In the metal billet to be used for hot dilation forming, a forward side with respect to the pressing direction has a quadrate section and its diagonal length is not more than an inner diameter of a container. Moreover, a backward side with respect to the pressing direction has a circular section and its diameter is substantially same as the inner diameter of the container. The metal billet is heated to a temperature suitable for press working and is set into a container for press forming. While a center of a workpiece of the metal billet is being bored by a boring punch to be operated by a pressing machine, the metal billet is hot-dilated so that a bottomed container for a cask is formed.

10 Claims, 31 Drawing Sheets

FIG.1
(a)
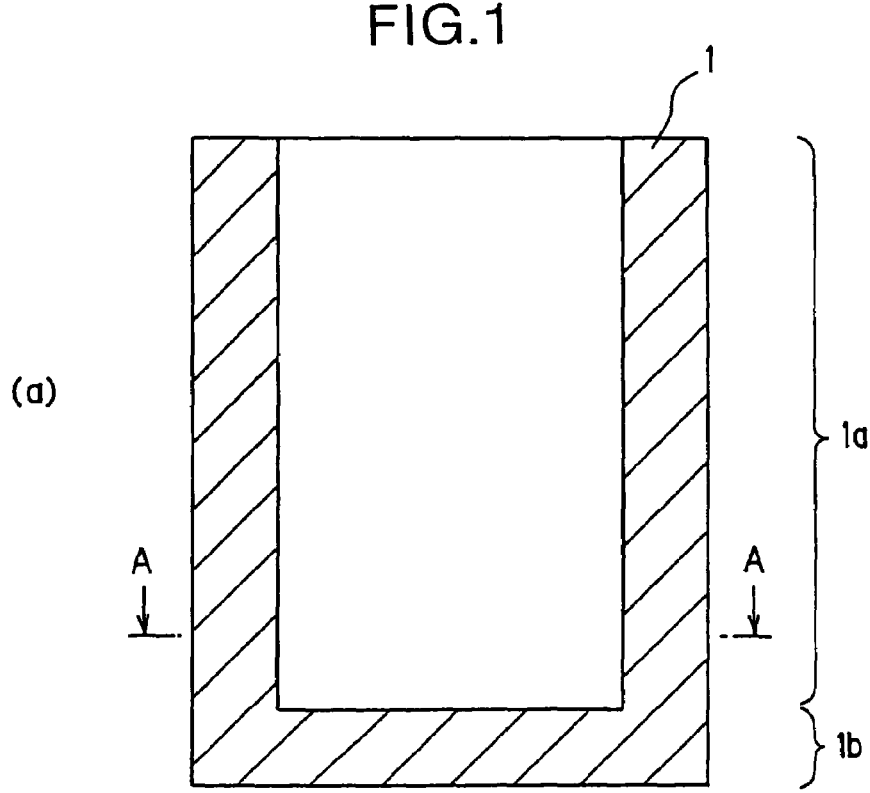
(b)
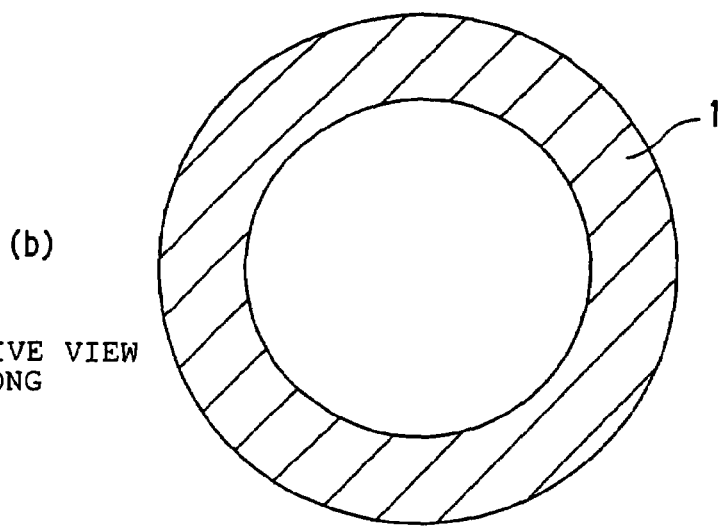
PERSPECTIVE VIEW
TAKEN ALONG
LINE A-A

FIG.3
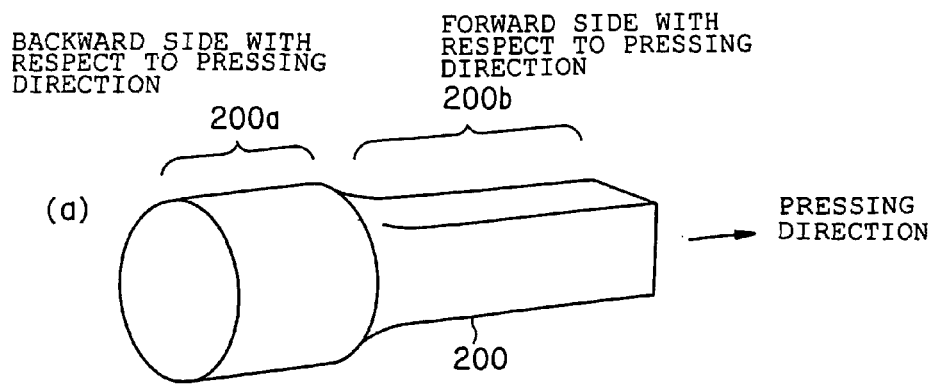
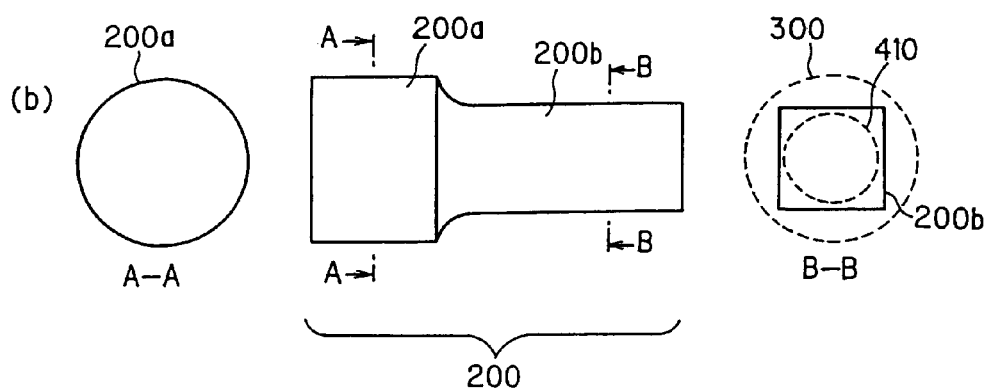
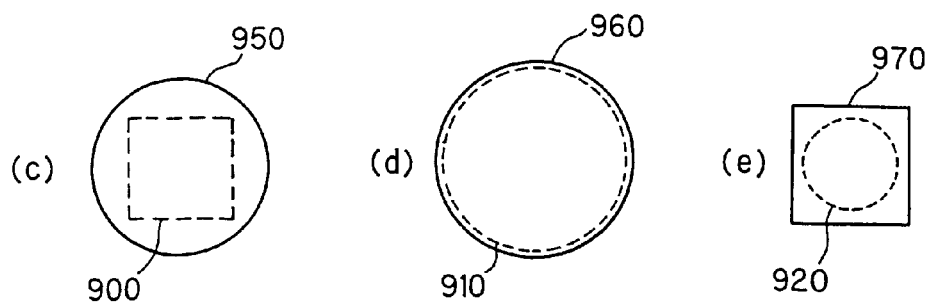

FIG.6
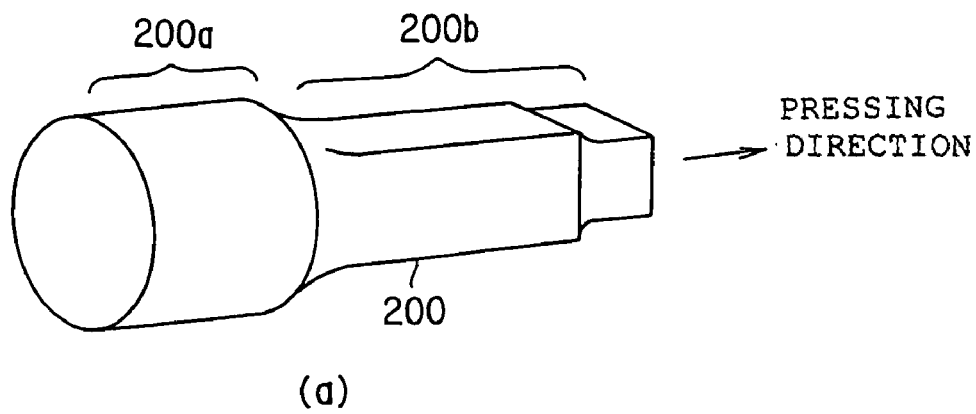
(a)
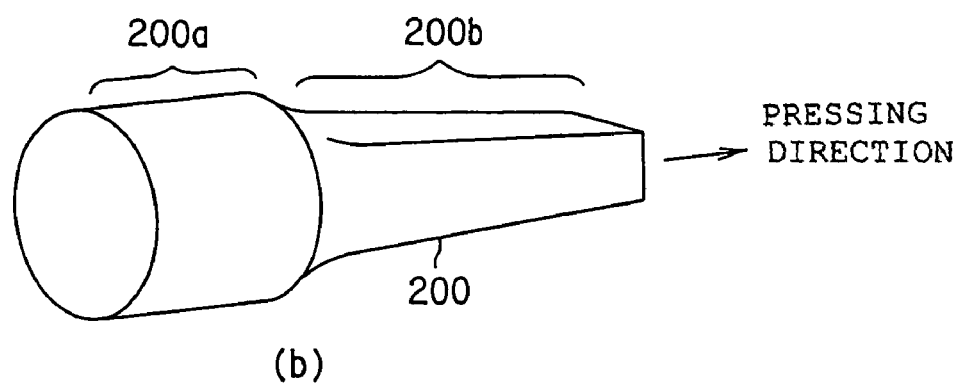
(b)
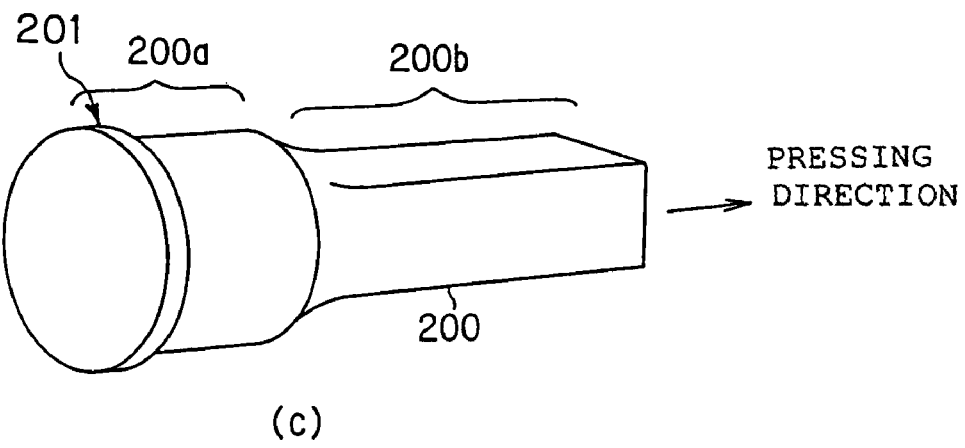
(c)

FIG. 14
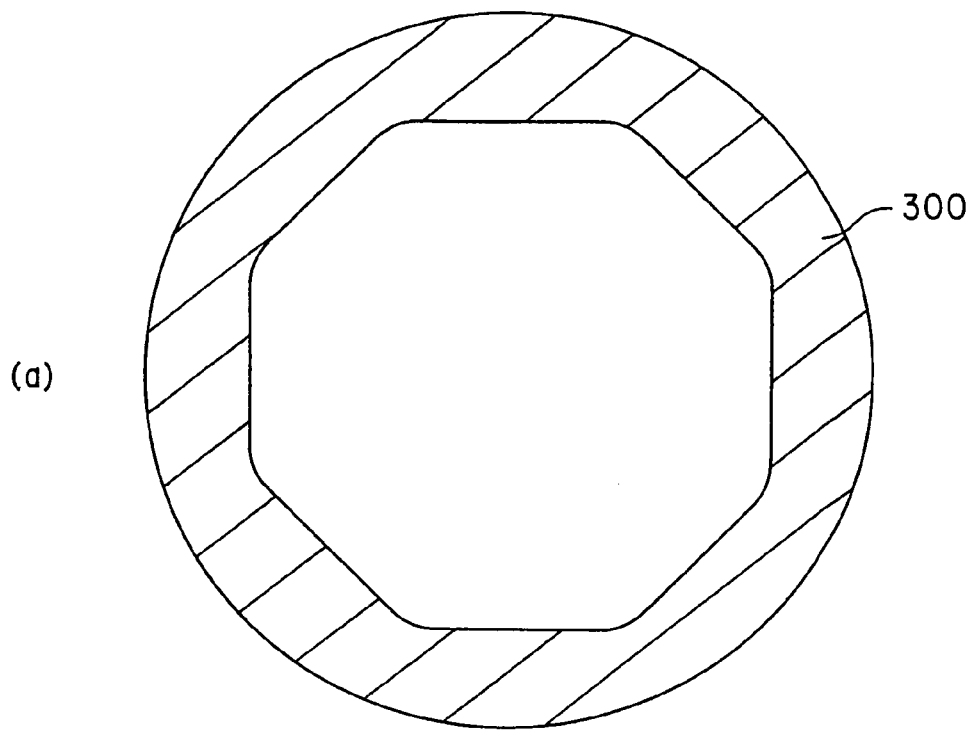
(a)
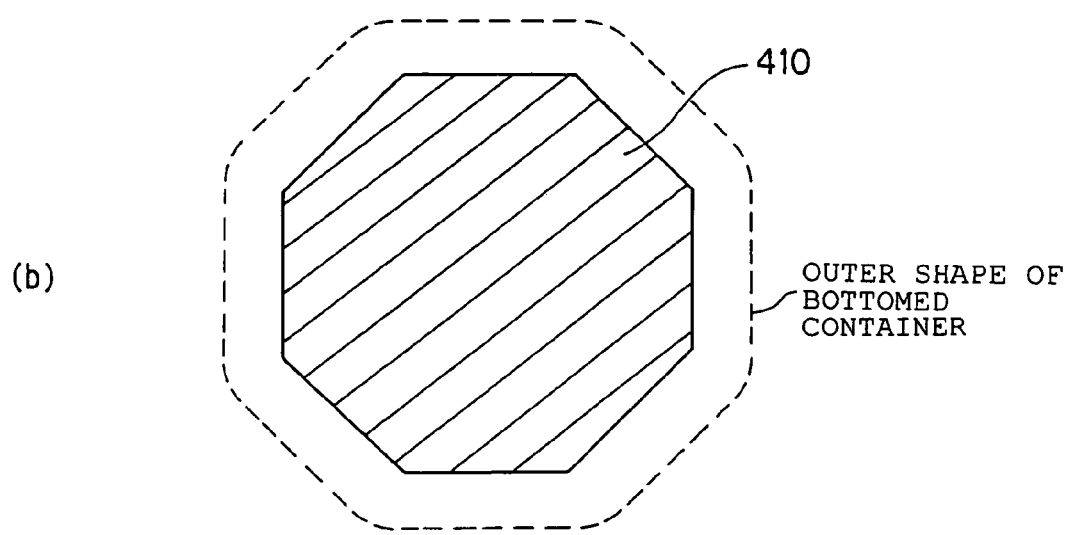
(b)
OUTER SHAPE OF BOTTOMED CONTAINER

FIG.20
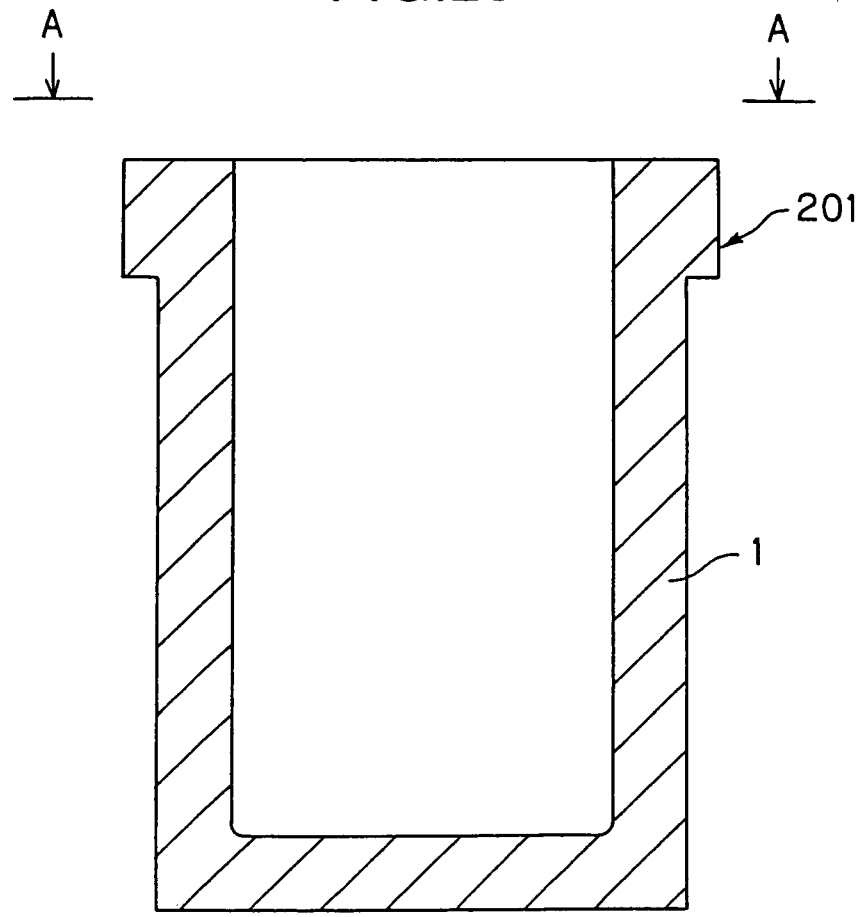
(a)
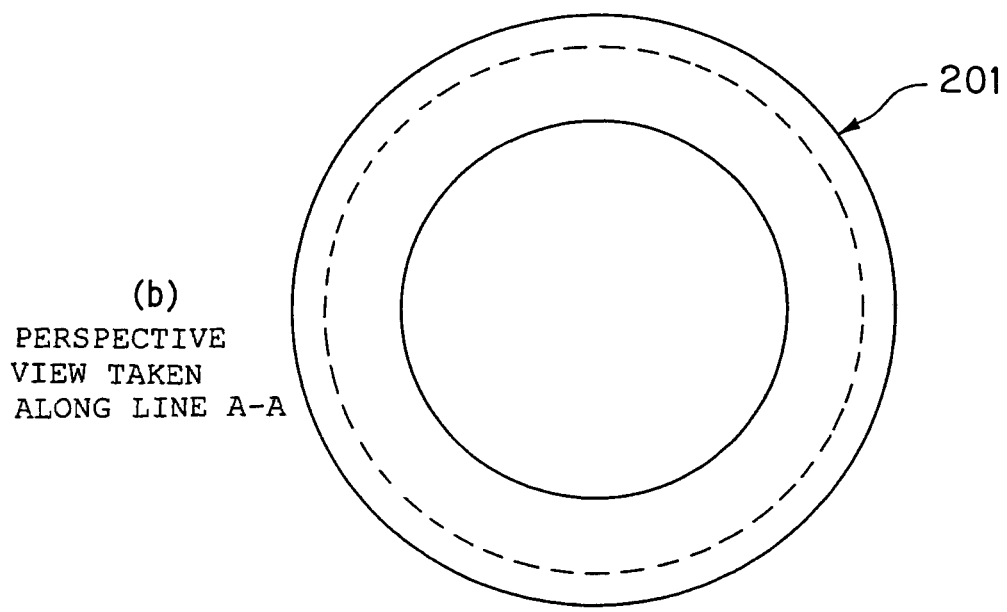
(b) PERSPECTIVE VIEW TAKEN ALONG LINE A-A

RADIOACTIVE SUBSTANCE CONTAINER, MANUFACTURING APPARATUS THEREOF AND MANUFACTURING METHOD THEREOF

CROSS-REFERENCE TO RELATED APPLICATIONS

This application is a Divisional of application Ser. No. 09/926,811, filed Jul. 1, 2002, currently pending, the contents of which are herein incorporated by reference in their entirety.

TECHNICAL FIELD

The present invention relates to a container having thick walls ("thick container") such as a cask for housing, transporting and storing used nuclear fuel aggregate and substance contaminated by radioactivity, for example. Particularly this invention relates to a thick container in which a body section and a bottom section are formed integrally, or a thick drum which can be used as a cylinder of a large size pressing machine, or a canister for storing substance contaminated by radioactivity. The invention relates to a container or a drum which requires less troublesome steps for manufacturing and has an excellent end surface form, a manufacturing apparatus thereof and a manufacturing method thereof.

BACKGROUND ART

As a cylinder or the like to be used in a cask or a large size pressing machine for containing and transferring and temporarily storing used nuclear fuel generated from a nuclear reactor, a container in which height, diameter and the like of its drum reach several meters is used. Containers having a wall that is several dozens centimeter in thickness have been suggested from a viewpoint of shielding from γ rays or high pressure resistance. A cask for containing and transporting and temporarily storing used nuclear fuel will be exemplified and there will be explained below a conventional container which has been used for these applications.

FIG. 29 is a sectional view showing one example of the conventional cask. The cask 500 is composed of a container 501 which is formed with a body section 501a and a bottom section 501b made of stainless or carbon steel, a basket 502 for used containing nuclear fuel aggregate which is arranged in the container 501, and a neutron shielding body 503 provided on an outer periphery of the container 501. The neutron shielding body 503 is charged into a space between an outer drum 504 and the container 501, and a plurality of heat transfer fins (not shown) are provided between the container 501 and the outer drum 504. As the basket 502, a material to which boron having neutron absorbing ability is added is used.

The bottom plate 501b made of stainless or carbon steel is welded with tungsten-inert gas (TIG welding) or welded with submerged-arc (SAW welding) to the container 501. A neutron shielding material 506 is sealed into the bottom plate 501b. Moreover, a primary cover 507 and a secondary cover 508 are attached to an upper section of the container 501 by bolts. A neutron shielding material 509 is sealed into the secondary cover 508.

γ rays generated from used nuclear fuel aggregate are shielded by the body section 501, the bottom plate 501b, the primary cover 507 and the secondary cover 508. Moreover, neutron is shielded by the neutron shielding material 503 provided on the outer periphery of the container 501, the bottom plate 501b, the neutron shielding material 506 sealed into the secondary cover 508, and the secondary cover 508. A degradation heat of the used fuel aggregate is transmitted from the container 501 via the heat transfer fins to the outer drum 504 and is radiated to the outside therefrom.

Next, how a container having a bottom ("bottomed container") for the cask shown in FIG. 29 is manufactured will be explained below. FIGS. 30(a) through 30(e) are explanatory diagrams showing one example of the method of manufacturing the bottomed container of the cask shown in FIG. 29. As shown in FIG. 30(a), a metal billet 61 which is cogged into a predetermined dimension is upset onto an anvil with bore and is bored by a punch 63. As shown in FIGS. 30(b) and 30(c), a mandrel 65 is inserted through a hole 64 of the metal billet 61 and while it is being rotated, the hole 64 is widened by a hammer 66. As shown in FIG. 30(d), the mandrel 65 is replaced by a large-diameter mandrel 67 and hollow cogging is carried out by a hammer 68. As a result, the metal billet 61 is thinned so that a cylindrical body is formed (FIG. 30(e)).

FIGS. 31(a), 31(a'), 31(b) and 31(b') are explanatory diagrams showing the method of manufacturing the bottomed container according to an Erhardt boring method. This method is for pushing a punch 410 into a metal billet 200 put into a container so as to form the metal billet 200 into a cylindrical shape. This metal billet 200 has a rectangular section, and its diagonal length is equal with an inner diameter of a body section 300 of the container. Moreover, since the section of the metal billet 200 is rectangular, spaces 350 exist between the metal billet 200 and the container 200 (FIG. 31(a')). When the metal billet 200 is upset into the body section 300 of the container and the punch 410 is pushed into a center axis of the metal billet 200, metal flow occurs due to metal swelling function of the punch 410. While this metal flow is filling the spaces 350 and a part of the metal flow is rising in the body section 300 of the container, and the metal billet 200 is formed into the cylindrical form (FIG. 31(b)).

In addition, the bottomed container of the cask can be manufactured also by a backward extrusion pressing method (not shown). In the backward extrusion pressing method, after the metal billet having a circular section substantially equal with the inner diameter of the container is upset into the container, metal flow is generated between the punch and the container by a compressive force of the punch pressurizing along the center axis of the metal billet. While the metal is being raised to a backward direction, the metal billet is formed into a long cylindrical form.

After the cylindrical body section 501a is formed by one of the above-mentioned methods, the bottom plate 501b is welded to its lower section. Further, in order to remove a thermal stress due to the welding, the container 501 is subject to heating treatment.

However, in order to obtain the bottomed container of the conventional cask 500, since the bottom plate 501b is jointed to the cylindrical body section 501a by welding, the container should be subject to the heating treatment after the welding. For this reason, there arose a problem that the manufacturing requires troublesome steps. Moreover in the Erhardt boring method, as shown in FIG. 31, a drop of a temperature in a metal forward end portion rising in the spaces 350 causes scratches and wave-shaped defects. Further, as shown in the diagrams, since a faulty form portion (FIG. 31(b)) is inevitably generated in the cylindrical end section, this portion should be eliminated by a constant amount, and thus yield is greatly lowered.

In addition, in the backward extrusion pressing method, the metal billet is formed while high friction is generated between the container and metal billet. For this reason, a lot of defects such as pockmarks and ribs are generated on an outer surface of the metal billet, and it takes a long time to remove these defects.

Further, in both the Erhardt boring method and the backward extrusion pressing method, when a dimension and a thickness of the container to be formed become large, a pressure which is required for pressing becomes extremely large. Therefore, in these methods, it was difficult to manufacture a container having large dimension and thickness. Therefore, the present invention is devised in order to solve the above-mentioned problems, and its object is to provide a container which requires less troublesome manufacturing steps or a container in which defects generated on its cylindrical end portion and its surface can be suppressed.

DISCLOSURE OF THE INVENTION

The radioactive substance container according to this invention comprises a thick bottomed container in which a bottom section and a body section are formed integrally by hot-dilating a metal billet in a container for forming.

The radioactive substance container according to the next invention comprises a thick bottomed container in which when a metal billet is hot-dilated in a container for forming and its body section is worked, a boring uncompleted section remains on one end side of the body section so as to be a bottom section and the bottom section and the body section are formed integrally.

As the above-mentioned radioactive substance container, a bottomed container in which the bottom section and the body section are formed integrally is used so that the conventional welding of a bottom plate is not required, and heating treatment of the welding can be omitted. Moreover, since the bottomed container is formed by the hot dilation, only a press pressure, which is lower than that at the time of hot backward extrusion forming, for example, is required. Here, at the time of the hot press working and the upsetting drawing, punching and drawing which are normally known can be combined, and they are not limited to detailed working methods described below. Moreover, the radioactive substance container according to the present invention can store not only used nuclear fuel but also substances and the like contaminated by radioactive rays.

The bottomed container provided to the radioactive substance container includes a so-called thick container in which a thickness is thick with respect to its radius like a container to be used for a cask for transporting and storing used nuclear fuel. Here, the thick container is such that a ratio of a difference between an outer radius $R_o$ and an inner radius $R_i$, namely, a thickness $t=R_o-R_i$ to an average radius $R=(Ro-R_i)/2$ is $(t/R)>1/10$. When the section of the container is not circular, an equivalent diameter $d_e=s/\pi$ may be used for calculating the outer radius $R_O$, the inner radius $R_i$ and the average radius. Here, s is a peripheral length of the section, and when a length of one side is a, $s=4\times a$ in the case of quadrate section.

In addition, the bottomed container of the invention is suitable for a container in which a ratio $(L/D_i)$ of an axial length L to an inner diameter $D_i$ is not less than 1 like a cask for storing used nuclear fuel in which an axial length reaches a several meters. Moreover, the present invention may be applied to a canister as a radioactive substance container.

When $(L/D_i)$ is less than 1, a certain effect is produced, but as (L/D1) becomes larger than 1, the effect according to this invention is produced more remarkably.

The radioactive substance container according to the next invention is the radioactive substance container described above in which a section of the metal billet vertical to an axial direction is polygonal and a shape in a section of the container for forming vertical to an axial direction is circular.

As this radioactive substance container, a bottomed container in which the bottom section and the body section are formed integrally is used so that the conventional welding of a bottom plate is not required. Moreover, as for the bottomed container is hot-dilated by setting the metal billet having a polygonal section vertical to the axial direction into the container for forming having a circular internal shape of the section vertical to the axial direction. At this forming step, since the container is dilated to be formed by a function which bends each side of the polygon, the bottomed container in which the bottom section and the body section are integral can be formed with a lower pressure than conventional one.

The radioactive substance container according to the next invention is the radioactive substance container described above in which a section of the metal billet vertical to an axial direction is polygonal and a section of the container for forming vertical to an axial direction is polygonal.

As this radioactive substance container, a bottomed container in which the bottom section and the body section are formed integrally is used so that the conventional welding of a bottom plate is not required. Moreover, the bottomed container is hot-dilated by setting the metal billet having a polygonal section vertical to the axial direction into the container for forming having a polygonal internal shape of the section vertical to the axial direction. At this forming step, since the container is dilated to be formed by a function which bends each side of the polygon, the bottomed container in which the bottom section and the body section are integral can be formed with a lower pressure than conventional one. Moreover, an internal shape of the container for forming is changed so that bottomed containers having external forms according to various radioactive substance containers can be formed easily.

The radioactive substance container according to the next invention comprises a bottomed container for storing a basket for used nuclear fuel aggregate in which a bottom section and a body section is integral by hot dilation forming in a container for forming. Here, the basket is constituted by collecting angular pipes, for example, its section vertical to the axial direction has like an internal shape of a section of the bottomed container shown in FIG. 15(d). Moreover, its outer diameter reaches about 2 to 2.5 m.

As this radioactive substance container, the thick bottomed container for containing used nuclear fuel aggregate, in which a dimension in the axial direction reaches a several meters and inner diameter reaches 2 to 2.5 meters, is used so that the conventional welding of a bottom plate is not required and the heat treatment after the welding can be omitted. Particularly in the bottomed container whose thickness is thick and dimension in the axial direction is a several meters and inner diameter reaches 2 to 2.5 meters, the effect which can omit the steps is extremely great.

In this container having such a size, the bottomed container of the present invention can be manufactured about one month earlier than a conventional container in which a bottom plate is welded. This difference depends upon time required for the welding itself and time required for the post-welding heat treatment and cooling. Since the bottomed container according to this invention does not require theses processes, the manufacturing time can be greatly shortened.

The radioactive substance container according to the next invention is the radioactive substance container described above in which a boring punch used for hot dilation forming has a dimension and a shape which approach to the section of the basket for used nuclear fuel aggregate.

Since this radioactive substance container has a dimension such that the section of the boring punch is approximate to the section of the basket for used nuclear fuel aggregate, an operation for cutting the inside of the container becomes easy after the hot dilation forming, and the manufacturing does not require the troublesome steps. Here, "dimension such that the section of the boring punch is approximate to the section of the basket for used nuclear fuel aggregate" means a relationship that the dimension of the section of the boring punch is substantially equal with a difference between the dimension of the basket for used nuclear fuel aggregate and a cutting allowance of the inner side of the bottomed container to be formed. As the boring punch of the present invention, a boring punch 27c or 27d shown in FIGS. 27(c) and 27(d), for example, can be used. Moreover, the sectional shape of the basket is like the internal shape of the section of the bottomed container shown in FIGS. 15(c) and 15(d), for example, the sectional shape of the boring punch of the invention can be approximate to the these shapes. Further, it is considered that when the sectional shape of the basket for used nuclear fuel aggregate is the internal shape of the section of the bottomed container shown in FIG. 15(d), for example, the inner side of the bottomed container having the inner shape of the section shown in FIG. 15(c) is cut so as to be formed into the internal shape of the section shown in FIG. 15(d). In this case, the section of the boring punch where the internal shape of the section shown in FIG. 15(c) is formed has a dimension that it is approximate to the section of the basket.

The radioactive substance container according to the next invention comprises a bottomed container, in which a dosage equivalent factor of γ rays on an outer wall surface of a substantially center portion of a side surface of the body is not more than 200 μSv/h in the case where radioactive substance is contained in a bottomed container in which its bottom section and body section are formed integrally by hot dilation forming in a container for forming.

Since the bottomed container to be used as this radioactive substance container transports and stores used nuclear fuel, it requires the function for shielding the γ rays radiated from the used nuclear fuel. It is desirable that the dosage equivalent factor of the γ rays on the outer wall surface of the substantially center portion of the sides surface of the radioactive substance container is smaller, not more than 2000 μSv/h confirms to the standard of transportation and storing based on "The rules relating to transportation of nuclear fuel substance and the like outside factory and business establishment (dated on Dec. 28, 1978, Prime Minister's Office Statute No. 57) (Final Amendment dated Nov. 28, 1990, Prime Minister's Office Statute No. 56)", "The notice for defining details relating the technical standards relating to transportation of nuclear fuel substance and the like outside factory and business establishment (dated Dec. 28, 1978 Science and Technology Agency Notice No. 11) (Final Amendment dated Nov. 28, 1990, Science and Technology Agency Notice No. 5)" and "The technical study relating to storing of used fuel in a dry type cask (July, 1992, Agency of Natural Resources and Energy)". The bottomed container to be used as the radioactive substance container of the present invention takes the safety into consideration, and the bottomed container is formed into a thick container made of stainless steel or carbon steel where the thickness reaches several dozens cm so that the dosage equivalent factor can be lowered to about 1/10 of this value.

In this radioactive substance container, since the body section and the bottom section of the thick container are formed integrally, the conventional welding of a bottom plate is not required, and the heat treatment after the welding can be omitted. Particularly in such a thick bottomed container, the effect which can omit the above-mentioned steps is extremely great.

The radioactive substance container according to the next invention is the radioactive substance container described above in which an outer diameter of the bottomed container is not less than 1000 mm to not more than 3000 mm and its thickness is not less than 150 mm to not more than 300 mm.

As this radioactive substance container, a bottomed container in which the bottom section and the body section are formed integrally is used so that the conventional welding of a bottom plate is not required, and the heat treatment after the welding can be omitted. Particularly in such a thick bottomed container, the effect which can omit the above-mentioned steps is extremely great.

The radioactive substance container comprises a bottomed container where a metal billet, in which at least a section vertical to an axial direction on a forward side with respect to the pressing direction ("pressing forward side") is formed into a polygonal shape, is set into a container for forming and a boring punch is pushed into the metal billet and the metal billet is hot-dilated so that a bottom section and a body section are formed integrally.

This radioactive substance container has the bottomed container where the body section and the bottom section are formed integrally. When such a bottomed container is used, the conventional welding of a bottom plate is not required, and the heat treatment after the welding can be omitted. Moreover, since this bottomed container can be formed with lower press pressure than the conventional one and the movement of the metal to the axial direction of the container is minimum, defects generated on an end portion and a container surface is less. For this reason, the adjustment of these defects requires less troublesome steps.

The bottomed container of the radioactive substance container is suitable for a container in which a ratio ($L/D_i$) of an axial length L to an inner diameter Di is not less than 1 like a cask for storing used nuclear fuel in which an axial length reaches a several meters. When such a thick bottomed container which is long with respect to the axial direction is tried to be formed by the conventional hot working method, the press pressure of several dozen-thousand ton is required, and a lot of defects occur on the end portion or the surface of the formed bottomed container. Therefore, such a thick container was conventionally manufactured by welding the bottom to a thick cylinder which was manufactured by the roll forging method or the like.

On the contrary, the bottomed container according to this invention can be manufactured by one-time working as a thick bottomed container which is long with respect to the axial direction and can store used nuclear fuel aggregate. Moreover, since the press pressure is about ten-thousand tons, an existing large pressing machine can be used. Moreover, since defects do not occur on the end portion or the surface of the container, adjustment after the forming is seldom required.

In addition, in the case where the container does not have such a large dimension, even if the thick container in which (t/R) exceeds 1/10 is formed by the hot press forming, high press pressure is not required. However, a lot of defects occur on the end portion or the surface of the formed bottomed container. For this reason, it is difficult to form such a container according to hot press forming, but this thick bottomed container in which (t/R) exceeds 1/10 can be formed by one-time working, and defects seldom occur on the end portion or the surface.

The radioactive substance container according to the next invention comprises: a bottomed container where a bottom section and a body section are formed integrally by hot press pressure and γ rays generated from radioactive substance such as used fuel is shielded; a neutron shielding member which is provided around the bottomed container and shields neutron generated from the radioactive substance; and a cover for covering an opening of the bottomed container.

The radioactive substance container according to the next invention comprises: a bottomed container which contains a radioactive substance such as used fuel into a body section with a bottom section and shields γ rays generated from the radioactive substance; a neutron shielding material which is arranged around the bottomed container and shields neutron generated from the radioactive substance, wherein a metal billet is heated and is upset and drawn so that the bottom section and the body section are formed integrally.

In this radioactive substance container, the bottomed container, where the body section and the bottom section are integral, is formed. When such a bottomed container is used, the conventional welding of a bottom plate is not required, and the heat treatment after the welding can be omitted. At the time of the hot press working and upsetting draw forming, the punching and drawing which are normally known can be combined, the forming is not limited to the detailed working method mentioned below. This radioactive substance container can contain not only used fuel but also substances contaminated by radioactive rays.

The radioactive substance container according to the next invention is the radioactive substance container described above in which a spot facing section is further formed integrally with the bottom section at the time of forming the bottomed container. This radioactive substance container is a bottomed container in which the metal billet is hot-dilated and simultaneously the spot facing section is also provided on the bottomed section. In a cask, since the bottomed section has a neutron absorbing member, the spot facing section is provided on the bottomed section of the container. Since the spot facing section has been conventionally provided by the cutting work or by welding a bottom plate previously provided with a spot facing section to the body section, the manufacturing requires the troublesome steps. In the bottomed container, since the spot facing section is formed integrally at the time of the hot-dilation forming, the step of forming the spot facing section can be omitted.

The radioactive substance container according to the next invention is the radioactive substance container described above in which a flange is further provided integrally with the body section of the bottomed container. In the conventional radioactive substance container, since the flange section is separately manufactured and is welded to the body section so as to be attached, the heat treatment after the welding is required, namely, the manufacturing requires the troublesome steps. Moreover, since the radioactive substance container itself requires sealing property and strength, the welded portion requires high solidity. According to the bottomed container of the present invention, since the flange and the body section are formed integrally, the welding and post-welding heat treatment steps are omitted, and simultaneously the sealing property and the strength of the container itself can be secured.

The radioactive substance container according to the next invention is the radioactive substance container described above in which at least one of an external section and an internal section of the bottomed container vertical to the axial direction is polygonal. Since a basket is contained in the bottomed container to be used particularly for a cask as the radioactive substance container, it is preferable that the sectional shape of the inside of the bottomed container is formed according to the shape the basket. In the conventional method, after the section of the inside of the bottomed container is formed into a circular shape, it is formed into a shape according to the basket by the cutting or the like. When this radioactive substance container is hot-dilated, the section of the inside of the container can be formed into a shape according to the basket. For this reason, the cutting step which was conventionally required can be omitted. The polygonal shape of the inner section of the body section includes so-called polygonal shapes such as triangular and tetragonal shapes and also shapes shown in FIGS. 15(c) and 15(d). Thereafter, this is applied also to the following inventions.

The hot dilation forming-use metal billet according to the next invention in which at least a section vertical to an axial direction on a pressing forward side is formed into a polygonal shape.

Since this hot dilation forming-use metal billet is formed so that at least the section vertical to the axial direction on the pressing forward side is formed into a polygonal shape, the metal billet is dilated towards the inner wall of the container by a function for bending each side of the polygon at the time of the hot dilation forming. Since the metal billet is dilated in a space between the pressing forward side and the body of the container at the time of the hot dilation forming, the phenomenon that the metal flows to the opposite direction to the pressing direction is suppressed. Due to these functions, with this hot dilation forming-use metal billet, a thick container where a ratio of the axial length to the diameter is not less than 1 can be formed with a press pressure which is a several part of the conventional press pressure. Moreover, defects which occurs on the end portion or the surface of the container after the forming can be suppressed.

The hot dilation forming-use metal billet according to the next invention in which at least one plane is provided on at least one of a side surface on a pressing forward side and a side surface on a backward side with respect to the pressing direction ("pressing backward side").

In this hot dilation forming-use metal billet, since its side surface has at least one plane and the metal billet is hot-dilated by the function for bending the plane towards the inner wall of the container for forming, the press pressure required at the time of the hot dilation forming is lower than the case where the side surface is a curved surface. Therefore, the thick container which is long in the axial direction can be formed with the press pressure smaller than the conventional pressure. Moreover, internal defects such as cracks can be reduced in comparison with the case where the side surface is a bent surface.

The hot dilation forming-use metal billet according to the next invention is the hot dilation forming-use metal billet described above in which a taper which becomes thinner towards the pressing direction is provided on the pressing forward side of the metal billet.

The hot dilation forming-use metal billet according to the next invention is the hot dilation forming-use metal billet described above in which at least one or more stepped sections are provided so that the pressing forward side of the metal billet becomes thinner gradationally towards the pressing direction.

In the above-mentioned hot dilation forming-use metal billet, since the timing at which the metal fills the vicinity of the bottom of the container for forming can be delayed at the final stage of the hot dilation forming, the upsetting of the metal billet can be suppressed at the final stage of the hot dilation forming. As a result, thus the press pressure can be reduced at the time of the hot dilation forming.

The hot dilation forming-use metal billet according to the next invention is the one in which at least one plane is provided on a side surface and an extended section which engages with an end portion of an inlet of a container for forming is provided on an end portion on a pressing backward side.

Since this hot dilation forming-use metal billet is provided with the extended section at the end portion on the pressing backward side, metal billet is engaged with the end portion of the container by the extended section at the time of the hot dilation forming. With this function, constraint of the container on the metal billet becomes stronger, so that the upsetting of the metal billet on the pressing forward side can be suppressed. Moreover, since the side surface is provided with at least one plane, the function for bending this plane and the function for suppressing the upsetting of the metal billet accrue. Therefore, due to their interaction, the press pressure can be suppressed to be small. Moreover, the metal billet is previously provided with the extended section on the pressing backward side at the time of the manufacturing. For this reason, since the step of forming the extended section which is extended to above the body section of the container on the pressing backward side is not required before the hot dilation forming step, the container manufacturing step can be simplified. Here, in this metal billet, the sectional shape is uniform along the axial direction.

The hot dilation forming-use metal billet according to the next invention is the one in which at least a section vertical to an axial direction on a pressing forward side is formed into a polygonal shape, and an extended section which engages with an end portion of an inlet of a container for forming is provided on a pressing backward side.

Since this hot dilation forming-use metal billet is provided with the extended section on the pressing backward side, this extended section engages the metal billet with the end portion of the container at the time of the hot dilation forming. With this function, the constraint of the container on the metal billet becomes stronger, and the upsetting of the metal billet on the pressing forward side can be suppressed. Moreover, since at least the section vertical to the axial direction on the pressing forward side was formed into a polygonal shape, the function for bending each side of the polygonal section and the function for suppressing the upsetting of the metal billet accrue. Therefore, the press pressure can be suppressed to be small by their interaction. Moreover, the metal billet is previously provided with the extended section on the pressing backward side at the time of the manufacturing. For this reason, since the step of forming the extended section which is extended to above the body section of the container on the pressing backward side is not required before the hot dilation forming step, the steps of manufacturing the container can be simplified.

The hot dilation forming-use metal billet according to the next invention is the one in which at least a section vertical to an axial direction on a pressing forward side is formed into a polygonal shape, and at least one or more stepped sections are provided so that the pressing forward side becomes thinner gradationally towards a pressing direction, and an extended section which engages with an end portion of an inlet of a container for forming is provided on a pressing backward side.

Since this hot dilation forming-use metal billet is provided with the extended section on the pressing backward side, the extended section latches the metal billet with the end portion of the container at the time of the hot dilation forming. With this function, the constraint of the container on the metal billet becomes stronger, and the upsetting on the pressing forward side can be suppressed. Moreover, since at least the section vertical to the axial direction on the pressing forward side was formed into a polygonal shape, the function for bending each side of the polygonal section and the function for suppressing the flow of the metal accrue. Further, since the pressing forward side becomes thinner gradationally towards the pressing direction, the timing at which the metal fills the bottom section of the container for forming can be delayed. Therefore, the press pressure can be suppressed to be small by their interaction. Moreover, the metal billet is previously provided with the extended section on the pressing backward side at the time of the manufacturing. For this reason, since the step of forming the extended section which is extended to above the body section of the container on the pressing backward side is not required before the hot dilation forming, the steps of manufacturing the container can be simplified. Here, since the pressing forward side becomes thinner gradationally, the forming becomes comparatively easy.

The hot dilation forming-use metal billet according to the next invention is the one in which at least one plane is provided on at least one of a side surface on a pressing forward side and a side surface on a pressing backward side, and at least one or more stepped sections are provided so that the pressing forward side becomes thinner gradationally towards the pressing direction, and an extended section which engages with an end portion of an inlet of a container for forming is provided on the pressing backward side.

Since this hot dilation forming-use metal billet is provided with the extended section on the pressing backward side, the extended section latches the metal billet with the end portion of the container at the time of the hot dilation forming. With this function, the constraint of the container on the metal billet becomes stronger, and the upsetting on the pressing forward side can be suppressed. Moreover, since at least one of the side surfaces of the metal billet has at least one plane, the function for bending the plane and the function for suppressing the flow of the metal accrue. Further, since the pressing forward side becomes thinner gradationally towards the pressing direction, the timing at which the metal fills the bottom section of the container for forming can be delayed. Therefore, the press pressure can be suppressed to be small by their interaction. Moreover, the metal billet is previously provided with the extended section on the pressing backward side at the time of the manufacturing. For this reason, since the step of forming the extended section which is extended to above the body section of the container on the pressing backward side is not required before the hot dilation forming, the steps of manufacturing the container can be simplified. Here, since the pressing forward side becomes thinner gradationally, the forming becomes comparatively easy.

The container according to the next invention is the one in which a metal billet is hot-dilated in a container for forming, and a bottom section and body section are formed integrally and a thick bottomed container is obtained.

The container according to the next invention is the one in which, when a metal billet is hot-dilated in a container for forming and a body section is worked, a boring uncompleted section is allowed to remain on one end side of the body section so as to be a bottom section, and an integrally thick bottomed container is obtained.

As the container of the above-mentioned invention, a bottomed container in which the bottom section and the body section are formed integrally is used so that the conventional welding of a bottom plate is not required, and heat treatment after that can be omitted. Moreover, since the bottomed container is formed by the hot dilation, only a press pressure, which is lower than that at the time of hot backward extrusion forming, for example, is required. Here, at the time of the hot press working and the upsetting drawing, punching and drawing which are normally known can be combined, and they are not limited to detailed working methods described below.

In addition, like a cylinder or the like for a large pressing machine, the above-mentioned container includes a so-called thick container in which a thickness is thick with respect to its radius. Here, the thick container is such that a ratio of a difference between an outer radius $R_o$ and an inner radius $R_i$, namely, a thickness $t=R_o-R_i$ to an average radius $R=(Ro-R_i)/2$ is $(t/R)>1/10$. When the section of the container is not circular, an equivalent diameter $de=s/\pi$ maybe used for calculating the outer radius $R_o$, the inner radius Ri and the average radius. Here, s is a peripheral length of the section, and when a length of one side is a, $s=4\times a$ in the case of quadrate section.

The container according to this invention is suitable for a container in which a ratio $(L/D_i)$ of an axial length L to an inner diameter Di is not less than 1. Another container of the present invention includes a comparatively thin container like a boiler as a pressure container. Further, another container of the invention includes a container for chemical plant, a reactor container for petroleum refining plant, an ammonia synthetic cell, a heat exchange container, a pressure container such as a boiler, a casing for a large rotational equipment for containing a hydroelectric water turbine, a container to be used as a body of submarine and ship.

The container according to the next invention is a container described above in which a section of the metal billet vertical to an axial direction is polygonal and an internal shape of a section of the container for forming vertical to the axial direction is circular.

As this container, a bottomed container in which the bottom section and the body section are formed integrally is used so that the conventional welding of a bottom plate is not required. Moreover, since the metal billet, where a section vertical to the axial direction is polygonal, is set into the container for forming, where an internal shape of the section vertical to the axial direction is circular so that the bottomed container is hot-dilated. At this forming step, since the metal billet is dilated by the function for bending one side of the polygonal section, the bottomed container can be formed with a press pressure which is lower than the conventional pressure.

The container according to the next invention is a container described above in which a section of the metal billet vertical to an axial direction is polygonal and an internal shape of a section of the container for forming vertical to the axial direction is polygonal.

As this container, a bottomed container in which the bottom section and the body section are formed integrally is used so that the conventional welding of a bottom plate is not required. Moreover, since the metal billet, where a section vertical to the axial direction is polygonal, is set into the container for forming, where an internal shape of the section vertical to the axial direction is circular so that the bottomed container is hot-dilated. At this forming step, since the metal billet is dilated by the function for bending each side of the polygonal section, the bottomed container where the bottom section and the body section are integral can be formed with a press pressure which is lower than the conventional pressure. Moreover, the internal shape of the container for forming is changed so that bottomed containers having external shapes according to appellations can be obtained.

The container according to the next invention is a S container described above in which an outer diameter of the bottomed container is not less than 200 mm to not more than 4000 mm, and a thickness is not less than 20 mm to not more than 400 mm.

As this container, a bottomed container in which the bottom section and the body section are formed integrally is used so that the conventional welding of a bottom plate is not required, and the heat treatment after the welding can be omitted. Particularly in the thick bottomed container, the effect that the above-mentioned steps can be omitted is great.

The container according to the next invention is the one in which a metal billet, where at least a section vertical to an axial direction on a pressing forward side is polygonal, is set into a container for forming, and a boring punch is pushed into the metal billet and the metal billet is hot-dilated to be formed into a bottomed container where a bottom section and a body section are integral.

This container is a thick container and includes both a drum without a bottom and a bottomed container where a bottom section and a body section are integral. Particularly in the case of the thick bottomed container, the conventional welding of a bottom plate is not required, and the heat treatment after the welding can be omitted. Moreover, since the pressure required for pressing is lower than the conventional pressure, even in the case of a container which is thick and whose axial dimension reaches a several meters particularly like a container to be used as a cylinder or the like for a large pressing machine, it can be manufactured by the conventional facilities. Moreover, since a number of defects which occur on the end portion of the container surface is small, only less steps of correcting these defects after the forming are required.

The container according to the next invention is a container described above in which the bottomed container is constituted so that at least one of an external section and an internal section of the bottomed container vertical to the axial direction is polygonal. Since a basket is contained in the bottomed container to be used particularly for a cask as the radioactive substance container, it is preferable that the inner section of the bottomed container is formed into a shape according to the basket. In the conventional method, after the inner section of the bottomed container is formed into a circular shape, and it is formed into the shape according to the basket by the cutting or the like. Since the inner section of this container can be formed into the shape according to the basket when the bottomed container is dilated, the cutting step which was required conventionally can be omitted.

The bottomed container manufacturing apparatus according to the next invention comprises: a container for forming having at least a container body section and a container bottom section in which the container body section and the container bottom section can move relatively with respect to an axial direction of the container body section; and a boring punch which is mounted to a pressing machine and pressurizes a metal billet for hot dilation forming set into the container for forming.

This bottomed container manufacturing apparatus has the container in which the bottomed section and the body section can move relatively. For this reason, when the body section of the container is tried to moved to the opposite direction to the pressing direction at the time of the hot dilation forming, the body section of the container moves to the opposite direction to the pressing direction together with the metal billet. Namely, since the body section of the container and the metal billet to be formed seldom move relatively, an increase in the press pressure at the time of the hot dilation forming can be suppressed.

The bottomed container manufacturing apparatus according to the next invention comprises: a container for forming having at least container body sections and container bottom sections divided in an axial direction in which the container body section and the container bottom section can move relatively with respect to an axial direction of the container body section; and a boring punch which is mounted to a pressing machine and pressurizes a metal billet for hot dilation forming set into the container for forming. In this bottomed container, since the body section of the container extends along the whole axial direction, even in the case where the metal billet which is long in the axial direction, deformation of the metal billet in the axial direction at the time of the hot dilation forming can be absorbed by the whole container. Therefore, even in the case of the container which is long in the axial direction, an increase in the press pressure can be suppressed.

The radioactive substance method of manufacturing a container according to the next invention comprises: the step of rounding a drum-shaped bottomed container where a bottom section and a body section are formed integrally by hot dilation and setting a tool so as to cut an external side of the bottomed container; and the step of cutting an internal section of the bottomed container into a shape according to at least one portion of an outer peripheral shape of a basket for containing used nuclear fuel aggregate.

In this radioactive substance method of manufacturing a container, the outer side of the bottomed container where the bottom section and the body section are formed integral is finished by cutting, and the inner side is cut into a stepped shape so that a portion for containing a basket for used nuclear fuel aggregate is provided, or the inner side is finished by cutting so that the radioactive substance container is manufactured.

The radioactive substance method of manufacturing a container according to the next invention comprises: the step of hot-dilating a bottomed container so that its bottom section and body section are integral; and the step of cutting an internal section of the bottomed container into a shape according to at least one portion of an outer peripheral shape of a basket for containing used nuclear fuel aggregate.

In this radioactive substance method of manufacturing a container, the bottomed container where the bottom section and the body section are integral is formed by the hot dilation forming, and the outer side of the bottomed container is finished by cutting, and the inner side is cut into a stepped shape so that a portion for containing a basket for used nuclear fuel aggregate is provided, or the inner side is finished by cutting so that the radioactive substance container is manufactured.

The method of manufacturing a container according to the next invention comprises: the step of setting a metal billet having at least one plane on a side surface into a container for forming with a gap from an inner wall; and the step of pushing a boring punch into the metal billet and bending the plane towards the inner wall so as to hot-dilate the metal billet.

In this method of manufacturing a container, the metal billet is extended towards the inner wall of the container for forming by the function for bending the plane on the side surface of the metal billet. Moreover, since the metal billet is extended in space between the metal billet and the inner wall of the container for forming, the upsetting phenomenon of the metal billet can be suppressed. With these function, the method of manufacturing a container requires the press pressure which is lower than the conventional pressure, and defects which occurs on the end portion or the surface of the container after the forming can be suppressed.

The method of manufacturing a container according to the next invention comprises: the step of setting a metal billet, which has at least one plane on a side surface and an extended section engaging with an end portion of an inlet of a container for forming on an end portion of a pressing backward side, into the container for forming with a gap from an inner wall; and the step of pushing a boring punch into the metal billet and bending the plane towards the inner wall so as to hot-dilate the metal billet.

In this method of manufacturing a container, since the metal billet provided with the extended section engaging with the end portion of the opening of the container for forming is used for the end portion of the pressing backward side, the extended section engages the metal billet with the end portion of the container at the time of hot dilation forming. With this function, the constraint of the container on the metal billet becomes stronger, and the upsetting of the pressing forward side can be suppressed. Moreover, since at least one plane is provided on the side surface, the bending function and the function for suppressing the phenomenon that the metal flows to the opposite side to the pressing direction accrue. Therefore, the press pressure can be suppressed small by their interaction, and deterioration of the end surface shape can be also suppressed.

The method of manufacturing a container according to the next invention is characterized in that a metal billet, where at least a section vertical to an axial direction on a pressing forward side is formed into a polygonal shape, is set into a container for forming, and a boring punch is pushed into the metal billet and the metal billet is hot-dilated.

In this method of manufacturing a container, on the pressing forward side, since the metal billet is extended in the space between the pressing forward side and the container body, the flow of the metal directing to the opposite side of the pressing direction can be suppressed. For this reason, the phenomenon of the metal billet can be suppressed. For this reason, the method of manufacturing a container requires the press pressure which is lower than the conventional one, and defects which occur on the end portion or the surface of the container after the forming can be suppressed.

The method of manufacturing a container according to the next invention is characterized in that a metal billet having at least one plane on at least one of a side surface on a pressing forward side and a side surface on a pressing backward side is set into a container for forming, and a boring punch is pushed into the metal billet and the metal billet is hot-dilated.

In this method of manufacturing a container, since the metal billet having at least one plane on the side surface is hot-dilated, a force required for the hot dilation forming is weaker than the case where the side surface is a curved surface. Therefore, the press pressure is lower than the conventional method of manufacturing a containers, and internal defects such as cracks can be reduced.

The hot pressing method of manufacturing a thick metal-made drum or a cylindrical container according to the next invention is characterized in that a metal billet having different diameter sections without joint, where its pressing forward side is composed of a member having a section with an outer diameter smaller than an inner diameter of a container or an outer diameter of a diagonal length or a member having a section with an outer diameter of a diagonal length equal with the inner diameter of the container and its backward side is composed of a member having a section with an outer diameter or a diagonal length equal with the inner diameter of the container, is set into the container for press forming which was heated to a press working temperature, and while a center of a workpiece of the metal billet without joint is being bored by a punch, the metal billet is press-worked.

In this pressing method, the metal on the thick portion on the pressing backward side fills the container and simultaneously is worked, the constraint force is heightened, and the upsetting phenomenon of the metal billet without joint is suppressed, and the shape of the end surface is made to be satisfactory. Moreover, since the metal is supplied from the pressing backward side to the pressing forward side and the pressing forward side is pushed to be spread sideways and is simultaneously worked according to the effect of satisfactory plastic working of the steel heated to high temperature, it fills the space of the container to be formed. For this reason, a pressed product having a predetermined shape is manufactured from the metal billet without joint. As a result, the metal billet without joint reduces a pressing forming load and improves yield of the product, and a pressed product having excellent end surface shape can be obtained.

The method of manufacturing a drum or a container of setting a metal billet into a container for forming and hot-dilating the metal billet by means of a boring punch to be operated by a pressing machine according to the next invention comprises: the step of setting the metal billet, where its pressing forward side has a section having an outer diameter with a diagonal length of not more than an inner diameter of the container and its backward side has a section having an outer diameter substantially equal with the inner diameter of the container, into a container for press forming which was heated to a press working temperature; and the step of boring a center of a workpiece of the metal billet by means of the boring punch and simultaneously press-working the metal billet.

In this method, since the metal billet, where the pressing forward side has a quadrate section whose the diagonal length of the pressing forward side is smaller than the inner diameter of the container, is used, the press pressure can be small by the function for bending the side surface composing the plane on the pressing forward side. Moreover, since the pressing backward side of the metal billet suppresses the upsetting of the pressing forward side, defects on the end portion and the container surface can be suppressed, and the press pressure can be reduced.

The method of manufacturing a drum or a container of setting a metal billet into a container for forming and hot-dilating the metal billet by means of a boring punch to be operated by a pressing machine, according to the next invention comprises: the step of setting the metal billet, where its pressing forward side has a section having an outer diameter with a diagonal length of smaller than an inner diameter of the container and its backward side has a section having a diagonal length substantially equal with the inner diameter of the container, into a container for press forming which was heated to a press working temperature; and the step of boring a center of a workpiece of the metal billet by means of the punch and simultaneously press-working the metal billet.

In this method, since the metal billet, where the pressing forward side has a quadrate section whose the diagonal length of the pressing forward side is smaller than the inner diameter of the container, is used, the press pressure can be small by the function for bending the side surface composing the plane on the pressing forward side. Moreover, the metal billet to be used in this method can be worked comparatively easier than the case of a circular sectional shape because the pressing forward side and backward side have angular sectional shape.

The method of manufacturing a drum or a container of setting a metal billet into a container for forming and hot-dilating the metal billet by means of a boring punch to be operated by a pressing machine, according to the next invention comprises: the step of setting the metal billet, where its pressing forward side has a section with an outer diameter smaller than an inner diameter of the container and its backward side has a section with an outer diameter substantially equal with the inner diameter of the container, into a container for press forming which was heated to a press working temperature; and the step of boring a center of a workpiece of the metal billet by means of the punch and simultaneously press-working the metal billet.

In the above-mentioned method of manufacturing a container, since the pressing forward side has a circular section whose diagonal length is smaller than the inner diameter of the container, the metal billet is extended to the space between the metal billet and the inner wall of the container for forming. For this reason, the press pressure can be lower than the conventional pressure. Moreover, since the pressing backward side of the metal billet suppresses the upsetting of the pressing forward side, defects on the end portion and the container surface can be also suppressed, and the press pressure can be also reduced.

The method of manufacturing a container according to the next invention comprises: the step of setting a metal billet having at least one plane on a side surface into a container for forming with a gap from an inner wall; the step of pushing the metal billet so as to extend a pressing backward side of the metal billet to an end portion of an inlet of the container for forming; and the step of pushing a boring punch into the metal billet and bending the plane towards the inner wall so as to hot-dilate the metal billet.

This method of manufacturing a container includes the step of extending the pressing backward side of the metal billet to above the body section of the container before the hot dilation forming. Since this extended section has the function for engaging the metal billet with the container end portion at the time of the hot dilation forming, the constraint of the container on the metal billet becomes strong, and the upsetting on the pressing forward side can be suppressed. Moreover, the metal billet is extended by the function for bending the plane of the metal billet towards the inner wall of the container for forming. With their interaction, this method of manufacturing a container can form a thick container by the lower press pressure than the backward extrusion method or the like.

The method of manufacturing a container according to the next invention comprises: the step of setting a metal billet, where at least one plane is provided on a side surface and an extended section engaging with an end portion of an inlet of a container for forming is provided on a pressing backward side, into a container for forming with a gap from an inner wall; and the step of pushing a boring punch into the metal billet and bending the plane towards the inner wall so as to hot-dilate the metal billet.

Since the metal billet to be used in this method of manufacturing a container is previously provided with the extended section engaging with the end portion of the inlet of the container for forming on the end portion on the pressing forward side. For this reason, since the step of extending the pressing backward side of the metal billet to above the body section of the container before the hot dilation forming, time required for the hot dilation is shortened. As a result, since the forming can be ended until the temperature of the metal billet is lowered, the end portion shape becomes more satisfactory. Moreover, since the extending step can be also omitted, the manufacturing does not require troublesome steps.

The method of manufacturing a container according to the next invention comprises: the step of setting a metal billet, where at least a section vertical to an axial direction on a pressing forward side is formed into a polygonal shape, into a container for forming; the step of pushing the metal billet so as to extend a pressing backward side of the metal billet to an end portion of an inlet of the container for forming; and the step of pushing a boring punch into the metal billet so as to hot-dilate the metal billet.

This method of manufacturing a container includes the step includes the step of extending the pressing backward side of the metal billet to above the body section of the container before the hot dilation forming. Since this extended section has the function for engaging the metal billet with the container end portion at the time of the hot dilation forming, the constraint of the container on the metal billet becomes strong, and the upsetting on the pressing forward side can be suppressed. Moreover, since the metal billet, in which at least the section vertical to the axial direction on the pressing forward side is formed into a polygonal shape, is dilated to be formed, the function for bending each side of the polygon towards the inner wall of the container for forming acts. With their interaction, the thick container can be formed with lower press pressure than the backward extrusion method or the like.

The method of manufacturing a container according to the next invention comprises: the step of setting a metal billet, where at least one plane is provided on at least one of a side surface of a pressing forward side and a side surface of a pressing backward side, into a container for forming; the step of pushing the metal billet so as to extend a pressing backward side of the metal billet to an end portion of an inlet of the container for forming; and the step of pushing a boring punch into the metal billet so as to hot-dilate the metal billet.

This method of manufacturing a container includes the step includes the step of extending the pressing backward side of the metal billet to above the body section of the container before the hot dilation forming. Since this extended section has the function for engaging the metal billet with the container end portion at the time of the hot dilation forming, the constraint of the container on the metal billet becomes strong, and the upsetting on the pressing forward side can be suppressed. Moreover, since the metal billet, which is provided at least one plane on at least one side, is dilated to be formed, the function for bending the plane of the metal billet towards the inner wall of the container for forming acts. With the interaction, this method of manufacturing a container can form the thick container with lower press pressure than the backward extrusion method or the like.

The method of hot pressing a thick metal-made cylinder or a cylindrical container according to the next invention is characterized in that a metal billet having different diameter sections without joint, where its pressing forward side is composed of a member having a section with an outer diameter smaller than an inner diameter of a container or an outer diameter of a diagonal length or a member having a section with an outer diameter of a diagonal length equal with the inner diameter of the container and its backward side is composed of a member having a section with an outer diameter or a diagonal length equal with the inner diameter of the container, is set into the container for press forming which was heated to a press working temperature, and the metal billet is pushed so that the pressing backward side of the metal billet is extended to an end portion of an inlet of the container for forming, and while a center of a workpiece of the metal billet without joint is being bored by a punch, the metal billet is press-worked.

This thick metal made cylinder or cylindrical container hot pressing method includes the step of extending the pressing backward side of the metal billet to above the body of the container before the hot dilation forming. Since this extended section has the function for engaging the metal billet wit the container end portion at the time of the hot dilation forming, the constraint of the container on the metal billet becomes stronger, and the upsetting on the pressing forward side can be suppressed. Moreover, since the metal is supplied from the pressing backward side to the pressing forward side and the pressing forward side is pushed to be spread sideways and is simultaneously worked according to the effect of satisfactory plastic working of the steel heated to high temperature, it fills the space of the container to be formed. For this reason, a pressed product having a predetermined shape is manufactured from the metal billet without joint. With their interaction, in this manufacturing method, the thick container can be formed with lower press pressure than the backward extrusion method or the like.

The method of manufacturing a drum or a container of setting a metal billet into a container for forming and hot-dilating the metal billet by means of a boring punch to be operated by a pressing machine, according to the next invention comprises: the step of setting the metal billet, where its pressing forward side has a section having an outer diameter with a diagonal length of not more than an inner diameter of the container and its backward side has a section having an outer diameter substantially equal with the inner diameter of the container, into a container for press forming which was heated to a press working temperature; the step of pushing the metal billet so as to extend the pressing backward side of the metal billet to an end portion of an inlet of the container for forming; and the step of boring a center of a workpiece of the metal billet by means of the boring punch and simultaneously press-working the metal billet.

This method of manufacturing a drum or a container includes the step of extending the pressing backward side of the metal billet to above the body of the container before the hot dilation forming. Since this extended section has the function for engaging the metal billet wit the container end portion at the time of the hot dilation forming, the constraint of the container on the metal billet becomes stronger, and the upsetting on the pressing forward side can be suppressed.

Moreover, since the metal billet, in which the pressing forward side is a tetragonal section with its diagonal length is smaller than the inner diameter of the container, is used, the metal billet is dilated by the function for bending each side of the tetragonal section. Moreover, the pressing backward side of the metal billet suppresses the upsetting on the pressing forward side. With their interaction, in this manufacturing method, the thick container can be formed with lower press pressure than the backward extrusion method or the like.

The method of manufacturing a drum or a container of setting a metal billet into a container for forming and hot-dilating the metal billet by means of a boring punch to be operated by a pressing machine, according to the next invention comprises: the step of setting the metal billet, where its pressing forward side has a section having an outer diameter with a diagonal length of smaller than an inner diameter of the container and its backward side has a section having a diagonal length substantially equal with the inner diameter of the container, into a container for press forming which was heated to a press working temperature; the step of pushing the metal billet so as to extend the pressing backward side of the metal billet to an end portion of an inlet of the container for forming; and the step of boring a center of a workpiece of the metal billet by means of the punch and simultaneously press-working the metal billet.

This method of manufacturing a drum or a container includes the step of extending the pressing backward side of the metal billet to above the body of the container before the hot dilation forming. Since this extended section has the function for engaging the metal billet with the container end portion at the time of hot dilation forming, the constraint of the container on the metal billet becomes stronger, and upsetting on the pressing forward side can be suppressed. Moreover, since the metal billet, in which the pressing forward side is a tetragonal section with a sectional length smaller than the internal diameter of the container, is used, the metal billet is dilated to be formed by the function for bending each side of the tetragonal section. Moreover, the pressing backward side of the metal billet suppresses upsetting on the pressing forward side. With their interaction, in this manufacturing method, the thick container can be formed with lower press pressure than the backward extrusion method or the like. Further, since the metal billet to be used in this method has the pressing forward side and backward side whose sections are angular shape, the metal billet is worked comparatively easier than the metal billet having one round section.

The method of manufacturing a drum or a container of setting a metal billet into a container for forming and hot-dilating the metal billet by means of a boring punch to be operated by a pressing machine, according to the next invention comprises: the step of setting the metal billet, where its pressing forward side has a section with an outer diameter smaller than an inner diameter of the container and its backward side has a section with an outer diameter substantially equal with the inner diameter of the container, into a container for press forming which was heated to a press working temperature; the step of pushing the metal billet so as to extend the pressing backward side of the metal billet to an end portion of an inlet of the container for forming; and the step of boring a center of a workpiece of the metal billet by means of the punch and simultaneously press-working the metal billet.

This method of manufacturing a drum or a container includes the step of extending the pressing backward side of the metal billet to above the body of the container before the hot dilation forming. Since this extended section has the function for engaging the metal billet with the container end portion at the time of hot dilation forming, the constraint of the container on the metal billet becomes stronger, and upsetting on the pressing forward side can be suppressed. Moreover, since the pressing backward side of the metal billet has a diameter substantially equal with the inner diameter of the container for forming, upsetting on the pressing forward side can be suppressed. With their interaction, in this manufacturing method, the thick container can be formed with lower press pressure than the backward extrusion method or the like. Further, since the metal billet to be used in this method has the pressing forward side and backward side whose sectional shapes are circular, the metal billet can be worked comparatively easier than the metal billet having different sectional shapes.

The method of manufacturing a container according to the next invention depending from the above-mentioned method of manufacturing a container comprises the step of forming the metal billet by means of a forging step and forming at least the pressing forward side of the metal billet into an angular section.

The method of manufacturing a container according to the next invention depending from the above-mentioned method of manufacturing a container is characterized in that the forging step includes the step of providing a taper which becomes thinner towards the pressing direction on the pressing forward side of the metal billet.

The method of manufacturing a container according to the next invention depending from the above-mentioned method of manufacturing a container is characterized in that the forging step includes the step of providing at least one stepped section so that the pressing forward side of the metal billet becomes thinner gradationally towards the pressing direction.

In this method of manufacturing a container, at the final stage of the hot dilation forming, timing at which the metal fills the vicinity of the bottom of the container for forming can be delayed. With this function, since the upsetting phenomenon of the metal billet can be suppressed, an increase in the press pressure at the final stage of the hot dilation forming can be suppressed.

The method of manufacturing a container according to the next invention depending from the above-mentioned method of manufacturing a container comprises: the step of providing a drum-shaped member between the metal billet and the bottom of the container for forming and setting the metal billet into the container for forming; the step of pushing the boring punch into the metal billet and hot-dilating the metal billet so as to form the bottomed container where the bottom section and the body section are integral; the step of removing the drum-shaped member from the bottom section of the bottomed container after the forming; and the step of removing a pillar-shaped portion formed on the bottom section of the bottomed container by means of the drum-shaped member.

In this manufacturing method, the bottomed container is formed by a drum-shaped member provided at the bottom of the metal billet, and simultaneously a spot facing section is formed on the bottom of the bottomed container. Since the spot facing section has been conventionally provided by cutting, the working requires troublesome steps. However, according to this method, since a pillar-shaped section which remains on the bottom of the container is only removed after the dilation forming, the working does not require less troublesome steps than the conventional method. Here, the drum-shaped member includes polygonal members whose section vertical to the axial direction is triangular, tetragonal or the like, a polygonal member whose angle of the polygon is rounded off and an elliptic member, so the shape is not limited to the drum.

The method of manufacturing a container according to the next invention comprises: the step of providing a pillar-shaped member between the metal billet and the bottom of the container for forming and setting the metal billet into the container for forming; the step of pushing the boring punch into the metal billet and hot-dilating the metal billet so as to form the bottomed container where the bottom section and the body section are integral; and the step of removing the pillar-shaped member from the bottom section of the bottomed container after the forming.

In this method, the bottomed container is formed by the pillar-shaped member provided at the bottom of the metal billet, and simultaneously the spot facing section is formed on the bottomed container. Since the spot facing section has been conventionally provided by the cutting, the working requires troublesome steps. According to this method, since the spot facing section can be formed simultaneously with the dilation forming, the working requires less troublesome steps than the conventional method. Moreover, since the step of removing the pillar-shaped member can be omitted, troublesome steps are not required for forming the spot facing section in comparison with the method where the spot facing section is formed.

The method of manufacturing a container according to the next invention depending from the above-mentioned method of manufacturing a container is characterized in that the body section of the container for forming can move relatively with respect to the bottom section of the container for forming.

In this method of manufacturing a container, the metal billet is set into the container where the body section and the bottom section can move relatively so as to be hot-dilated. For this reason, when the metal billet tries to move the body section of the container to the opposite direction to the pressing direction at the time of the hot dilation forming, the body section of the container moves together with the metal billet to the opposite direction to the pressing direction. Namely, since the body of the container and the metal billet to be formed hardly move relatively, an increase in the press pressure can be suppressed at the time of the hot dilation forming.

The method of manufacturing a container according to the next invention is characterized in that the body section of the container for forming is divided in an axial direction. In this method of manufacturing a container, since the body section of the container extends along the whole axial direction, even in the case where the metal billet which is long in the axial direction is formed, deformation of the metal billet with respect to the axial direction can be absorbed by the whole container at the time of the hot dilation forming. Therefore, even in the case where the thick container which is long along the axial direction is formed, an increase in the press pressure can be suppressed.

The method of manufacturing a container according to the next invention comprises: the upsetting step of placing a pressurizing platform into a ring-shaped die formed with an opening at its inner end portion and putting a metal billet into a mold composed of the die and the pressurizing platform so as to pressurize the metal billet by means of a boring punch; and the metal billet drawing step of supporting the die by means of a drum-shaped spacer and pushing the metal billet by means of the boring punch.

At the upsetting step, the metal billet is pressurized by the boring punch so that a material flows to between the opening portion of the die and the boring punch, and the metal billet is deformed into a dish shape. At this time, since the boring punch is held by the metal billet, the boring punch and the die including the metal billet are once allowed to recede. At the drawing step, the spacer is arranged below or above the die so as to support the die, and the boring punch is pushed into so that the metal billet is drawn by the die. As a result, the metal billet is deformed into a cup shape. These two steps are repeated plural times as the need arises so that the metal billet is formed into a final shape. Here, since these steps are heat working, it is necessary to heat the metal billet before the forming.

This invention includes the case where the above-mentioned two steps are carried out once so that the metal billet is formed into a final shape. Moreover, the metal billet may be pressurized from above (see FIGS. 21 through 27), or pressurized from below (see FIG. 28). In such a manner the upsetting and the drawing are combined to be used so that an excessive pressure which is required in the backward extrusion forming is not required. For this reason, since the bottomed container can be formed by a normal large-size pressing machine, it is easily manufactured.

The method of manufacturing a container according to the next invention comprises: the upsetting preparation step of stacking a plurality of ring-shaped dies formed with an opening on its inner end portion and stacking a plurality of pressurizing platforms respectively in the dies and putting a metal billet into a mold composed of the die and the pressurizing platform; the upsetting step of pressurizing the metal billet from above the mold using a boring punch to be operated by a pressing machine; the receding step of allowing the boring punch and the whole metal billet including and the upper die to recede; the drawing preparation step of removing the used pressurizing platform and placing a drum-shaped spacer onto the next die and placing the receded whole metal billet including the die onto the spacer; the drawing step of pushing the metal billet by means of the boring punch and drawing the metal billet by means of the die; and the repeating step of repeating the above-mentioned steps on the next pressurizing platform and die using a spacer of a length according to deformation of the metal billet.

At the upsetting step, the metal billet is pressurized by the boring punch so that a material flows between the opening portion and the boring punch, and the metal billet is deformed with the boring punch being held. At the drawing step, the space is provided below the die and the metal billet is pressurized so that the die is allowed to pass and the metal billet is subject to the draw working. As a result, the metal billet is deformed into a cup shape. Here, the spacer may have any shape as long as it has a drum shape into which the drawn metal billet can be put. The upsetting preparation step through the drawing step are ended, these are further repeated. At this time, as for the die and pressurizing platform, the second ones from the top of the stacked dies and platforms are used. Since the spacer should be longer as the metal billet deforms, they are prepared for each step. In this manufacturing method, since the upsetting and the drawing are combined to be used, the pressurizing force can be suppressed small in comparison with the backward extrusion forming. For this reason, the container can be formed by a normal large-size pressing machine.

BRIEF DESCRIPTION OF THE DRAWINGS

FIGS. 1(a) and 1(b) are explanatory diagrams showing one example of a bottomed container according to a first embodiment of the present invention;

FIGS. 2(a) through 2(e), 2(a') through 2(e') and 2(e") are explanatory diagrams showing the steps of manufacturing the bottomed container shown in FIGS. 1(a) and 1(b);

FIGS. 3(a) through 3(e) are perspective views showing one example of the metal billet to be used in the first embodiment;

FIGS. 6(a) through 6(c) are perspective views showing another metal billet applicable to the first embodiment;

FIG. 12(a) is an axially sectional view; and FIG. 12(b) is a radially sectional view;

FIGS. 14(a) and 14(b) are sectional views showing a container body and a punch for manufacturing the bottomed container according to the second embodiment;

FIGS. 18(a) through 18(e), 18(b'), 18(c') and 18(e') are explanatory diagrams showing a method of providing a spot faced portion on the bottomed container;

FIGS. 20(a) and 20(b) are axially sectional views showing the bottomed container according to a fourth embodiment;

FIGS. 31(a), 31(b), 31(a') and 31(b') are explanatory diagrams showing a method of manufacturing the bottomed container according to Erhardt boring method.

BEST MODE FOR CARRYING OUT THE INVENTION

Figure 2:
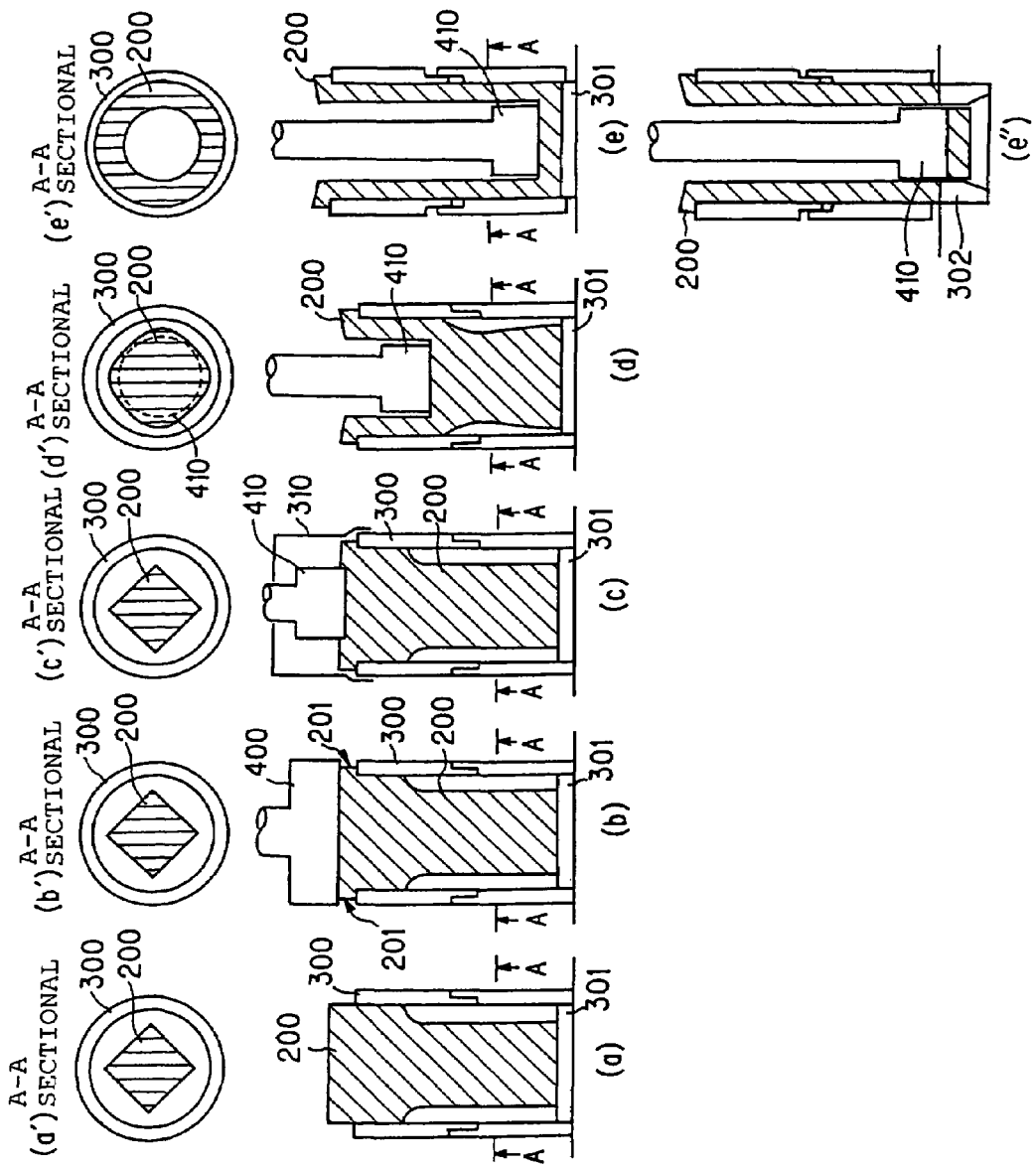

The present invention will be detailed below with reference to the diagrams. However, the present invention is not limited to the embodiments described below. Moreover, a manufacturing method of a container or a drum of the present invention is not limited to methods to be disclosed below. Further, components of the following embodiments include ones which can be assumed by person skilled in the art.

First Embodiment

FIGS. 1(a) and 1(b) are explanatory diagrams showing one example of a bottomed container according to the first embodiment. FIGS. 2(a) through 2(e), 2(a') through 2(e') and 2(e") are explanatory diagrams showing the steps of manufacturing the bottomed container 1 shown in FIGS. 1(a) and 1(b). FIGS. 3(a) through 3(c) are perspective views showing one example of a metal billet 200 to be used in the first embodiment. As shown in FIGS. 1(a), a bottom section 1b of the bottomed container 1 according to the first embodiment is formed integrally with a body section 1a, and as is clear from FIG. 1(b), a sectional form of the bottomed container 1 of the first embodiment is circular.

In this manufacturing method, the bottomed container 1 is manufactured by a punch according to hot dilation forming. Firstly there will be explained below the metal billet to be used in the manufacturing steps. The metal billet 200 is manufactured by cutting or free forging a foundry molding lump or a metal lump of molten metal before the hot dilation forming step, explained next. At the forging step, it is desirable that at least forward side of the metal billet in a pressing direction is formed into an angular section. As a result, an effect of the hot dilation forming can be utilized more effectively. Here, in the first embodiment, the metal lump is freely forging so that the integral metal billet 200 without a joint is manufactured, but a metal billet which can be used in the present invention is not limited to this.

As shown in FIGS. 3(a) through 3(c), a sectional form of the metal billet 200 used in the present embodiment is circular on a backward side in the pressing direction (hereinafter, pressing backward side) 200a, and is square on a forward side in the pressing direction (hereinafter, pressing forward side) 200b. An outer diameter of the pressing backward side 200a is larger than a diagonal length of the pressing forward side 200b, and the outer diameter of the pressing backward side 200a is substantially equal with an inner diameter of a container 300, and the diagonal length of the pressing forward side 200b is shorter than the inner diameter of the body section 300 of the container for forming (FIG. 3(b)). Here, the inner diameter of the body section 300 of the container for forming is represented by a broken line.

Further in this example, a section 970 of the metal billet 200 vertical to an axial direction on the pressing forward side 200b includes a projection image 920 of a section of a boring punch 410 vertical to the axial direction (FIGS. 3(b) and 3(e)). Here, the sectional form, dimension, outer form and the like of the metal billet 200 are not limited to this example. Another example of the billet which can be applied to the present invention will be explained later.

Next, there will be explained below the hot dilation forming steps. Prior to the hot dilation forming, the metal billet 200 is heated to a temperature where it is easily hot-dilated by a heating furnace (not shown). Since the heating temperature is determined by a material and the like of the metal billet 200, it is not determined ultimately. Here, as for a carbon steel material which is used for a body of the cask for containing and transporting and temporarily storing used nuclear fuel, it is desirable that the heating temperature is set to 1100° C. to 1300° C. When the heating temperature exceeds this range, crystal grains become coarse and oxidation and decarbonization occur on the surface, and the material is embrittled and is easily cracked. In the case of the carbon steel, as a percentage of the carbon is higher, the heating temperature becomes lower within the range. The metal billet 200, which is heated to the temperature at which it is easily hot-dilated by an electric furnace or the like, is upset into a body section 300 of the container for forming as shown in FIG. 2(a).

The metal billet 200 which is upset into the body section 300 of the container for forming is upset by a large punch 400 having an outer diameter substantially equal with or larger than the outer diameter of the metal billet 200, and an extended section 201 extended to the container 300 is provided on the pressing backward side 200a of the metal billet 200 (see FIG. 2(b)). The extended section 201 is provided on an end portion of the metal billet 200 so that a constraint force in the axial direction of the metal billet 200 can be heightened at the hot dilation forming step by means of the punch. Since the upsetting phenomenon of the metal billet 200 is suppressed by this function and metal flow towards the pressing direction and the opposite direction can be reduced, a rise in the press pressure can be suppressed. At the same time, the form of the end surface of the bottomed container after the forming can be satisfactory.

Here, even if the extended section 201 is not provided on the metal billet 200, the upsetting phenomenon can be suppressed by a friction force which is generated between an inner wall of the body section 300 of the container for forming and a side surface of the pressing backward side 200a of the metal billet 200. However, in order to lower the press pressure and obtain more organized end surface form, it is desirable that the extended section 201 is provided.

After the extended section 201 is formed on the end portion of the metal billet 200, the sequence goes to the hot dilation forming step by means of a boring punch 410. In order to bore a hole at the center of the metal billet 200, firstly the punch 410 is placed on the center of the end surface of the metal billet 200 by a locating guide 310 attached to the body section 300 of the container for forming (see FIG. 2(c)). Next, the boring punch 410 is pushed by a pressing machine (not shown) so that the metal billet 200 is hot-dilated.

When the boring punch 410 is pushed into the metal billet 200 by the pressing machine, the extended section 201 of the metal billet 200 is engaged with the upper end portion of the body section 300 of the container for forming, and the upsetting phenomenon of the metal billet 200 is suppressed. Moreover, the metal of the thick portion on the pressing backward side 200a of the metal billet 200 is deformed so as to fill the container 300 (see FIG. 2(d)). As a result, since the metal of the pressing backward side 200a is pushed against the inner wall of the body section 300 of the container for forming, the upsetting phenomenon of the metal billet 200 can be suppressed also by this function. As a result, the rise in the press pressure is suppressed, and the end surface form of the bottomed container after the forming can be satisfactory.

When the boring punch 410 is pushed into the metal billet 200, the metal which exists just below the boring punch 410 becomes a hemispheric metal lump and moves to the pressing forward side 200b together with the boring punch 410. Due to this phenomenon, a cross section of the pressing backward side 200a of the metal billet 200 vertical to the axial direction should be larger than that of the pressing forward side 200b.

Further, when the boring punch 410 is pushed into the metal billet 200, the metal on the pressing forward side 200b of the metal billet 200 is deformed so as to be spread towards the inner wall of the container 300 due to excellent property of plastic deformation owned by the steel heated to high temperature and a phenomenon that the metal lump is supplied from the pressing backward side 200a. Namely, it is the hot dilation forming. When the boring punch 410 is pushed to a predetermined depth previously set, the hot dilation forming is ended there (see FIG. 2(e)).

There will be explained below types of the metal billet 200 applicable to the manufacturing method of the present invention. As shown in FIG. 3(a), at least the metal billet which is formed so that a sectional form vertical to the axial direction on the pressing forward side is polygonal can be applied to the manufacturing method of the present invention. When such a metal billet is used, since the metal billet is deformed so as to be spread towards the inner wall of the container for forming in the hot dilation forming, the press pressure can be suppressed in comparison with backward extrusion or the like. Here, the section of the metal billet 200 vertical to the axial direction shown in FIG. 3(a) is tetragonal, but the section is not limited to this.

Further, the metal billet applicable to the manufacturing method of the present invention may have the following relationship. Namely, the section vertical to the axial direction on the pressing backward side has a relationship that it contains a projection image of a section vertical to the axial direction on the pressing forward side. Moreover, a projection image of the section vertical to the axial direction on the pressing backward side has a relationship that it is contained in the inner side of the section of the container for forming vertical to the axial direction. Here, the form of the inner side of the section of the container for forming vertical to the axial direction may be identical to the projection image of the section vertical to the axial direction on the pressing backward side. It is desirable that the metal billet which satisfies these relationships is used when a large bottomed container with large thickness is formed.

The projection image will be explained below with reference to FIGS. 3(c) and 3(d). Here, the projection image is represented by a broken line, and the section is represented by a continuous line. FIG. 3(c) shows a state that a section 950 vertical to the axial direction on the pressing backward side of the metal billet contains a projection image 900 of the section vertical to the axial direction on the pressing forward side. FIG. 3(d) shows a state that a projection image 910 of the section vertical to the axial direction on the pressing backward side is contained in an inner side 960 of the section of the container for forming vertical to the axial direction. Moreover, FIG. 3(e) shows a state of the boring punch having a relationship that a projection image 920 of the section vertical to the axial direction is contained in a section 970 vertical to the axial direction on the pressing forward side of the metal billet. Here, the projection image 920 of the section vertical to the axial direction in FIG. 3(e) is a projection image of the boring punch.

"Containing" in the present invention means that a whole portion surrounded by the broken line representing the projection image exists on the inside of a portion S surrounded by the continuous line representing the section. In the case where even a part of the portion surrounded by the broken line exist on the outside of the portion surrounded by the continuous line, this is not included in the concept of "containing". Moreover, in the case where the form of the section is identical to the projection image, this is not included in the concept of "containing".

It is desirable that the projection image of the boring punch is contained in the section vertical to the axial direction on the pressing forward side of the metal billet (see FIG. 3(e)). However, the projection image of the boring punch vertical to the axial direction may be identical to the section of the metal billet vertical to the axial direction on the pressing forward side. Moreover, the section of the boring punch vertical to the axial direction may contain the projection image of the section of the metal billet vertical to the axial direction on the pressing forward side.

However, in the case of a relationship that the section of the boring punch vertical to the axial direction contains the projection image of the section vertical to the axial direction on the pressing forward side of the metal billet, when the cross section of the boring punch becomes large, a thickness of the body section of the container to be formed becomes thin. For this reason, the body section of the container easily ruptures during the hot dilation forming. Therefore, in the case of the relationship that the section of the boring punch vertical to the axial direction contains the projection image of the section of the metal billet vertical to the axial direction on the pressing forward side, it is necessary to suppress the cross section of the boring punch within a range that the body section of the container does not rapture.

FIGS. 4(a) through 4(e) are explanatory diagrams showing examples of another metal billet according to the first embodiment. As is clear from FIGS. 4(a) through 4(d), these examples satisfy a condition that the section 950 vertical to the axial direction on the pressing backward side 200a of the metal billet 200 contains the projection image 900 of the section vertical to the axial direction of the pressing forward side 200b (FIG. 3(c)).

Figure 4:
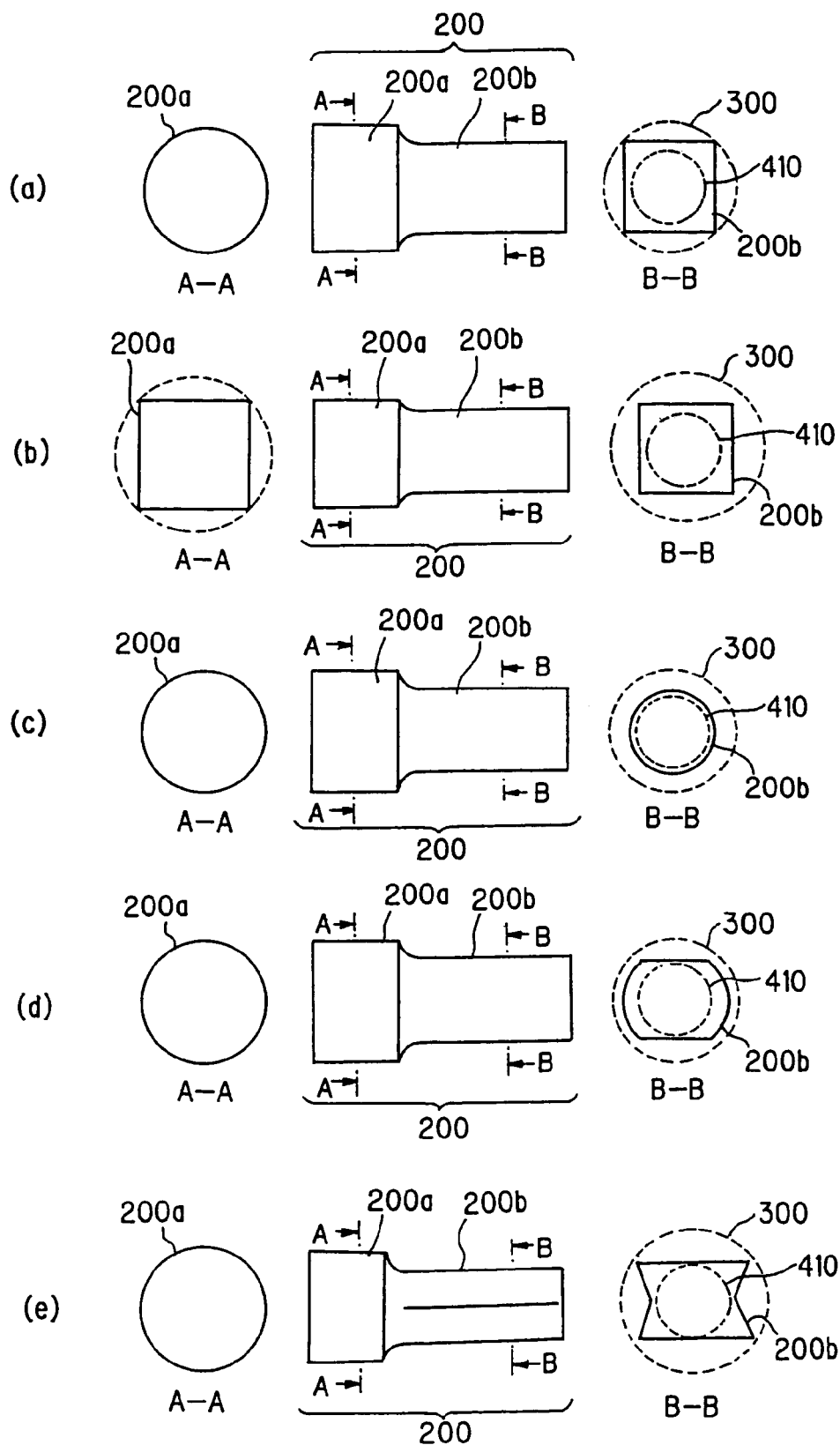
FIGS. 4(a) through 4(e) are explanatory diagrams showing another billet according to the first embodiment.

In the case where the section of the pressing forward side 200b is tetragonal as shown in FIGS. 4(a) and 4(b), the metal billet 200 is deformed by mainly a force which directs towards an outer side in the radial direction of the body section 300 of the container, namely, a force which bends the side surface of the metal billet having a plane to the inner wall side of the body section 300 of the container for forming at the time of the hot dilation forming.

Figure 5:
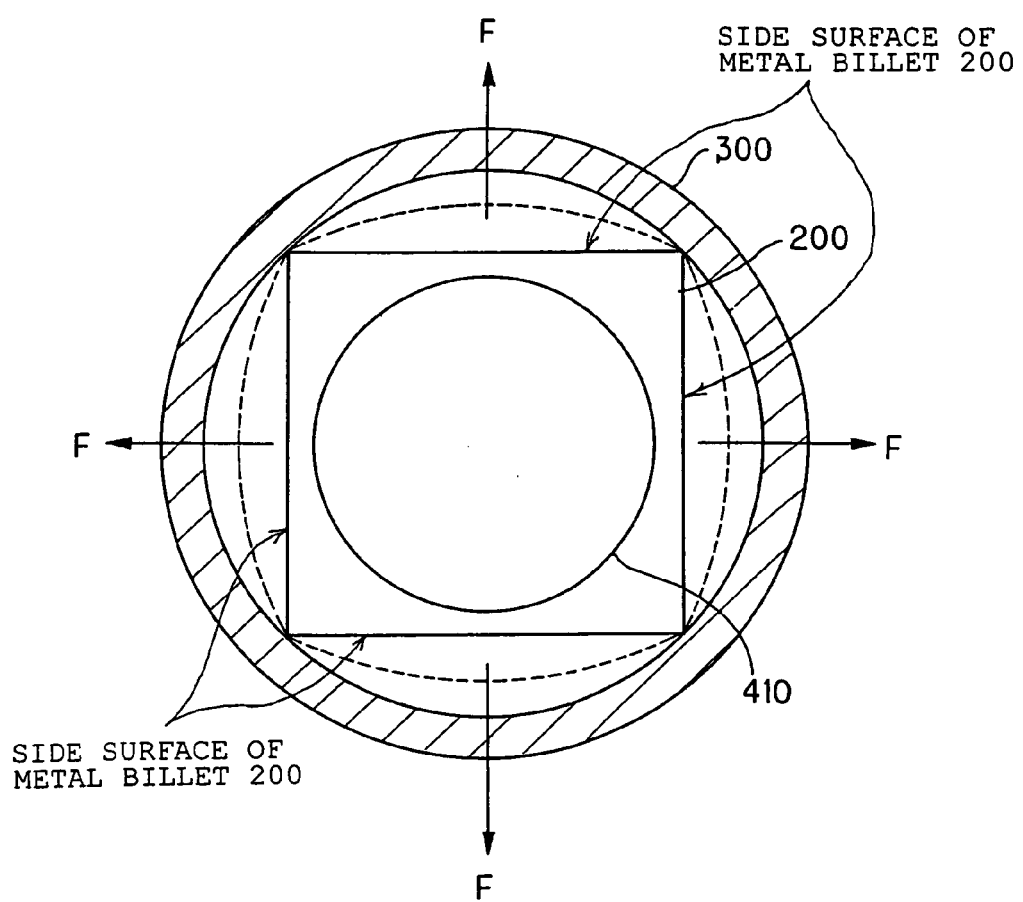
FIG. 5 is a conceptual diagram showing a state that a modified metal billet.

FIG. 5 is a conceptual diagram showing a state of the deformation. A broken line in the diagram shows a process that the metal billet 200 is expanded towards the inner wall of the body section 300 of the container for forming. In the case where section vertical to the axial direction is tetragonal, the boring punch is pushed into so that a force F, which directs from the center of the metal billet 200 to the outside in the radial direction of the body section 300 of the container for forming, acts. Since the force F bends the side surface of the metal billet 200 towards the inner wall of the container for forming, the metal billet 200 is dilated to the inner wall of the container for forming by this bending function. Particularly this bending function acts effectively when the metal billet having a plane on the side surface is set into the container for forming having a circular inside of the section.

Therefore, when the metal billet is dilated by the bending function, the hot dilation forming requires less press pressure, and defects such as a crack generated at the time of the forming can be suppressed. Even if the metal billet whose section vertical to the axial direction has a tetragonal shape is hot-dilated by using the boring punch whose section vertical to the axial direction has a tetragonal shape, the metal billet is dilated by the bending function. Therefore, also in this case, the hot dilation forming requires the less press pressure, and the defects such as a crack generated at the time of the forming can be suppressed.

In the case where the section vertical to the axial direction on the pressing forward side 200b is circular as shown in FIG. 4(c), the above-mentioned effect is slightly reduced, but the metal billet 200 has spaces between the pressing forward side 200b and the inner wall of the body section 300 of the container. Therefore, since the metal on the pressing forward side is dilated in the spaces at the time of the hot dilation forming, the dilating deformation of the metal billet is not constrained by the body section 300 of the container for forming, and the press pressure can be suppressed small. Moreover, in this case, when the metal billet is hot-dilated by using the boring punch whose section vertical to the axial direction has a tetragonal shape, the bending function acts. For this reason, the press pressure is less than the case where the metal billet is hot-dilated by using the boring punch having a circular section vertical to the axial direction.

As shown in FIGS. 4(a), 4(c) and 4(d), in the case where the section of the pressing backward side 200a vertical to the axial direction is circular and its diameter is substantially equal with the diameter of the body section 300 of the container, the extended section 201 formed on the body section 300 of the container for forming (see FIG. 3(b)) can be formed uniformly. Therefore, at the time of hot dilation forming, since the upsetting phenomenon of the metal billet 200 can be suppressed effectively by the extended section 201, the press pressure can be suppressed low, and the form of the end surface of the container after the forming can be satisfactory.

As shown in FIG. 4(b), in the case where the section of the pressing backward side 200a is tetragonal and its diagonal length is substantially equal with the diameter of the body section 300 of the container for forming, the extended section 201 is formed partially on the upper end of the body section 300 of the container. For this reason, in comparison with the case where the extended section 201 is not provided, the upsetting phenomenon of the metal billet 200 can be suppressed more effectively, but in comparison with the case where the extended section 201 is formed along the whole periphery of the upper end of the body section of the container for forming, this effect is slightly reduced.

Further, the metal billet, which is formed so that the form of the section vertical to the axial direction of the pressing forward side 200b or the pressing backward side 200a of the metal billet 200 is pentagonal (or more) or triangular, can also be applied to the manufacturing method according to the first embodiment. Moreover, as shown in FIGS. 4(d), when the side surface of the pressing forward side 200b has at least one or more planes, since this portion is hot-dilated by the bending, the press pressure can be suppressed low.

In addition, when a number of planes on the side surfaces of the metal billet 200 is not less than three, namely, the section of the metal billet 200 vertical to the axial direction is triangular or more, the press pressure can be suppressed lower. However, when a number of planes increases, namely, a number of angles of the polygonal section vertical to the axial direction increases, since the form of the polygonal section closes to a circle, the effect which suppresses the press pressure low is reduced. Therefore, it is desirable that a number of the planes of the side surface on the pressing forward side 200b is selected within the range that the press pressure can be suppressed low. Moreover, even in the case where the form of the section of the metal billet 200 vertical to the axial direction is of substantially drum as shown in FIG. 4(e), it is included in the metal billet of the present invention as long as the planes are provided on the side surface of the metal billet 200.

FIGS. 6(a) through 6(c) are perspective views showing another metal billet applicable to the first embodiment. The metal billet 200 is provided with a stepped section on the pressing forward side 200b so that it becomes thinner gradationally towards the pressing direction. As a result, at the time of the hot dilation forming, the timing that the metal of the pressing forward side 200b fills the vicinity of the bottom of the body section 300 of the container for forming can be slow. Therefore, particularly at the final state of the hot dilation forming, arise in the press pressure can be suppressed. Moreover, since slight flow to the pressing direction is formed by this stepped section, a forging degree of a molded form can be heightened, and shortage of forging materials can be prevented. Further, since a change of the section is gradate, the manufacturing becomes easier than the case where a taper, mentioned later, is provided. Here, a number of the stepped sections is not limited to the above example, but the number can be suitably increased or decreased according to a pressing condition and the like.

In addition, as shown in FIG. 6(b), even if the pressing forward side 200b is provided with a taper which becomes thinner towards the pressing direction, the function and effect which are similar to the case where the stepped section is provided on the pressing forward side 200b can be obtained.

Further, as shown in FIG. 6(c), when the metal billet 200 is manufactured, the extended section 201 which is engaged with the upper end portion of the container 300 for forming may be previously provided on the metal pressing backward side 200a. As a result, the step of forming the extended section 201, which is extended to the body section 300 of the container, on the pressing backward side 200a of the metal billet 200 of is not required before the hot dilation forming, and the container manufacturing steps can be simplified.

Figure 7:
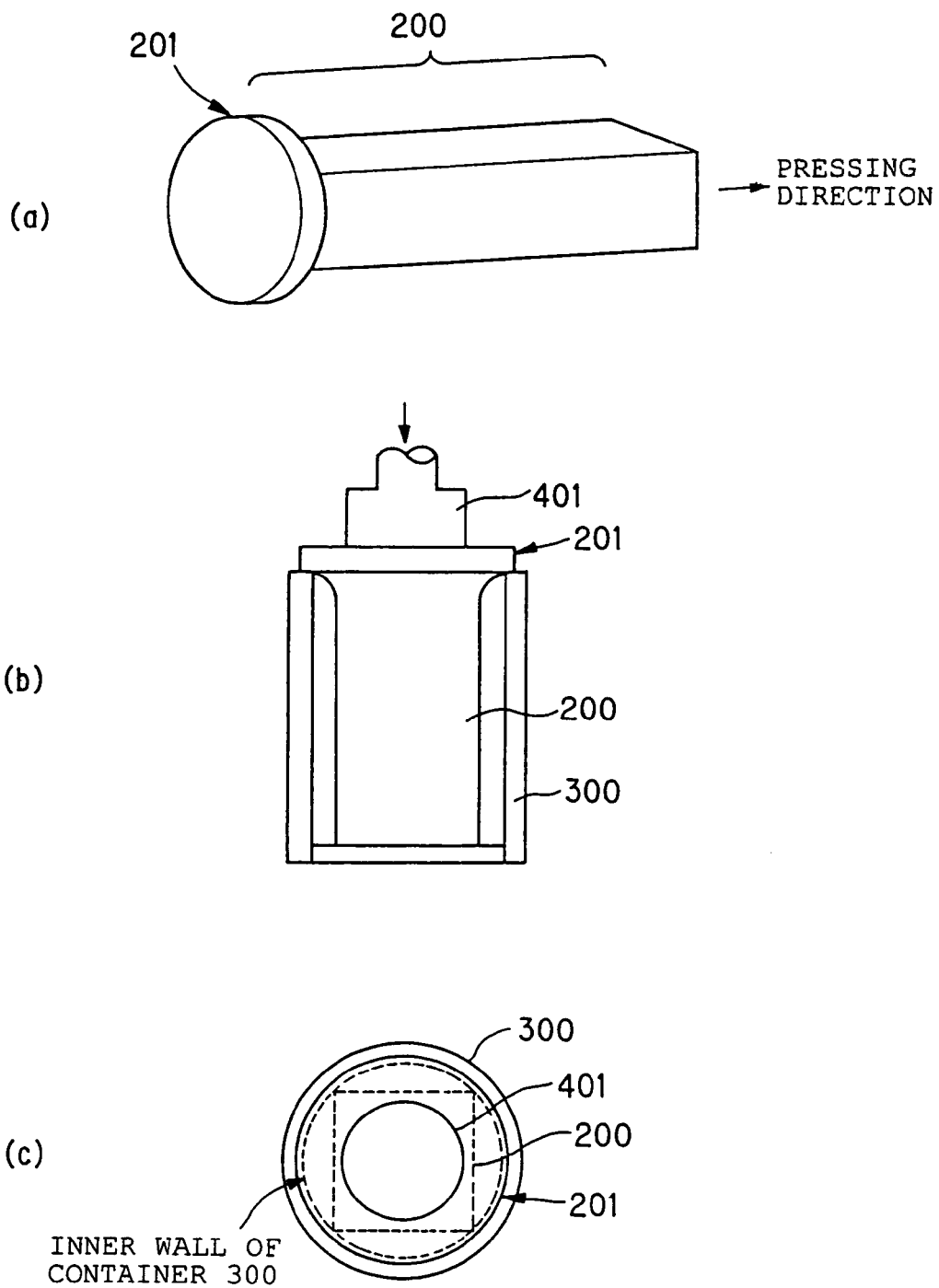
FIGS. 7(a) through 7(c) are explanatory diagrams showing another metal billet applicable to the first embodiment.

FIGS. 7(a) through 7(c) are explanatory diagrams showing another metal billet applicable to the first embodiment. As shown in the diagrams, the metal billet 200 is characterized in that the section vertical to the axial direction is constant along the pressing direction and the extended section 201 which is engaged with the upper end portion of the container 300 for forming is provided on its one end. Even in the case where such a metal billet 200 is used, since the upsetting phenomenon of the metal billet can be suppressed by the extended section 201 at the time of hot dilation forming, a rise in the press pressure can be suppressed. Here, the sectional form of the metal billet 200 is not limited to a tetragonal form, and it may be polygonal, and the side surface of the metal billet 200 may provided with at least one plane. Moreover, the extended section 201 may be previously provided on the metal billet 200, or the metal billet 200 is set into the container 300 for forming and the extended section 201 may be provided.

When the metal billet 200 is dilated to be deformed so as to be spread towards the inner wall of the container 300 (see FIGS. 2(d) and 2(e)), a friction force is generated between the metal of the metal billet 200 and the inner wall of the container 300. This friction force is caused by transfer of the metal of the pressing forward side 200b to the opposite direction to the pressing direction along the inner wall of the body section 300 of the container. Here, at the middle process of the hot dilation forming in the manufacturing method according to the first embodiment, this friction force is hardly generated. However, at the final stage of the hot dilation forming, since the metal fills the lower section of the container for forming, this friction force is generated. Due to this friction force, the body section 300 of the container for forming tries to move to the opposite direction to the pushing direction of the punch 410.

When the body section 300 of the container for forming and the bottom section 301 of the container for forming are fixed, the metal of the pressing forward side moves against the friction force, and at the final stage of the hot dilation forming, excessive load is required. In order to solve this problem, in the first embodiment, the body section 300 of the container for forming and the bottom section 301 of the container for forming can move relatively.

With such a structure, when the body section 300 of the container for forming tries to move to the opposite direction to the pushing direction of the punch 410 due to the friction force, the body section 300 of the container for forming also moves to the opposite direction to the pushing direction of the punch 410 together with the metal billet 200 to be formed (FIG. 2(e)). Namely, since the body section 300 of the container for forming and the metal billet 200 to be formed seldom move relatively, an increase in the load can be suppressed at the final stage of the hot dilation forming.

In the present embodiment, the body section 300 of the container for forming and the bottom section 301 of the container can move relatively, and also the body section 300 of the container for forming is divided so as to capable of moving along the whole metal billet 200. As a result, even in the case where the bottomed container which is long in the axial direction is formed, an increase in the load can be suppressed at the final stage of the hot dilation forming.

Figure 8:
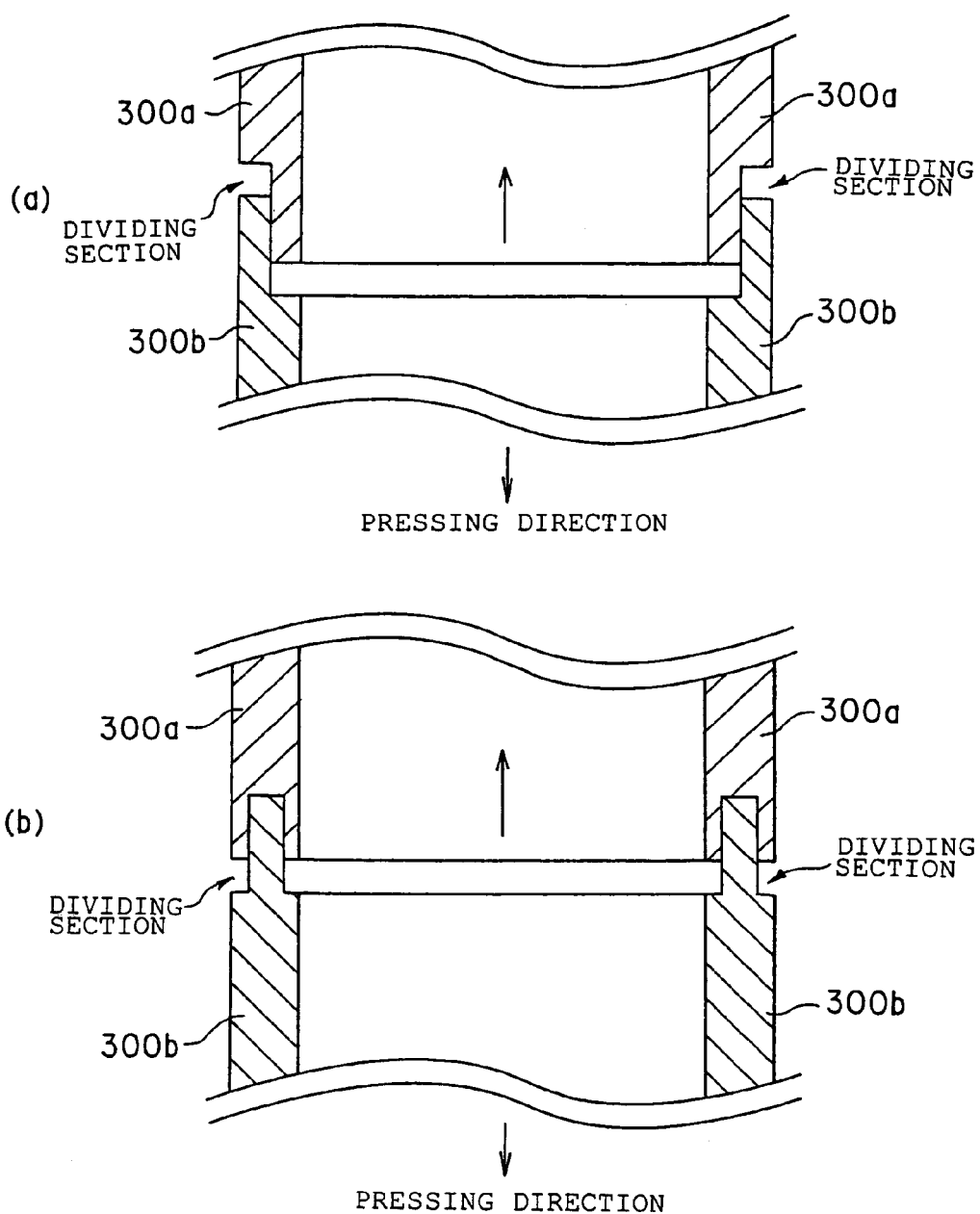
FIGS. 8(a) and 8(b) are sectional views showing divided parts of a body section of a container to be used in the first embodiment.

FIGS. 8(a) and 8(b) are sectional views showing divided sections of the body section 300 of the container for forming to be used in the first embodiment. The divided sections of the body section 300 of the container for forming may be constituted so as to be overlapped with each other as shown in FIG. 8(a) and the body sections 300a and 300b of the container for forming may move relatively at the time of hot dilation forming. Moreover, as shown in FIG. 8(b), a concave section is formed on the one body section 300a of the container for forming, and a convex section is provided on the other body section 300b of the container for forming so as to be combined. As a result, the body sections 300a and 300b of the container for forming may move relatively at the time of hot dilation forming.

In the present embodiment, the body section 300 of the container for forming is divided into two, but a number of divisions can be changed suitably according to the height of the metal billet 200. Moreover, the body section 300 of the container for forming is only divided, or the body section 300 of the container is not divided and the body section 300 and the bottom section 301 of the container for forming can only move relatively. As a result, an increase in the load can be suppressed at the time of hot dilation forming.

When the punch 410 is pushed into a set predetermined depth, the hot dilation forming is ended there (FIG. 2(e)). As shown in FIG. 2(e"), a cylindrical spacer 302 is placed instead of the bottom section 301 of the container for forming and the bottom section of the metal billet 200 is punched so that a drum can be formed by this manufacturing method. When the thick container whose length in the axial direction reaches a several meters is manufactured by the manufacturing method, since the press pressure can be reduced to a several part of the conventional press pressure, the container can be manufactured by the conventional facilities. Moreover, since the bottomed container in which the bottom section and the body section are integral with each other can be manufactured by one-time working, the manufacturing requires less steps, and this method is suitable also for mass production.

The metal billet 200 which was subject to the hot dilation forming is cooled to normal temperature by natural cooling, forced cooling or control cooling. In order that the sectional form is adjusted or the external shape or the internal shape of the formed container is finished to a predetermined dimension, the container may be subject to the cutting or the like.

Next, a result of the concrete example that an integrally cylindrical bottomed container is manufactured by the above-mentioned method will be shown. As a comparative example, a result of manufacturing the integrally cylindrical bottomed container by applying the Erhardt (elrhardt or Ehrhard) boring method which has been conventionally used is also shown.

In both the concrete example and the comparative example, the cylindrical container was formed by using a cylindrical container having an inner diameter of 943 mm. As a material of the cylindrical container, carbon steel in which a percentage of carbon (C) is 0.1% was used, but stainless steel may be used. Firstly after the metal billet of carbon steel was heated to 1250° C., it was forged into a metal billet in which its section in the axial direction has a T-shaped different diameter section by the free forging method. The pressing forward side of this metal billet has a quadrate section whose diagonal length is 875 mm smaller than an inner diameter of the container for forming, and a length of the axial direction is 1896 mm. The pressing backward side has a circular section having an outer diameter of 928 mm substantially equal with the inner diameter of the container for forming, and a length of the axial direction is574 mm. After the metal billet was again heated to 1250° C., it is set into the container for forming, and the center of the workpiece is hot-dilated by the punch so that an elongate cup-shaped cylindrical container having length of 2420 mm and thickness of 165 mm was formed.

Meanwhile, in the comparative example, the carbon steel which is the same as the concrete example was used as the material of the cylindrical container, and after the metal billet was heated to 1250° C., it was forged into an angular metal billet having uniform sectional form along the whole length of the axial direction was manufactured by the free forging method. The sectional form of this metal billet is quadrate, and a length of its diagonal is 928 mm which is substantially equal with the inner diameter of the container for forming. Moreover, a length of the axial direction is 2470 mm. After the metal billet was again heated to 1250° C., it was hot-dilated so that the cylindrical container whose size is the same as the concrete example was manufactured.

Table 1 shows evaluated results of the forming load and the end surface form in both the pressing methods. As is clear from the comparison, according to the manufacturing method of the present invention, the press forming load is smaller and the product yield is higher than the conventional manufacturing method. Moreover, since defective portions of the end surface form which are seen in the conventional manufacturing method seldom exist, the product can be finished by simple working after the hot dilation forming.

TABLE 1

EVALUATION RESULTS OF BOTH METHODS

| Method | Press forming load | Sectional form | Yield |
| --- | --- | --- | --- |
| Method of the Present Invention | 2400 ton | Satisfactory | 70% |
| Method of the Comparative Example | 3980 ton | Defective portions of form are generated | 60% |

Figure 9:
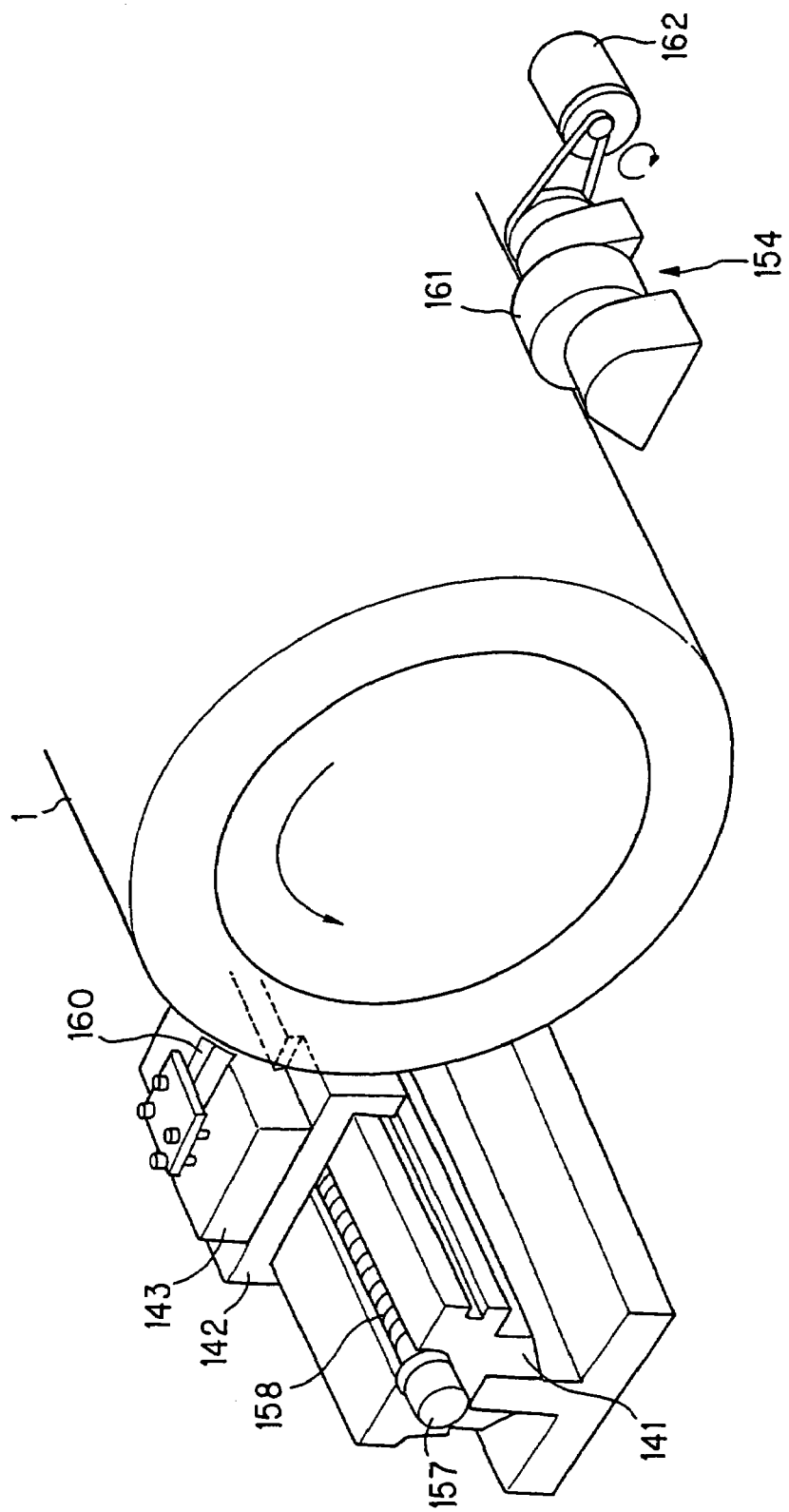
FIG. 9 is a schematic diagram showing an apparatus for cutting an outside of the bottomed container hot-dilated.

There will be explained below an example of cutting an outer side and an inner side of the bottomed container formed to be used as the radioactive substance container such as a cask or a canister. FIG. 9 is a schematic diagram showing an apparatus for cutting the outer side of the hot-dilated bottomed container. The bottomed container 1 is placed on a rotation supporting platform 154 having a roller and can be rotated freely in a circumferential direction. A fixing table 141 is provided on the outer side of the bottomed container 1, and a movable table 142 which slides on the fixing table in the axial direction of the bottomed container 1 is provided. A cutting tool 160 is attached to the movable table 142, and the cutting tool 160 cuts the outer circumference of the bottomed container 1.

A roller 161 attached to the rotation supporting platform 154 is connected to a motor 162. The rotation of the motor 161 is transmitted to the bottomed container 1 via the roller 161 so as to rotate the bottomed container 1. When the motor 161 rotates and the bottomed container 1 starts to rotate to a direction of an arrow in the diagram, a servo motor 157 and a ball screw 158 which are provided to the end portion of the fixing table 141 moves the movable table 142 to the axial direction of the bottomed container 1, and the cutting tool 160 attached to the movable table 142 cuts the outer circumference of the bottomed container 1. Moreover, when the outer circumference is cut by a face mill or the like so that a plane is provided, not only the bottomed container having a circular section vertical to the axial direction but also the polygonal bottomed container can be formed.

Figure 10:
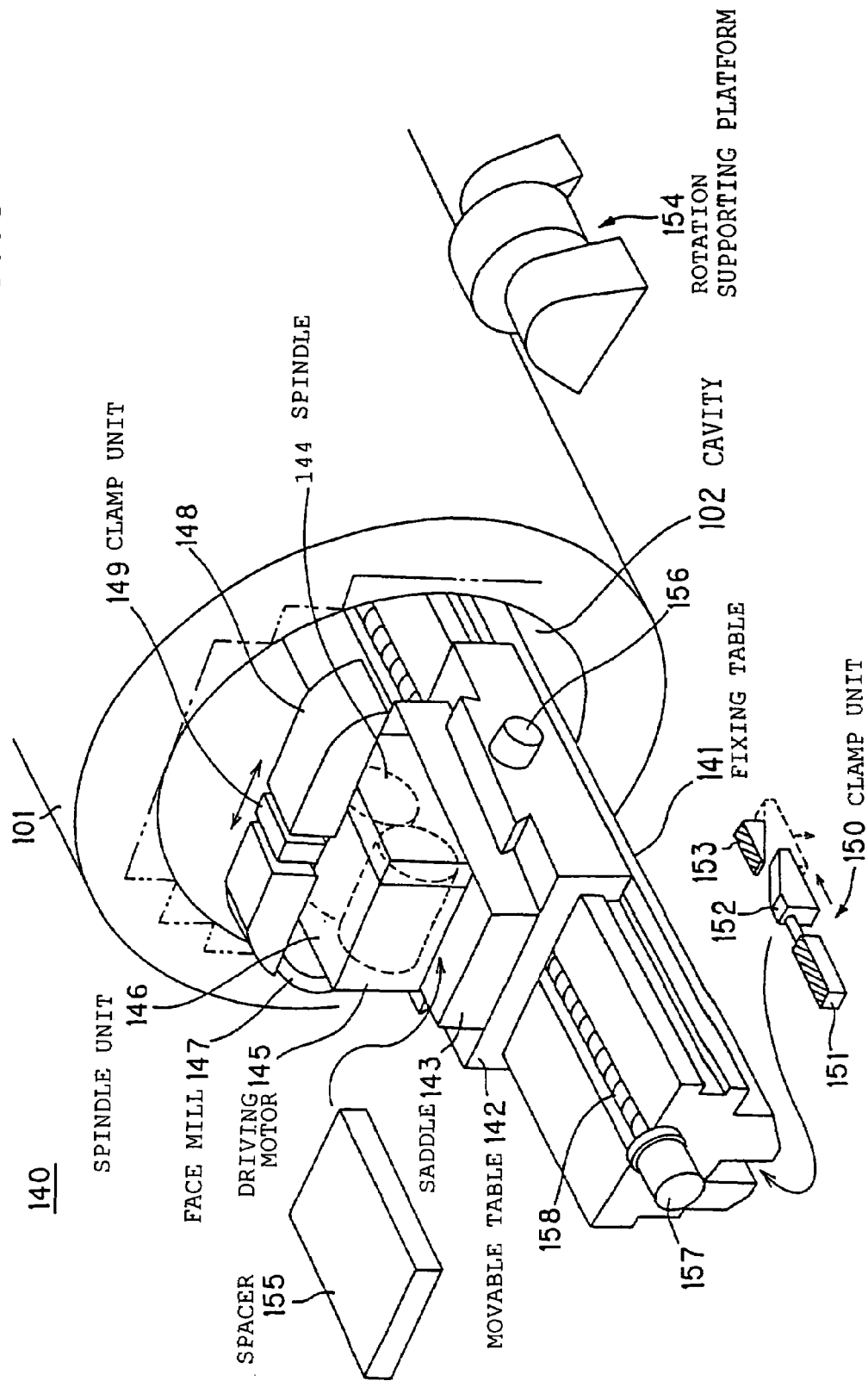
FIG. 10 is a schematic diagram showing an apparatus for working an inside of the bottomed container.

There will be explained below an example that the inner side of the formed bottomed container is cut. FIG. 10 is a schematic diagram showing an apparatus for working the inner side of the bottomed container. A machining apparatus 140 is composed of a fixing table 141 which pierces through a body 101 and is placed and fixed inside the bottomed container 1, a movable table 142 which slides on the fixing table 141 in the axial direction, a saddle 143 which is located and fixed onto the movable table 142, a spindle unit 146 which is composed of spindles 144 and a driving motor 145 provided on the saddle 143, and a face mill 147 provided on a spindle axis. Moreover, a reactive force receiver 148 which is formed with a contact portion according to the internal shape of the bottomed container 1 is provided on the spindle unit 146. The reactive force receiver 148 is detachable and slides along a dovetail groove (not shown) in a direction of an arrow in the diagram. Moreover, the reactive force receiver 148 has a clamp device 149 for the spindle unit 146, and is fixed to a predetermined position.

Further, a plurality of clamp devices 150 are attached into a lower groove of the fixing table 141. The clamp devices 150 is composed of a hydraulic cylinder 151, a wedge-shaped moving block 152 which is provided on an axis of the hydraulic cylinder 151, and a fixing block 153 whose tilt surface comes in contact with the moving block 152. The shaded portions in the diagram are attached to the groove inner surface of the fixing table 141.

When the axis of the hydraulic cylinder 151 is driven, the moving block 152 comes in contact with the fixing block 153, and the moving block 152 moves slightly downward due to the wedge effect (represented by dotted line). As a result, since the lower surface of the moving block 152 is pushed against the inner surface of a cavity 102, the fixing table 141 can be fixed inside the bottomed container 1.

In addition, the bottomed container 1 is placed on a rotation supporting platform 154 composed of a roller, and is freely rotated in a radial direction. Moreover, a spacer 155 is attached between the spindle unit 146 and the saddle 143 so that a height of the tool 147 on the fixing table 141 can be adjusted. A thickness of the spacer 155 is the same as a dimension of one side of an angular pipe composing the basket. A servo motor 156 provided on the movable table 142 is driven so that the saddle 143 moves in the radial direction of the body 101. The movement of the movable table 142 is controlled by a servo motor 157 and a ball screw 158 provided on the end portion of the fixing table 141. Here, as the working proceeds, the shape of the inside of the bottomed container 1 changes, and thus it is necessary that the reactive force receiver 148 and the moving block 152 of the clamp devices 150 are replaced by ones having suitable shape.

Figure 11:
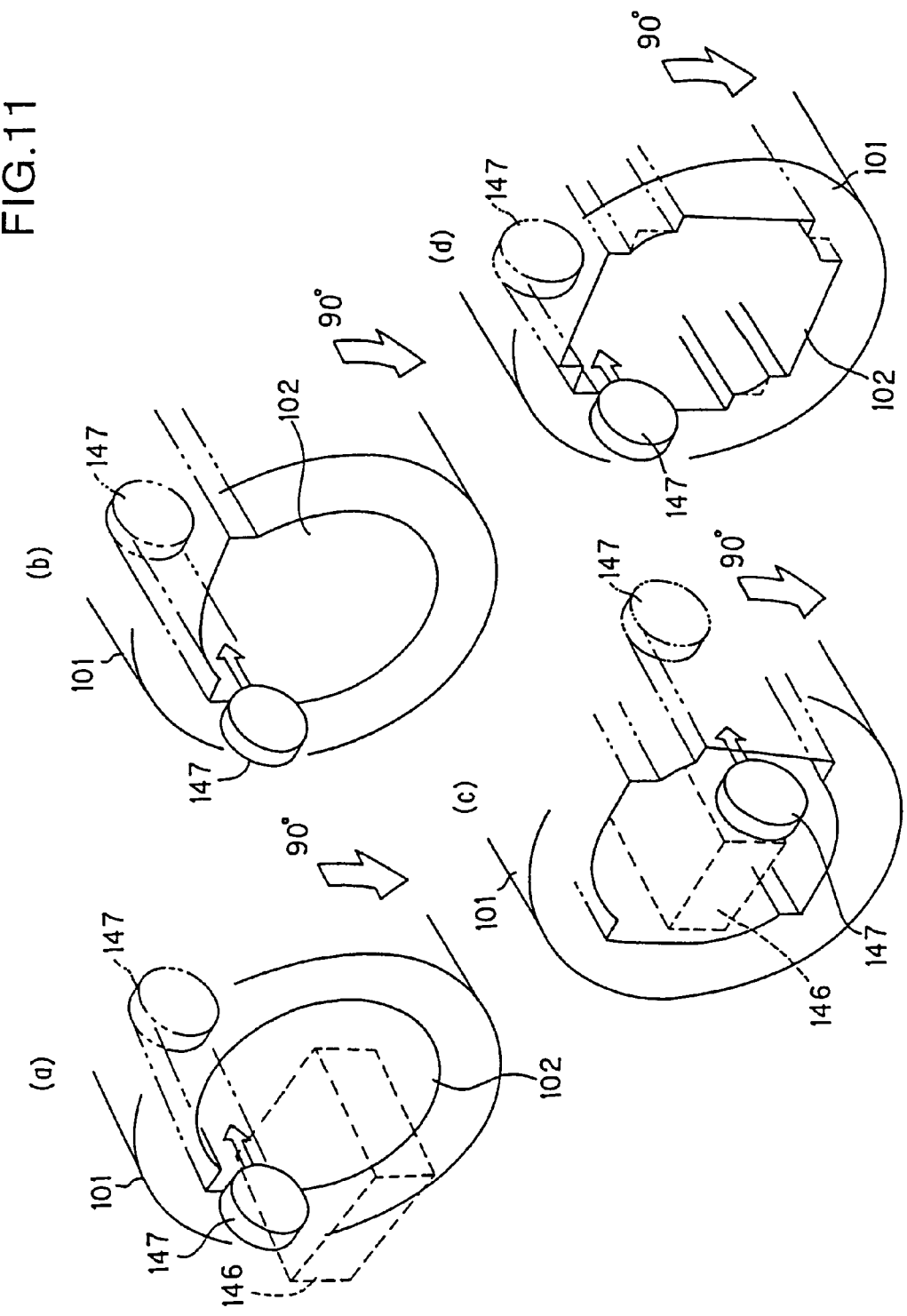
FIGS. 11(a) through 11(d) are explanatory diagrams showing one example of a method of working the inside of the bottom container.

FIGS. 11(a) through 11(d) are explanatory diagrams showing one example of the method of working the inner side of the bottomed container 1. Firstly the fixing table 141 is fixed to a predetermined position inside the bottomed container 1 by the clamp devices 150 and the reactive force receiver 148. As shown in FIG. 11(a), the spindle unit 146 is moved along the fixing table (not shown) at a predetermined cutting speed, and the inner side of the bottomed container 1 is cut by the tool 147. When the cutting in this position is finished, the clamp devices 150 are removed so that the fixing table 141 is released. As shown in FIG. 11(b), the body 101 is rotated through an angle of 90° on the rotation supporting platform 154, and the fixing table 141 is fixed by the clamp devices 150. Similarly the cutting is carried out by the tool 147. Thereafter, the similar steps are repeated twice.

Next, the spindle unit 146 is rotated through an angle of 180°, and as shown in FIG. 11(c), the inside of the cavity 102 is cut successively. Also in this case, similarly to the above-mentioned case, while the body 101 is being rotated through an angle of 90°, the working is repeated. Thereafter, as shown in FIG. 11(d), the spacer 155 is attached to the spindle unit 146 so that the height of the spindle unit is heightened. The tool 147 is fed in the axial direction in this position, and the inside of the bottomed container 1 is cut. This is repeated while the body 101 is being rotated through an angle of 90° so that a shape which is required for inserting an angular pipe (not shown) for containing used nuclear fuel is inserted is approximately finished. Here, the working can be carried out not only by a special machine but also by general horizontal boring machine and vertical boring machine.

The above explanation referred to the example that the bottomed container 1 is laid and the outer side and the inner side are cut. However, the bottomed container 1 stands upright and the outer side and the inner side of the container may be cut by a working machine, explained below.

Concretely, this working machine has a rotation table where a bottomed container to be worked is placed and the container is rotated, a crane for placing the bottomed container on the rotation table and moving it from the rotation table after the working, a movable table placed on a base, a saddle which is placed on the movable table and can move in a movable direction and a right angle direction of the movable table, a column which is placed on the saddle and supports an arm moving up and down, and the arm which is mounted to the column to be movable up and down in a vertical direction and has an attachment with a tool on its forward end and moves up and down with respect to a workpiece so as to work the workpiece. The attachment to be attached to the forward end of the arm is replaced so that this working machine can cope with various workings such as milling and boring.

When the bottomed container is started to be worked, the bottomed container as a workpiece is placed on the rotation table by the crane, it is centered and is fixed onto the rotation table. When the outside of the bottomed container is cut into a cylindrical shape, a cutting tool is mounted to the attachment attached to the arm, and while the rotation table is being rotated at a predetermined number of revolution, the bottomed container is cut by this cutting tool. Here, since the column to which the arm is attached is placed on the saddle, the saddle and the movable table are moved so that the arm can be moved. Therefore, the arm is moved to an arbitrary position, and an arbitrary cutting amount can be set. Moreover, since the arm can be moved up and down, the arm is moved along the axial direction of the bottomed container so that the whole side surface of the bottomed container can be cut. Since these movements require accuracy, it is desirable that the rotating movement of the servo motor or the stepping motor is converted into a linear motion by a ball screw or the likes and the movable table or the like is moved.

When the outer circumference of the bottomed container having circular sectional shape in a radial direction is cut and the container is desired to be worked into a polygonal shape such as an octagonal prism, an attachment for a face mill is attached to the arm, and the side surface of the bottomed container is cut by face milling cutting. When the arm is moved up and down and one surface of the bottomed container in the whole axial direction is cut, the rotation table is rotated through an angle of 45°, and a next side surface is worked. When this work is repeated eight times, the bottomed container whose external shape of the section in the radial section is octagonal can be manufactured. In such a manner, the bottomed container having an arbitrary polygonal section can be manufactured.

Figure 15:
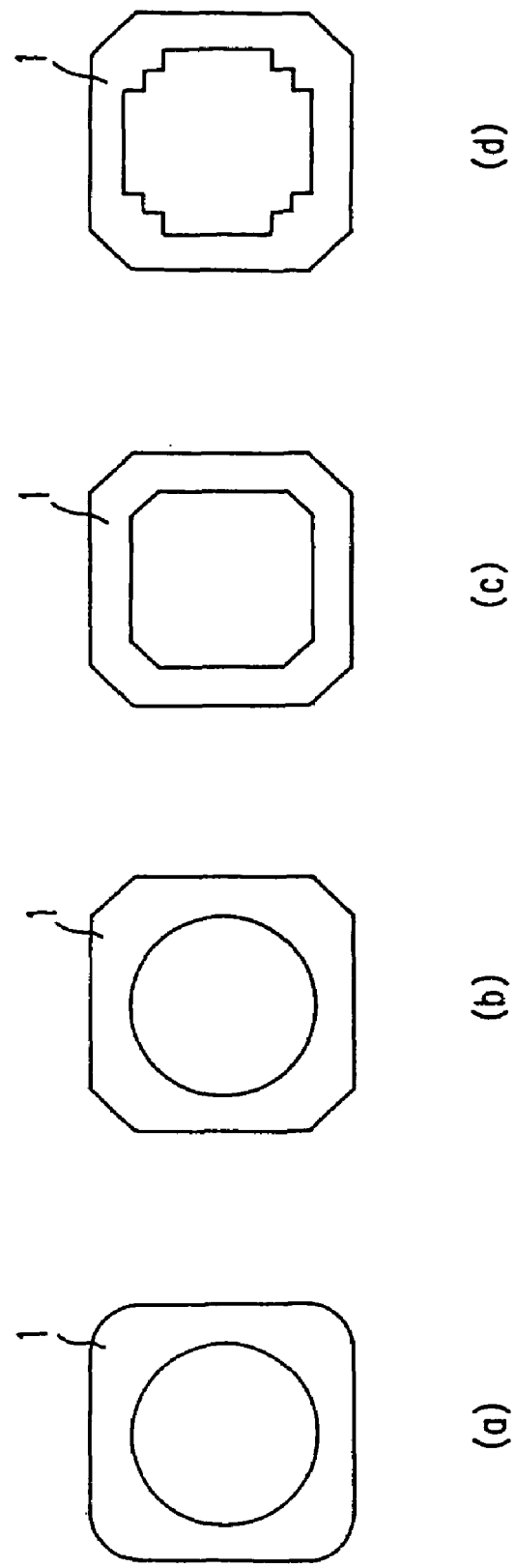
FIGS. 15(a) through 15(d) are sectional views vertical to the axial direction showing examples of the bottomed container formed by the manufacturing method according to the second embodiment.
Figure 16:
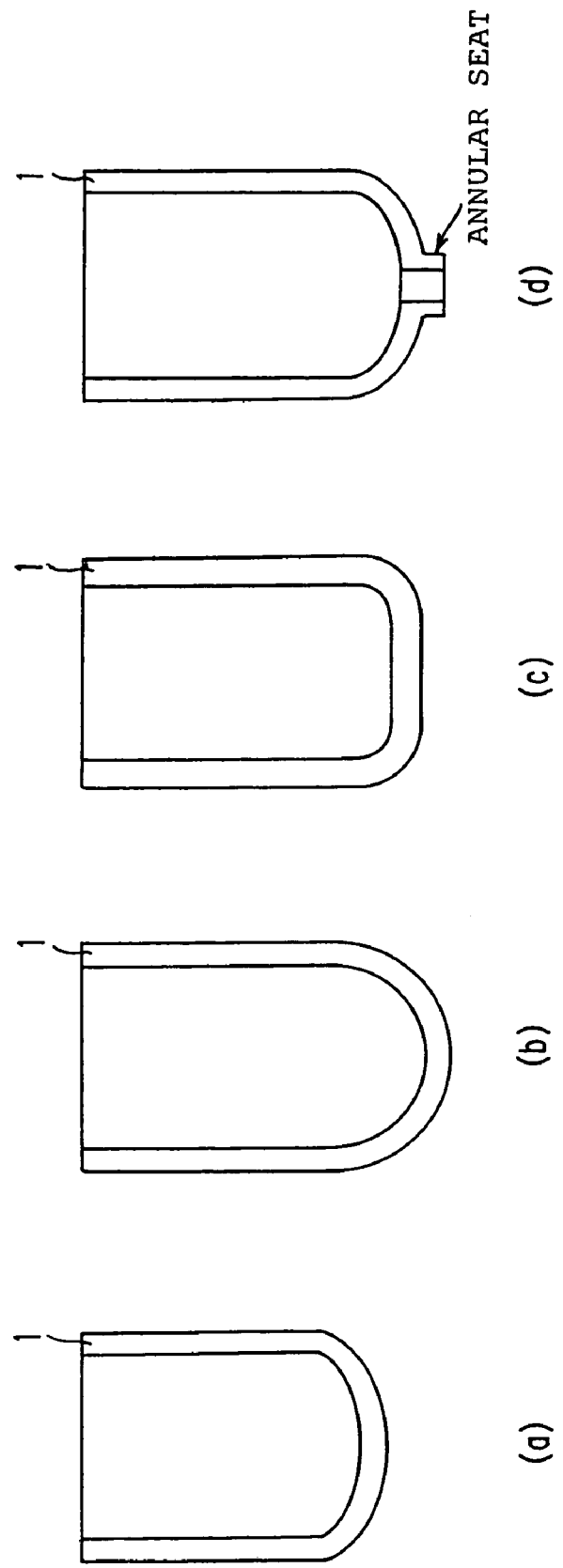
FIGS. 16(a) through 16(d) are sectional views showing a container body and a punch for manufacturing the bottomed container according to the second embodiment.

When the bottomed container is used as a cask for containing used nuclear fuel, it is desirable that the internal shape of the bottomed container matches with at least one part of the outer periphery of a basket for containing used nuclear fuel aggregate. This is because the basket can be easily inserted and fixed into the container. Such a sectional shape is shown in FIG. 15(d), for example. In order to form the inner side of the bottomed container into such a shape, the attachment to be mounted to the arm is replaced by one for end mill, for example, and an angular portion inside the section is worked into a stepped form.

Firstly, the saddle and the movable table are moved, the arm is moved to above the bottomed container placed on the rotation table. Next, the arm is lowered and the attachment with the end mill is inserted into the bottomed container so that the end mill is located. Thereafter, the inner side of the bottomed container is cut with a predetermined cutting amount. The cutting is given to the bottomed container some times and its inner side is cut, and when a predetermined shape is obtained, the cutting at the first stage is finished. When the necessary stepped form is obtained at one angular portion, the rotation table is rotated through an angle of 90°, and a next angular portion is worked. When this work is repeated four times, the bottomed container for the cask having the sectional shape in the radial direction as shown in FIG. 15(d) can be manufactured.

Here, when the inner side of the bottomed container is cut, since there is not space for cutting chips and cutting oil, the cutting cannot be carried out during the working. For this reason, it is desirable that the cutting chips and the like are removed from the inner side of the on-working bottomed container by discharging means such as a vacuum pump.

When the bottomed container is cut with it is in the upright state, the process for the cutting chips and the like is required unlike the case of the laid state, but an influence of deformation due to gravity can be reduced. When this working machine is inverted to be constituted, since the bottomed container is worked with its opening faces downward, when the inner side of the bottomed container is cut, the cutting chips and the like can be easily discharged.

Figure 12:
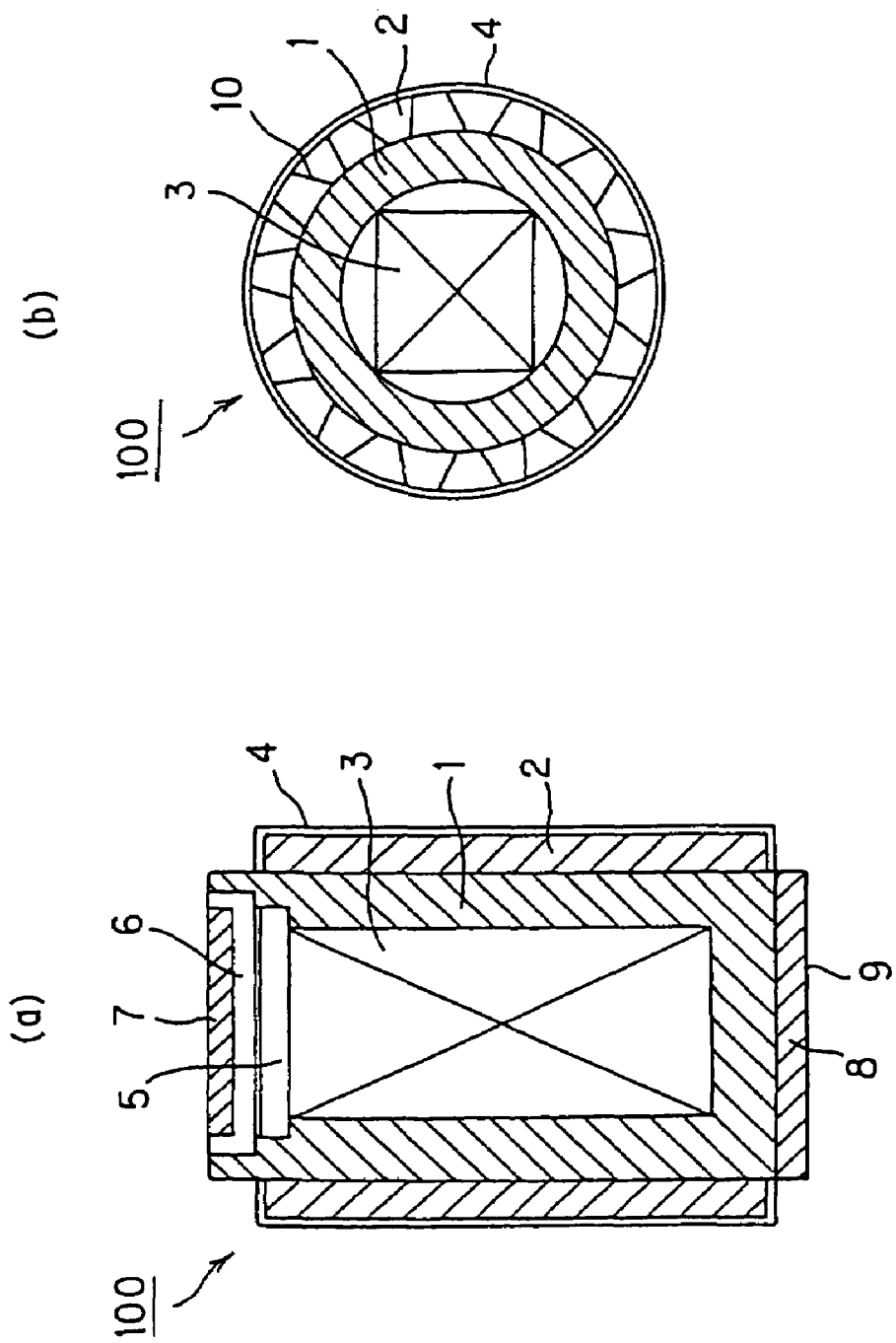
FIGS. 12(a) and 12(b) show a cask according to the embodiment of the present invention.

There will be explained below an example that the bottomed container manufactured by the method of the present invention is applied to the cask as the used nuclear fuel container. FIGS. 12(a) and 12(b) show the cask according to the embodiment of the invention: FIG. 12(a) is an axially sectional view; and FIG. 12(b) is a radially sectional view. The cask 100 is composed of a bottomed container 1 having a basket 3 in its inner side, a neutron shielding material 2 such as resin or silicone rubber provided on the outer side of the bottomed container 1, and an outer drum 4 to be the outer surface of the cask 100. The bottomed container 1 is formed with the inner side and the outer side by the above-mentioned cutting.

A primary cover 5 and a secondary cover 6 are provided on the upper section of the bottomed container 1, and resin 7 for shielding neutron is sealed into the secondary cover 6. Moreover, the bottomed container 1 has a cylindrical shape with a bottom formed by punching draw working, and is made of carbon steel or stainless steel having γ rays shielding function.

The neutron shielding material 2 is a polymeric material containing a lot of hydrogen and has a neutron shielding function. Moreover, a shielding body 9 into which a neutron shielding material 8 such as resin or silicone rubber is sealed is mounted to the lower section of the bottomed container 1. The basket 3 is constituted so that cells for containing used nuclear fuel aggregate (no shown) are arranged in a lattice form, and is composed of a composite martial of boron and aluminum.

In addition, in order to secure sealing performance for a pressure resistant container, a metal gasket is provided between the primary cover 5, the secondary cover 6 and the bottomed container 1. A plurality of internal fins 10 made of copper for heat conduction are welded between the bottomed container land the outer drum 4, and the neutron shielding material 2 is poured into spaces formed by the internal fins 10 in a flow state and is heated to be solidified. The primary cover 5 and the secondary cover 6 are made of carbon steel or stainless steel having γ rays shielding function.

Since the cask 100 uses the bottomed container 1, in comparison with the conventional case where a bottom plate is welded, the manufacturing steps can be reduced. Moreover, since a bottom plate was conventionally welded to the bottomed container, the sealing property of the welded portion depends upon the quality of the welding, but a problem of the sealing property on this welded portion in the bottomed container 1 is extremely low. Here, in order to realize the cask 100 of the present invention, shape and material of the basket 3, a charging state of the neutron shielding material 2, and a number and positions of the internal fins 10 in the bottomed container 1 are not limited to the example shown in FIGS. 12(a) and 12(b).

The method of manufacturing the bottomed container according to the first embodiment is suitable for manufacturing a so-called thick container having a thickness with respect to the diameter of the cylinder. Further, the manufacturing method of the present invention is suitable particularly for the case where a container, in which a ratio of the axial length to the inner diameter is 1:1 or more, is manufactured in the thick containers. When the ratio exceeds the above-mentioned numerical value, as the forming proceeds in general hot working, the press pressure increases, but in the manufacturing method according to the embodiment the press pressure does not greatly increase at the beginning and the end of the working. Concretely, the manufacturing method according to the embodiment is particularly suitable for the case where a cask or the like as a large bottomed container, in which the thickness is thick with respect to the diameter and the axial length reaches a several meters, is manufactured.

In order to manufacture such a large and thick bottomed container with its bottom integral, a several ten-thousand ton scale pressing machine was conventionally required. However, when such a so-called thick and large bottomed container is manufactured by the manufacturing method of the present invention, the press pressure of only about ten-thousand ton is required. For this reason, even if a pressing machine of several ten-thousand ton is not used, the bottomed container can be formed by an existing large pressing machine. Moreover, since the formed container has excellent sectional form and defects do not occur on the surface and the inner side, adjustment after the forming is seldom required. Here, the manufacturing method of the present invention is not limited to such a thick and large bottomed container, and a canister as a radioactive substance container with comparatively thin thickness can be manufactured by this method.

In addition, with the manufacturing method of the present invention, a cylinder for a large pressing machine, a container for chemical plant, a reactor container for petroleum refining plant, an ammonia synthetic cell, a heat exchange container, a pressure container such as a boiler, a casing for a large rotational equipment for containing a hydroelectric water turbine, a body of submarine and ship can be manufactured. Moreover, the material which can be used in the method of the present invention is not limited to carbon steel, and the material includes iron materials such as stainless steel, low alloy steel and the like, nonferrous metal such as nickel alloy, aluminum metal, copper metal and magnesium metal.

Second Embodiment

Figure 13:
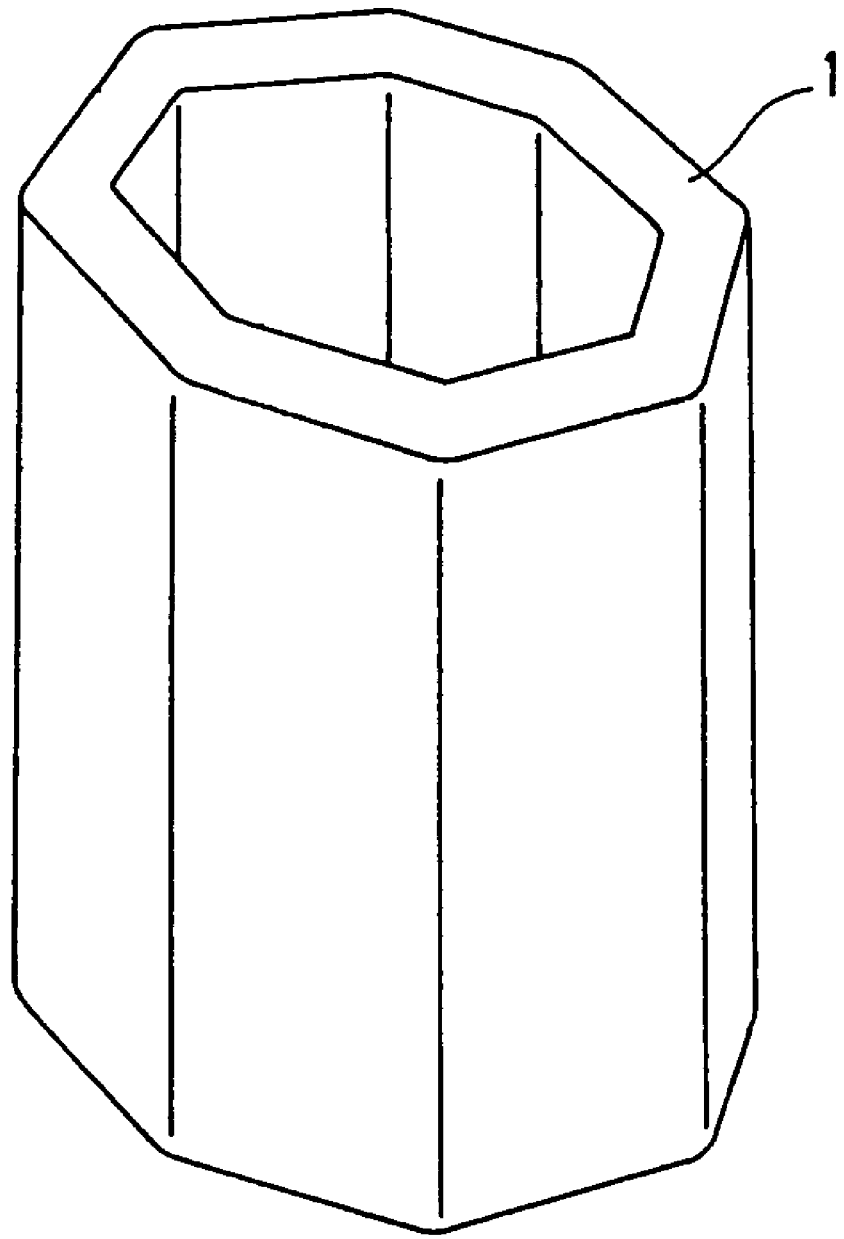
FIG. 13 is a perspective view showing the bottomed container according to a second embodiment.

FIG. 13 is a perspective view showing the bottomed container according to a second embodiment of the present invention. The bottomed container 1 shown in FIG. 13 is characterized in that its external shape and internal shape are octagonal. Moreover, at least one of the external shape and the internal shape of the container may be octagonal. Since a basket for supporting a fuel bar aggregate is housed in the bottomed container of the cask as a radioactive substance container, it is preferable that the internal shape of the bottomed container is formed into a shape which matches with the basket particularly in a cask. Therefore, the internal shape of the cask is desirably octagonal instead of circular. Moreover, in the case where the internal shape of the cask is octagonal, since it is advantageous to a dimension and a weight that the thickness of the cask body is uniform as much as possible, it is desirable that the external shape of the cask body is also octagonal. This bottomed container can cope with such requirements.

FIGS. 14(a) and 14(b) are sectional view showing the container body and a punch for manufacturing the bottomed container according to the second embodiment. A sectional shape of the inside of a body section 300 of the container for forming is substantially octagonal, and the external shape of the boring punch 410 is also substantially octagonal. When the body section 300 of the container for forming and the boring punch 410 are used in the hot dilation forming described in the first embodiment, an increase in the load at the time of the hot dilation forming is suppressed, and defects on a surface of a workpiece is suppressed after the forming, and the bottomed container having excellent end surface shape and a polygonal section can be manufactured.

FIGS. 15(a) through 15(d) are sectional views vertical to the axial direction showing examples of the bottomed container capable of being formed by the manufacturing method according to the second embodiment. The section of the body section of the container for forming and the external shape of the boring punch are changed suitably so that the bottomed container having such a sectional shape can be formed. It is desirable that particularly the boring punch 410 for forming the internal shape of the cask is changed suitable according to the shape of the basket for containing used nuclear fuel. When the boring punch whose external shape is the internal sectional shape shown in FIG. 15(d) is used, for example, the internal shape can be formed according to the shape of the basket.

FIGS. 16(a) through 16(d) are axially sectional views showing examples of the bottomed container capable of being formed by the manufacturing method according to the second embodiment. The internal shape of the bottom section of the container 300 for forming and the forward end shape of the boring punch 410 match with the shape of the bottom of the bottomed container so that these containers can be formed. The container shown in FIG. 16(d) may be bored on the bottom section after the forming, or may be formed by the boring punch provided with a protrusion at its forward end. The container formed in such a manner can be used as a container, in which its bottom section formed integrally with the body section requires not a plane but a curved surface. For example, this container can be applied to a casing and the like for a large rotating equipment for containing a hydroelectric water turbine.

Third Embodiment

Figure 17:
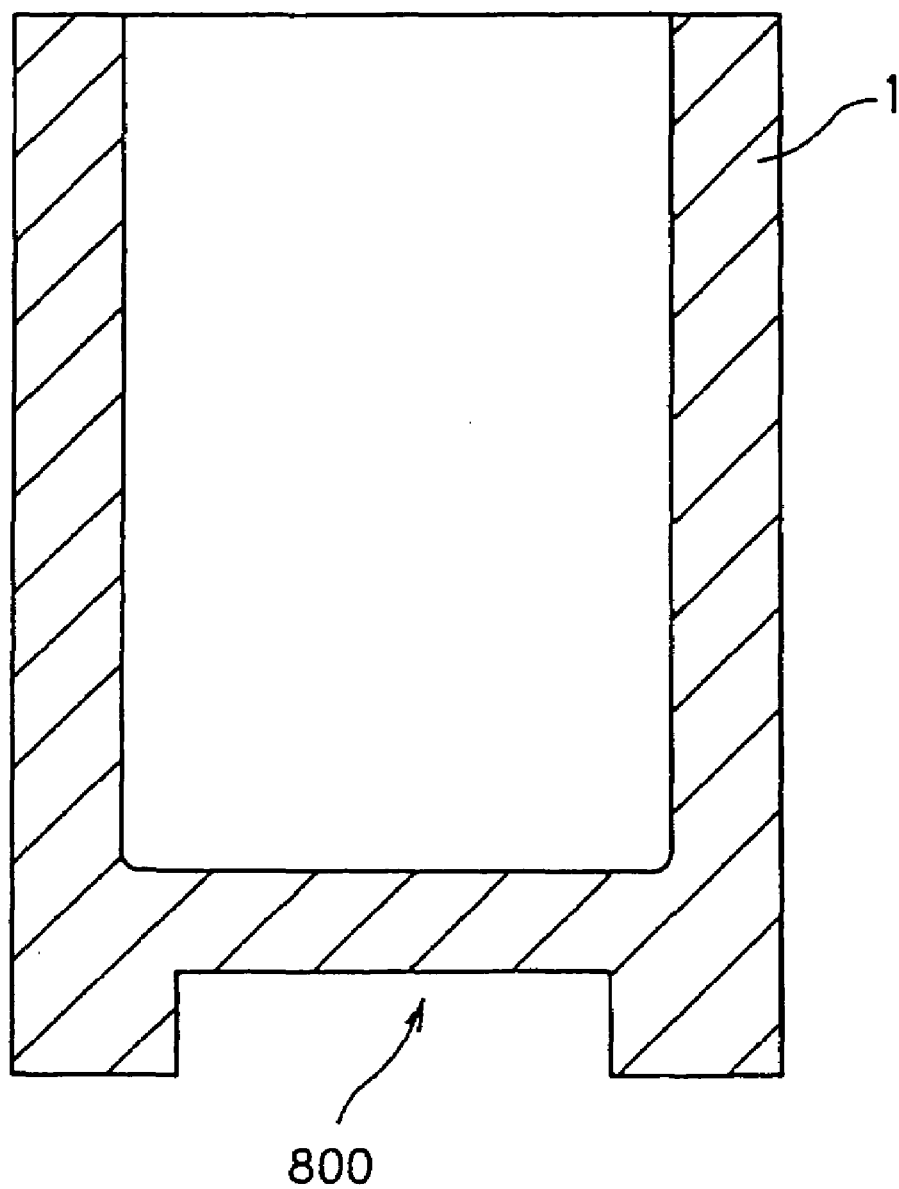
FIG. 17 is an axially sectional view showing the bottomed container according to a third embodiment.

FIG. 17 is a axially sectional view showing the bottomed container according to a third embodiment. The bottomed container 1 is characterized in that a body and a bottom are formed integrally and a spot facing section is also formed on the bottom of the container. The bottom provided with the spot facing section was conventionally mounted to a thick cylinder by welding, but in the manufacturing method, besides the step of providing the spot facing section on the bottom, the welding step and the heat treating step after the welding are required. For this reason, there arises a problem that the manufacturing requires troublesome steps. According to the method of manufacturing a bottomed container of the present invention, since the bottom provided with the spot facing section can be formed integrally with the body by one step, there is an advantage that the manufacturing becomes very easy.

Figure 18:
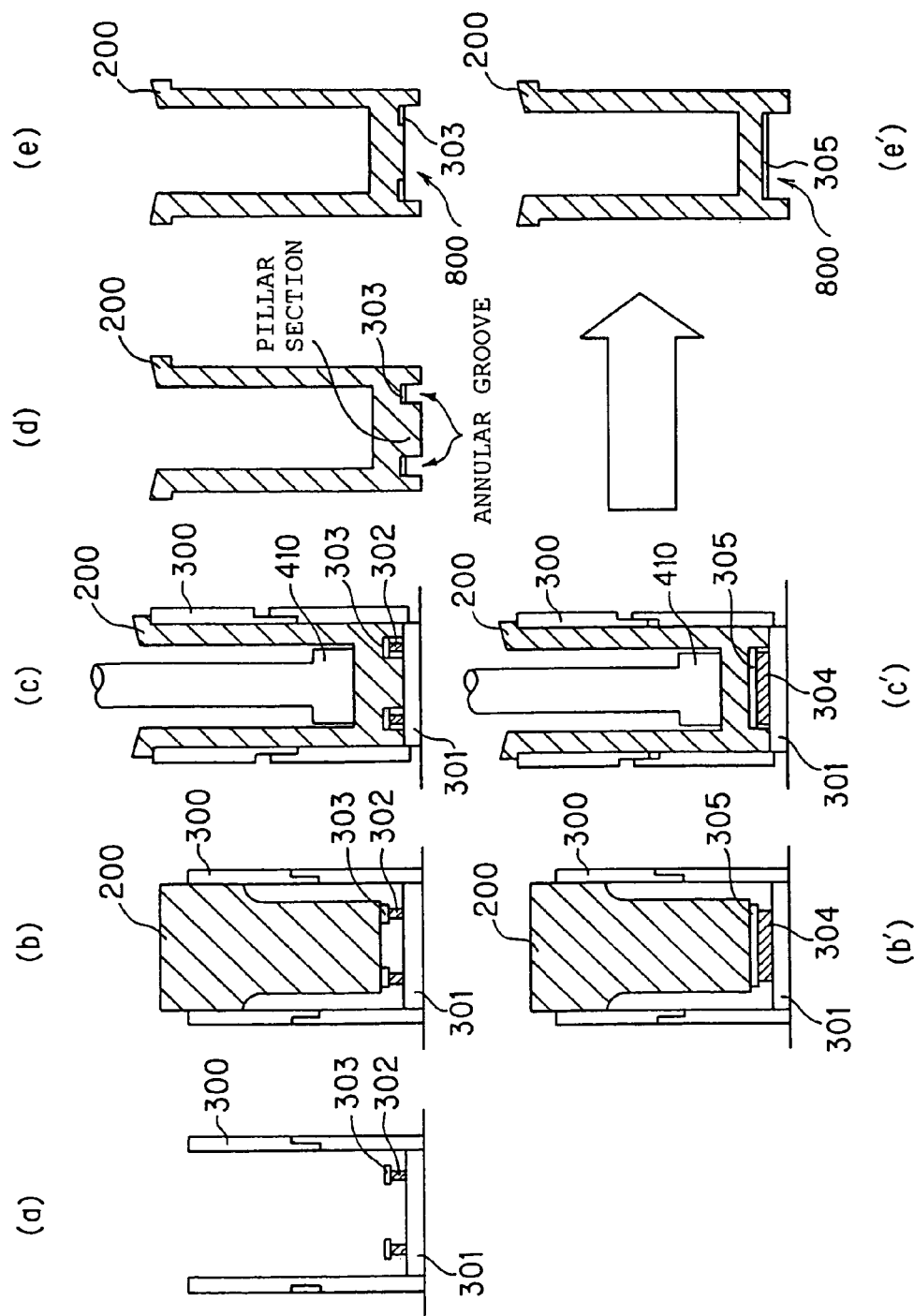

FIGS. 18(a) through 18(e), 18(b'), 18(c') and 18(e') are explanatory diagrams showing a method of providing the spot facing section 800 on the bottomed container. As shown in FIG. 18(a), before the punch 410 is pushed into so that the hot dilation forming is carried out, a cylinder 302 which is a cylindrical member is previously provided on the bottom section 301 of the container for forming. Here, the spot facing section 800 can be formed only by the cylinder 302, but in order to easily taken out the cylinder 302 after the metal billet 200 is formed, an annular metal plate 303 may be previously placed on the upper section of the cylinder 302 (see FIG. 18(a)). The annular metal plate 303 is constituted so that its radial width is slightly larger than a radial width of the cylinder 302. As a result, after the metal billet 200 is formed into the bottomed container, the cylinder 302 can be taken out easily. In this case, the annular metal plate 303 is fitted into the bottom section after the bottomed container is formed.

When the spot facing section 800 is formed only by the cylinder 303, it is desirable that the diameter of the cylinder on a side coming in contact with the metal billet 200 is smaller than the diameter of the cylinder on a side coming in contact with the bottom section 301 of the container 300 for forming. Namely, it is desired that a taper is provided on the cylinder 302 so that the diameter of the cylinder 302 becomes larger towards the pressing direction. As a result, the cylinder 302 is removed from the metal billet 200 which was subject to the hot dilation forming.

The metal billet 200 is set into the body section 300 of the container and is placed on the cylinder 302 and the annular metal plate 303 (FIG. 18(b)), and the punch 410 is pushed into the billet 200 so that the metal billet 200 is hot dilated into the shape of the bottomed container (FIG. 18(c)). As shown in FIG. 18(d), an annular groove is formed on the bottom section of the metal billet 200 formed in such a manner by the cylinder 302 and the annular metal plate 303. In this state, only a simple annular groove is provided, and thus a column section as a pillar section existing in the annular groove is cut by cutting means (not shown) such as gas burner in order to form the spot facing section 800. As a result, the bottomed container having the spot facing section 800 on the bottom section can be manufactured (FIG. 18(e)). The spot facing section 800 may be finished by cutting or the like as the need arises.

In addition, as shown in FIG. 18(b'), a column 304 is used instead of the cylinder 301 so that the spot facing section 800 can be formed on the bottom section of the bottom container.

Also in this case, the metal plate 305 is placed on the column 304 so that the spot facing section 800 can be formed (FIG. 18(c')). In the case where the column 304 is used, unlike the case of using the cylinder 302, the bottomed container is formed and simultaneously the spot facing section 800 can be formed on its bottom section (FIG. 18(e')). For this reason, the step of cutting the column section shown in FIG. 18(d) is not required, but the press pressure which is larger than the case of using the cylinder 302 is required. Therefore, the performance of the pressing machine, a size of the bottomed container to be produced and the like are taken into consideration, and it is desirable that a determination is made as to which is used the cylinder 302 or the column 304.

Here, in the case where the spot facing section 800 is formed only by the column 304, it is desirable that a taper which becomes larger towards the pressing forward side is provided. Namely, it is desirable that the axial section of the column 304 is trapezi form. As a result, the column 302 is easily removed from the metal billet 200 which was subject to the hot dilation forming.

The shapes of the sections of the cylinder 302 and the column 304 vertical to the axial direction are changed so that the spot facing section 800 having a desired sectional shape can be formed. For example, the shape of the section vertical to the axial direction is polygonal so that the spot facing section 800 whose internal surface shape is polygonal can be formed. As a result, since the spot facing section can be formed according to the external shape of the bottomed container, the thickness of the spot facing section in the radial direction can be kept constant.

Figure 19:
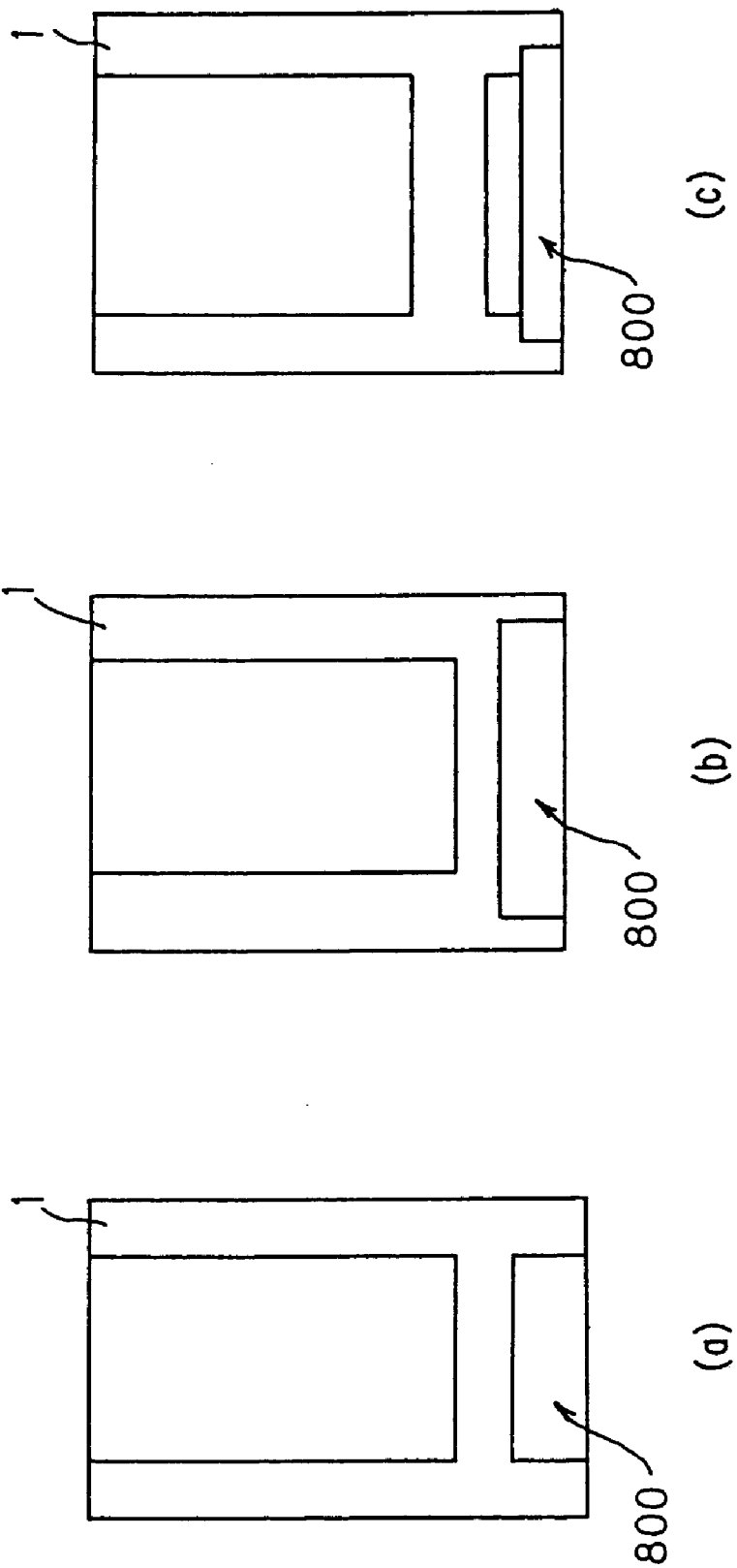
FIGS. 19(a) through 19(c) are axially sectional views showing examples of the bottomed container formed by the manufacturing method of the present invention.
Figure 21:
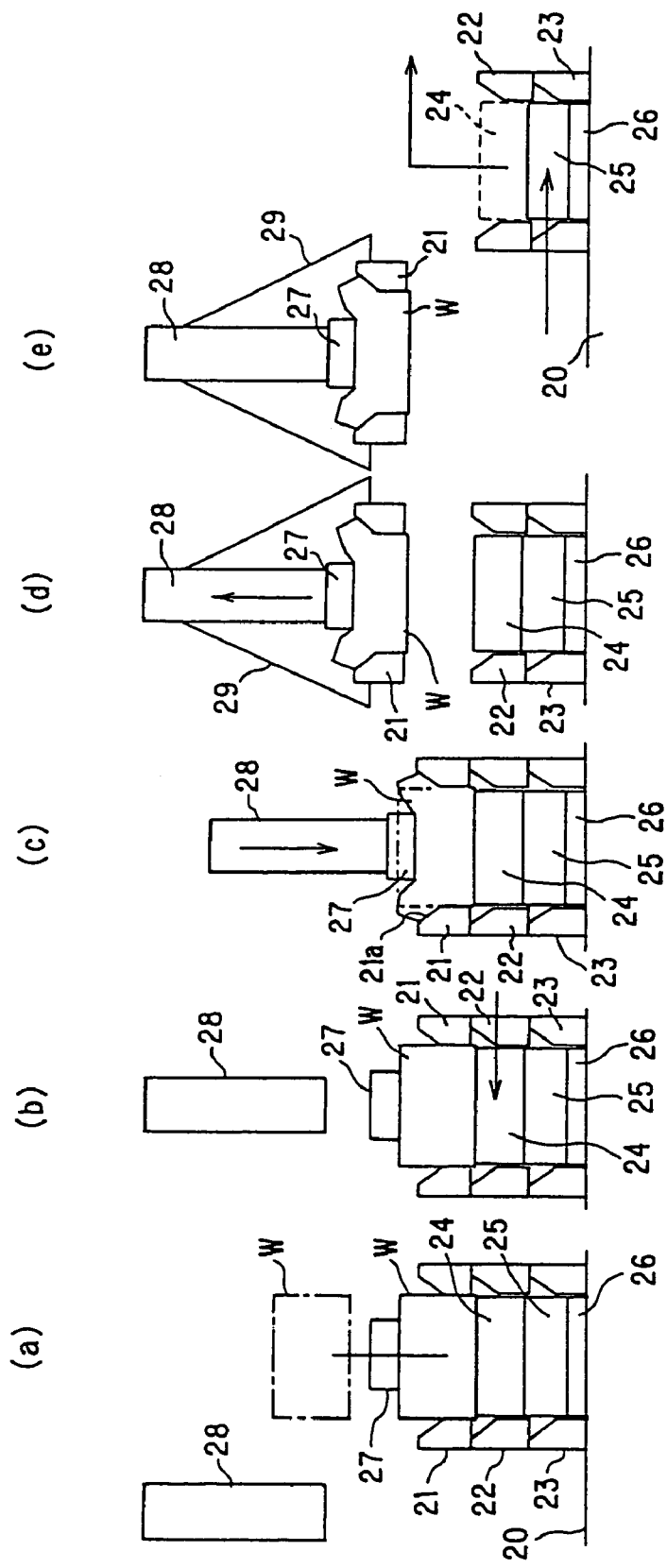
FIGS. 21(a) through 21(e) are explanatory diagrams showing the steps of manufacturing the bottomed container shown in FIGS. 12(a) and 2(b)
Figure 22:
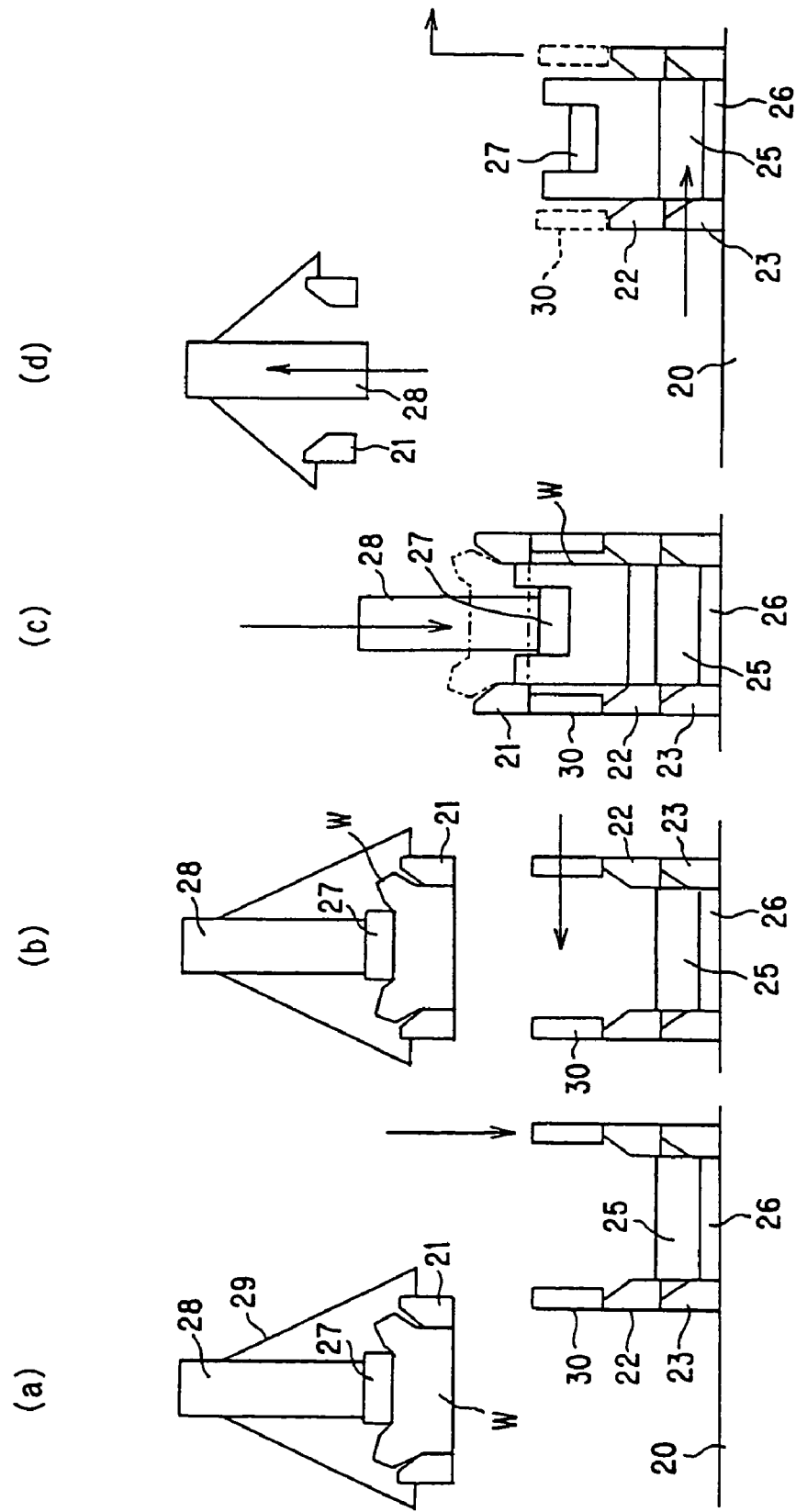
FIGS. 22(a) through 22(d) are explanatory diagrams showing the steps of manufacturing the bottomed container of the cask shown in FIGS. 12(a) and 12(b)
Figure 23:
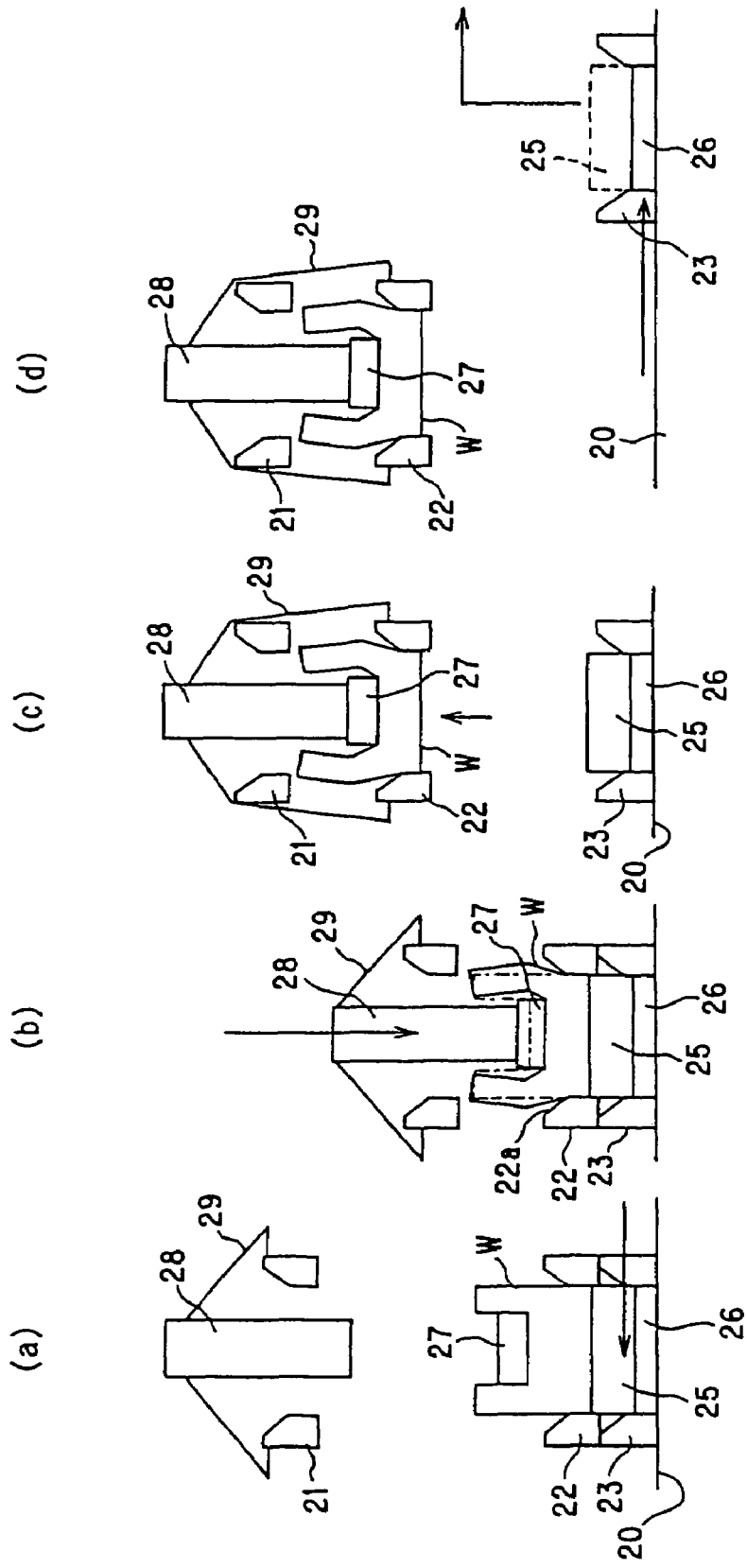
FIGS. 23(a) through 23(d) are explanatory diagrams showing the steps of manufacturing the bottomed container of the cask shown in FIGS. 12(a) and 12(b)
Figure 24:
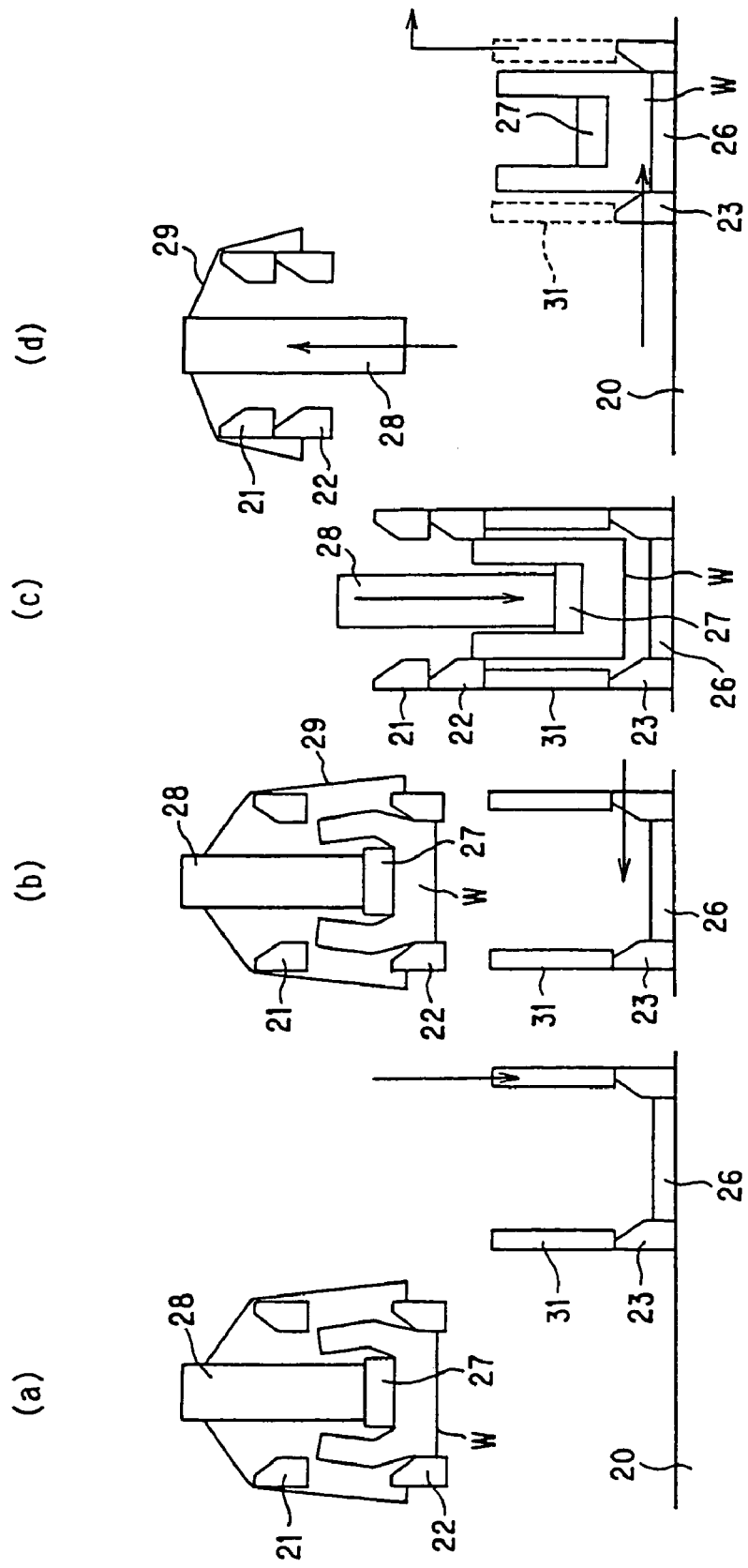
FIGS. 24(a) through (d) are explanatory diagrams showing the steps of manufacturing the bottomed container of the cask shown in FIGS. 12(a) and 12(b)
Figure 25:
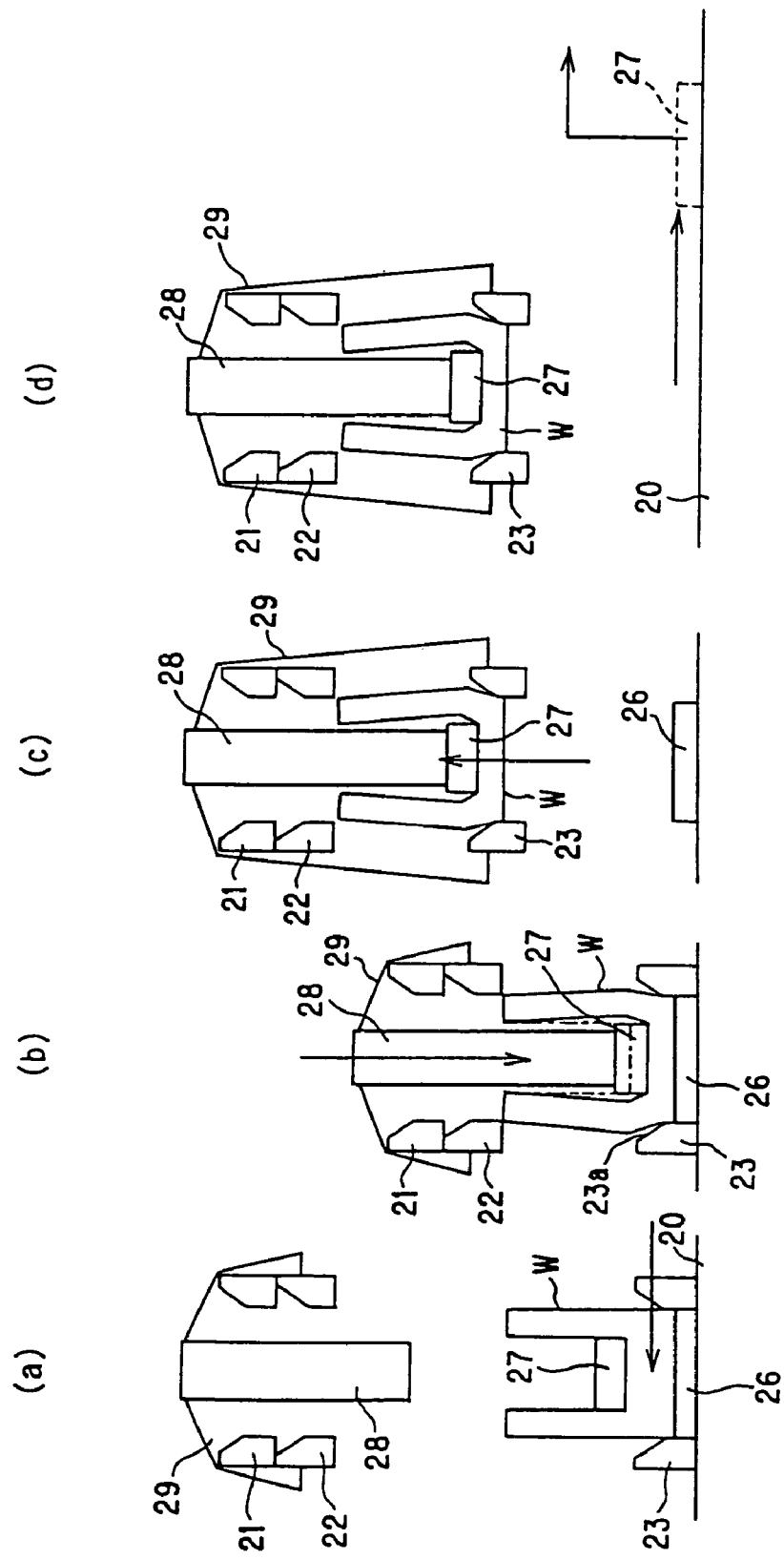
FIGS. 25(a) through 25(d) are explanatory diagrams showing the steps of manufacturing the bottomed container of the cask shown in FIGS. 12(a) and 12(b)
Figure 26:
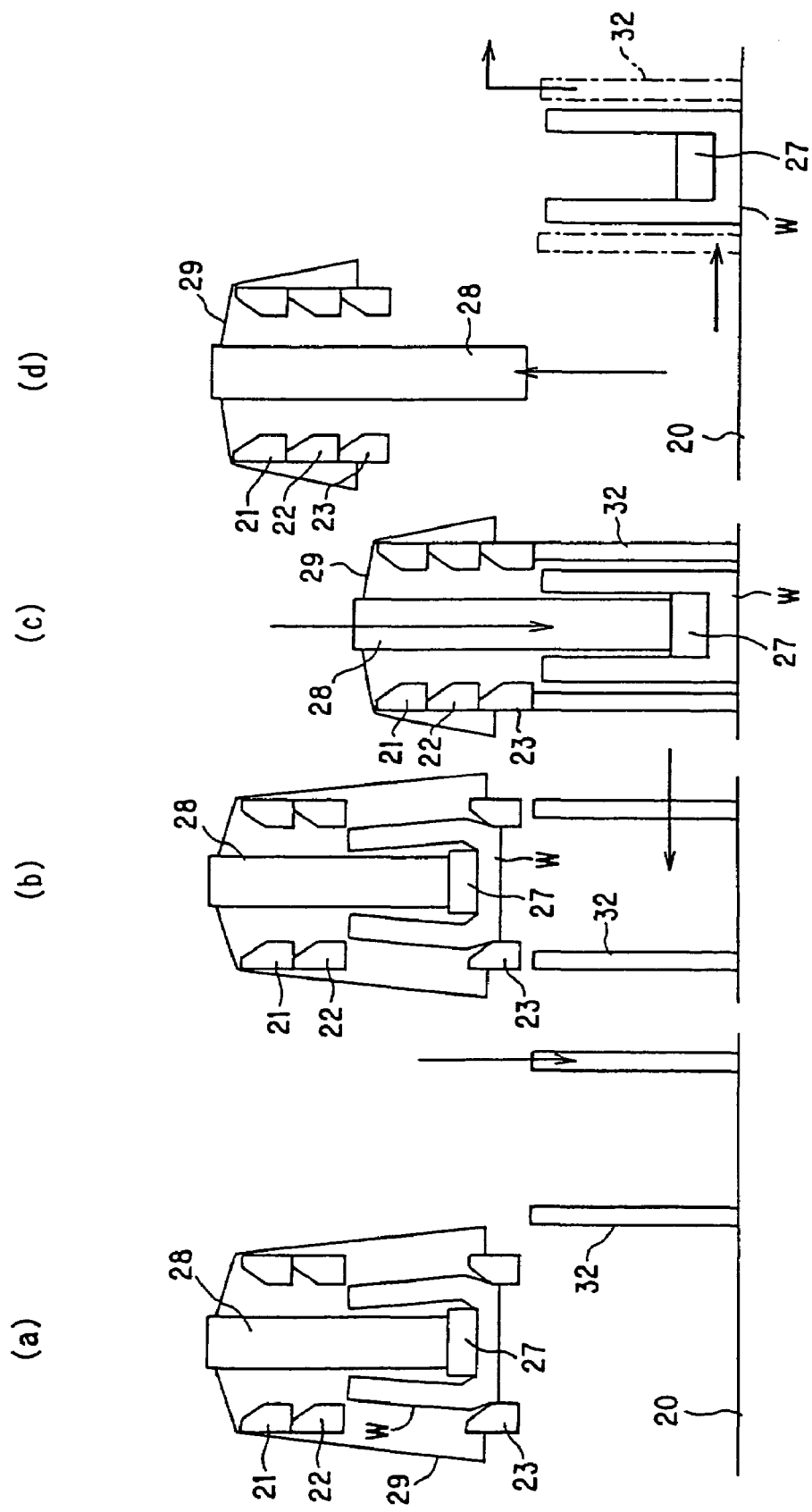
FIGS. 26(a) through 26(d) are explanatory diagrams showing the steps of manufacturing the bottomed container of the cask shown in FIGS. 12(a) and 12(b)

FIGS. 19(a) through 19(c) are axially sectional views showing examples of the bottomed container capable of being formed by the manufacturing method of the present invention. The bottomed container 1 shown in FIGS. 19(a) and 19(b) can be formed by selecting suitably a diameter of the cylinder or the column in the above explanation. FIG. 19(c) shows the example that two-staged spot facing section 800 is provided on the bottom section. In order to provide the two-staged spot facing section 800, for example, a forming tool, in which two columns having different diameters are stacked and its axially section has a convex shape, is set on the bottom of the metal billet 200. Moreover, the two-staged spot facing section 800 can be formed also by setting two cylinders having different diameters and heights on the bottom of the metal billet 200. Moreover, a step section may be provided on the external surface of the cylinder in an axial direction so as to be used.

Fourth Embodiment

FIGS. 20(a) and 20(b) are axially sectional views showing the bottomed container according to a fourth embodiment of the present invention. The bottomed container 1 is characterized in that in the manufacturing method described in the first embodiment the extended section 201 formed before the hot dilation forming (see FIG. 2(b)) is directly utilized as the flange of the container. Since the cask as the used nuclear fuel container is constituted so that helium gas of a several atm. is sealed between the primary cover and the secondary cover, a great pressure is applied to the mounting portion of the secondary cover. Moreover, since the secondary cover occasionally receives impact of falling, the flange section as the mounting portion of the secondary cover requires the firm structure. Since the container of the present invention is formed so that the flange and the body are integral and a diameter of the flange is larger than a diameter of the body, measure such that bolts are arranged in two lines is easily taken. Therefore, the secondary cover can be fixed firmly.

Since in the conventional cask the flange section is manufactured separately and is welded to the cask body, troublesome steps are required. According to the manufacturing method of the present invention, since the thick bottomed container having excellent end surface shape can be manufactured, the extended section 201 formed on the end surface of the container (see FIG. 2(b)) is seldom worked and can be utilized as the flange. Therefore, the welding step and the post-welding hot processing step can be omitted, and thus the manufacturing steps can be simplified. Here, in FIGS. 20(a) and 20(b), the extended section 201 formed before the hot dilation forming (see FIG. 2(b)) is directly used as the flange of the container, but the extended section 201 is removed by cutting or the like and the inner side of the opening of the container is worked so that a flange without extended section ever used can be formed. Also in this case, since the flange section and the body section are formed integrally, strength and sealing property can be secured sufficiently.

Fifth Embodiment

There will be explained below another manufacturing method of the bottomed container 1. FIGS. 21 through 26 are explanatory diagrams showing the manufacturing steps of the bottomed container 1 of the cask 100 shown in FIG. 12. The bottomed container 1 is formed by combining the upsetting step and the punching draw step.

Firstly, ring-shaped first die 21, second die 22 and third die 23 are stacked on a slide table 20 of the pressing machine (not shown), and first pressurizing platform 24 second pressurizing platform 25 and third pressurizing platform 26 are placed in the first through third dies 23 so that a mold is structured (FIG. 21(a)). A boring punch 27 is positioned on an upper surface of a metal billet W. The boring punch 27 is pressurized by a stem 28 attached to a punch of the pressing machine (FIG. 21(b)). The metal billet W is set in the first die 21. The metal billet W is made of low carbon steel or stainless steel formed by vacuum forging, and its upper surface is circular and its lower surface has a circular shape smaller than the upper surface so that the metal billet W is conically trapeziform (angle of tilt surface is not shown). At the time of pressurizing, the metal billet W is heated within a range of 1000° C. to 1200° C. The heating is carried out in an electric oven and the metal billet W in a red state is placed on the slide table 20. The cylinder 302 and the annular metal plate 303 (see FIG. 18(a)) are provided between the first die 21 and the metal billet W so that a spot facing section may be formed on the bottom.

Next, when the metal billet W is placed, the boring punch 27 is pressurized so as to be upset (FIG. 21(c)). Since the inner end portion of the first die 21 is an opened, material flows between the boring punch 27 and an opening portion 21a of the first die so that the metal billet W is deformed into a dished shape. A hang tool 29 is used so as to hang the stem 28 together with the first die 21 (FIG. 21(d)), and the slide table 20 is moved to be conveyed out so that the first pressurizing platform 24 is removed (FIG. 21(e)).

When the first die 21 including the metal billet W is hung, in this state a spacer 30 is placed on the second die 22 (FIG. 22(a)). Thereafter, the slide table 20 is moved and the mold is conveyed in (FIG. 22(b)), and the boring punch 27 is pushed down so that the metal billet W is subject to the punching draw working by the first die 21 (FIG. 22(c)). As a result, when the metal billet W passes through the first die 21, the dished section at the top is drawn so that the metal billet W has a cup shape and is positioned in the second die 22. Next, the stem 28 and the hang tool 29 are allowed to recede upward and the slide table 20 is moved so that the metal billet W and the mold are conveyed out and the spacer 30 is removed (FIG. 22(d)).

In this state, the boring punch 27 remains at the bottom of the metal billet W having cup shape (FIG. 23(a)). Next, the stem 28 in a state that the spacer 30 is removed is lowered and is pressurized by the boring punch (FIG. 23(b)). As a result, the metal billet w is further upset, and the material flows from between an opening section 22a of the second die 22 and the boring punch 27 so that the metal billet W is deformed. The hang tool 29 is used so as to hang the second die 22 together with the metal billet W (FIG. 23(c)). In this state the slide table 20 is moved so that the mold is conveyed out, and the second pressurizing platform 25 is removed (FIG. 23(d)).

Next, the spacer 31 is placed on the third die 23 (FIG. 24(a)). The slide table 20 is moved so that the mold is conveyed in (FIG. 24(b)), and the boring punch 27 is pushed down so that the punching draw working is carried out by the second die 22 (FIG. 24(c)). As a result, when the metal billet W passes through the second die 22, its bellied portion is drawn and the metal billet W has a cup shape. Next, the stem 28 and the hang tool 29 are allowed to recede upward, and the slide table 20 is moved so that the metal billet W and the mold are conveyed out and the spacer 31 is removed (FIG. 24(d)). In this state the boring punch 27 remains at the bottom of the metal billet W having a cup shape.

Next, the slide table 20 is moved and the metal billet W is positioned below the stem 28 (FIG. 25(a)), and the stem 28 is lowered so that the metal billet W is pressurized by the boring punch 27 (FIG. 25(b)). As a result, the metal billet w is further upset, and the material flows from between an opening section 23a of the third die 23 and the boring punch 27 so that the metal billet W is deformed. Thereafter, the hang tool 29 is used so as to hang the third die 23 together with the metal bit W (FIG. 25(c)). In this state, the slide table 20 is moved, and the third pressurizing platform 26 is removed (FIG. 25(d)).

Next, the spacer 32 is placed on the slide table 20 (FIG. 26(a)). The slide table 20 is moved and the spacer 32 is conveyed in (FIG. 26(b)), and the boring punch 27 is pushed down so that the punching draw working is carried out by the third die 23 (FIG. 26(c)). As a result, when the metal billet W passes through the third die 23, its bellied portion is drawn. Next, the step 28 and the hang tool 29 are allowed to recede upward, and the slide table 20 is moved so that the metal billet W is conveyed out and the spacer 32 is removed (FIG. 26(d)). In this state the boring punch 27 remains at the bottom of the metal billet W having a cup shape, but it is directly used as the bottom of the bottomed container 1. The boring punch 27 is removed and the metal billet W can be used. Moreover, when the slide table 20 is moved and the spacer 32 is conveyed in (FIG. 26(b)), a cylindrical spacer 302 is provided in the spacer 32 (see FIG. 2(e')), and the bottom of section the metal billet W is punched by the boring punch 27. The cylindrical container can be formed by this method.

When the above-mentioned forming is finished, predetermined heat treatment is given to the bottomed container, and its inner surface is mechanically worked. The bottomed container 1 formed in such a manner has a percentage that its section is reduced from the metal billet W becomes about 40%. Moreover, in comparison with the case where the bottomed container is formed by the normal backward extrusion forming, in the case of the backward extrusion forming, the bottom section of the bottomed container becomes thick, and this causes an increase in the weight of the cask. Moreover, the pressing machine requires a great pressure, and a bottomed container can not be occasionally manufactured depending upon its scale. On the contrary, according to the manufacturing method of this embodiment, since the bottomed container is formed by combining the upsetting and the punching draw as mentioned above, only low pressure is required at the time of the upsetting or the draw. For this reason, a large-sized pressing machine which has been conventionally used is used so as to enable the forming.

FIGS. 27(a) through 27(d) are explanatory diagrams showing another manufacturing method of the bottomed container. As mentioned above, in the above-mentioned manufacturing method, the cylindrical boring punch 27, the pressurizing platforms 24 through 26, and the dies 21 through 23 having annular ring-shaped inner side were used, but the boring punch 27, etc. are not limited to these shapes. For example as shown in FIG. 27(b), in the case where the outer shape of the bottomed container 1 is octagonal, the internal shapes of a first die 21b through a third die maybe octagonal. In this case, a pressurizing platform 24b is also octagonal.

Figure 27:
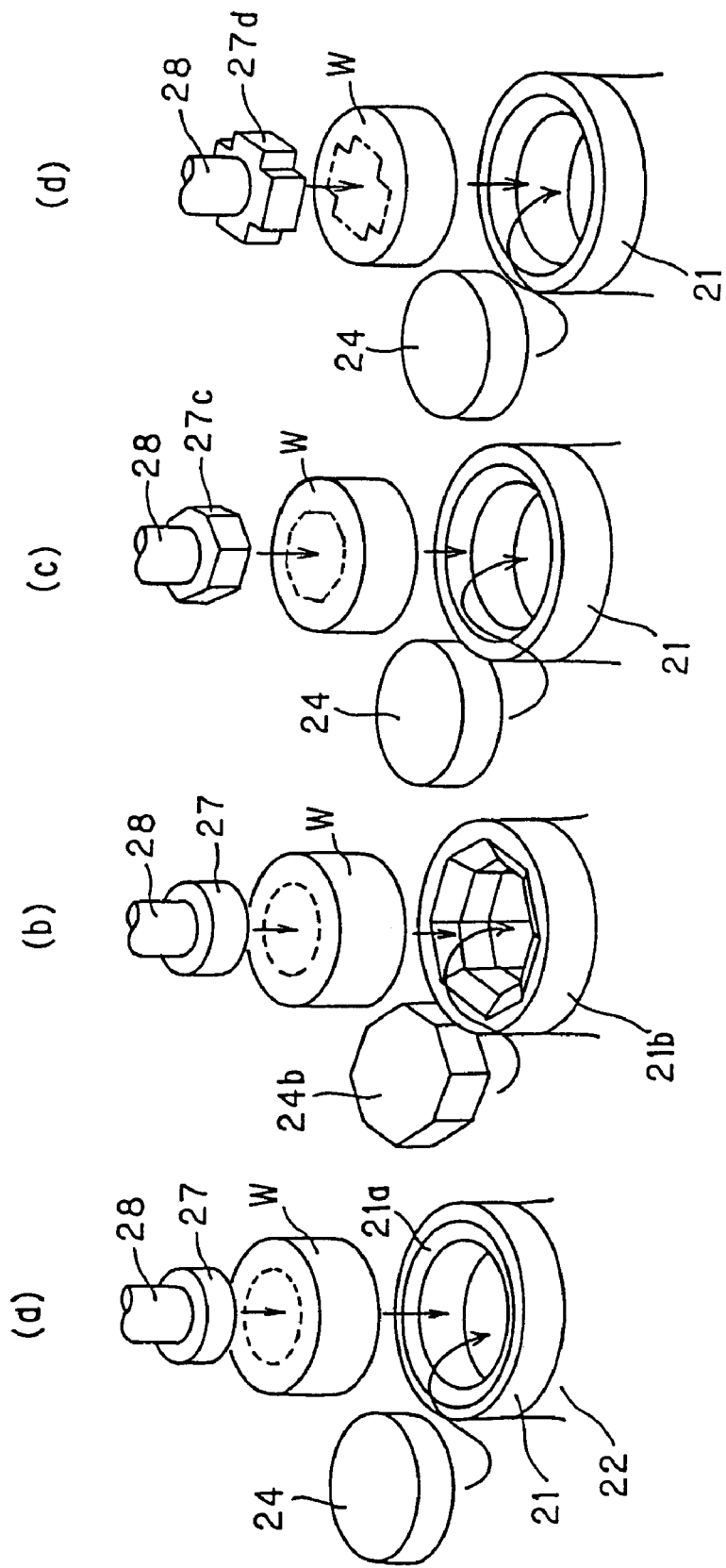
FIGS. 27(a) through 27(d) are explanatory diagrams showing another steps of manufacturing the bottomed container.

In addition, in the case where the internal shape of the bottomed container 1 is octagonal, as shown in FIG. 27(c), a boring punch 27c may be a octagonal prism. The metal billet W in this case has a octagonal cone trapezoid shape (detail of a tapered angle is not shown). Further, in the case where the internal shape of the bottomed container 1 has a step, as shown in FIG. 27(d), a boring punch 27d may be a prism having steps. Here, as not shown, in the case where the internal and external shapes of the bottomed container are octagonal, the die 21b shown in FIG. 27(b) and the boring punch 27c shown in FIG. 27(c) may be used. Moreover, also in the case where these shapes are not octagonal, according to the manufacturing method of the present invention, the bottomed container can be formed similarly to the above-mentioned method by changing the shapes of the boring punch, die and the like. Here, the boring punches 27c and 27d shown in FIG. 27 can be applied also to the manufacturing method according to the first embodiment.

FIGS. 28(a) through 28(f) are explanatory diagrams showing an embodiment of different manufacturing method. This manufacturing method is realized in that a stem 51 is set on a slide table 52 of a pressing machine and a boring punch 53 is attached to a top portion of the stem 51, and a pressurizing platform 54 is mounted to a punch 55 of the pressing machine. Namely, as shown in FIG. 28(a), the metal billet W is placed on the boring punch 53, and the punch 55 of the pressing machine is lowered so that the metal billet W is upset by the first die 56.

Next, after the lower end of the metal billet W is deformed into a dished shape, the punch 55 is allowed to recede so that the metal billet W is conveyed out (not shown). A plurality of spacers 57 are placed on the upper portion of the first die 56 so as to be conveyed in below the punch 55. Moreover, the pressurizing platform 54 is removed from the punch 55. When the punch 55 is lowered and pressurizes the metal billet W in this state, as shown in FIG. 28(b), the metal billet W is drawn by the first die 56. The first die 56 directly recedes downward.

Figure 28:
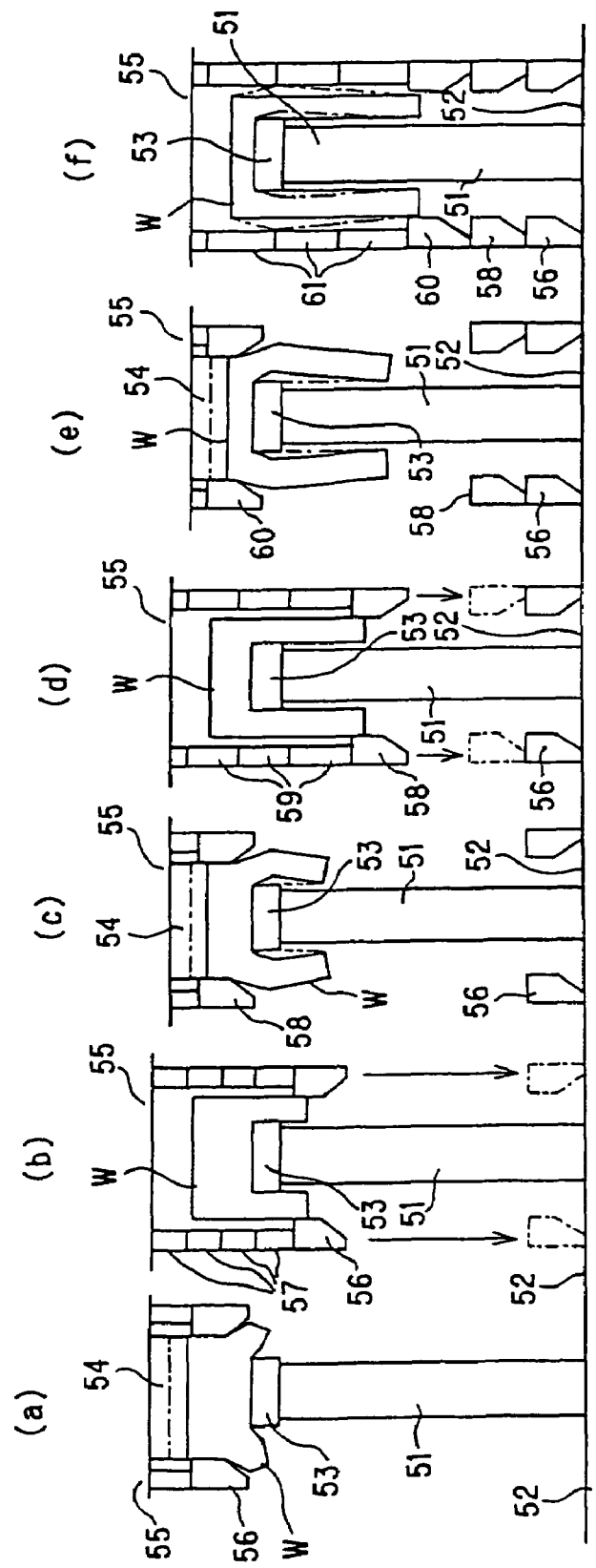
FIGS. 28(a) through 28(f) are explanatory diagrams showing an embodiment of another manufacturing method.
Figure 29:
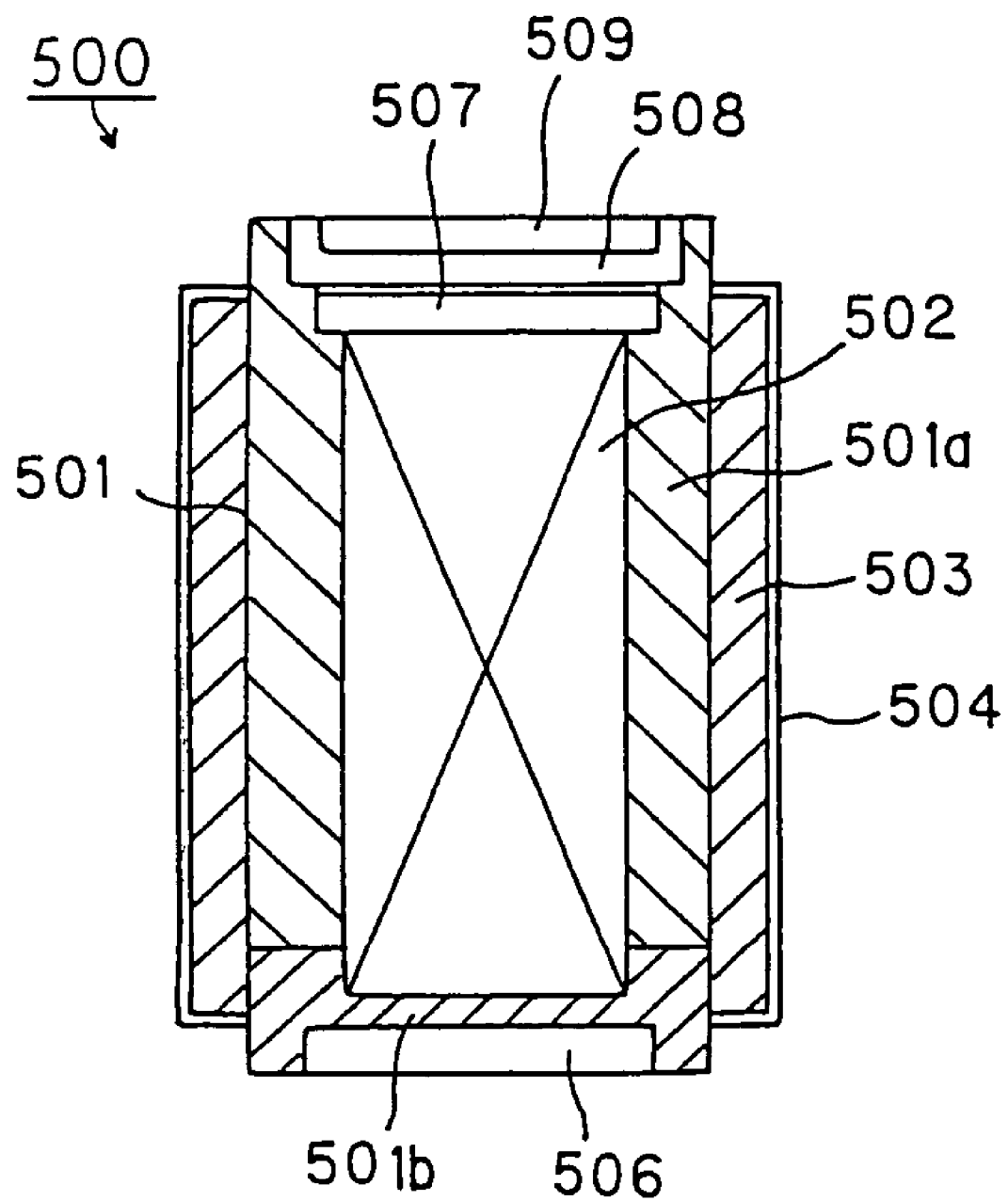
FIG. 29 is a sectional view showing one example of a conventional cask.
Figure 30:
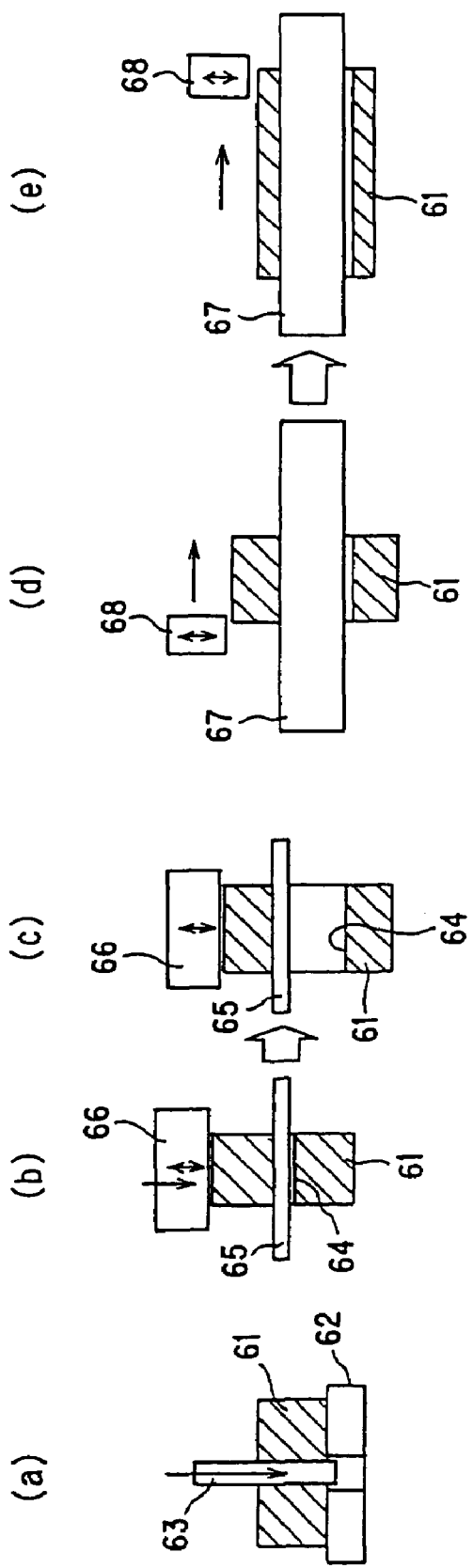
FIGS. 30(a) through 30(e) are explanatory diagrams showing one example of the method of manufacturing the bottomed container of the cask shown in FIG. 29.
Figure 31:
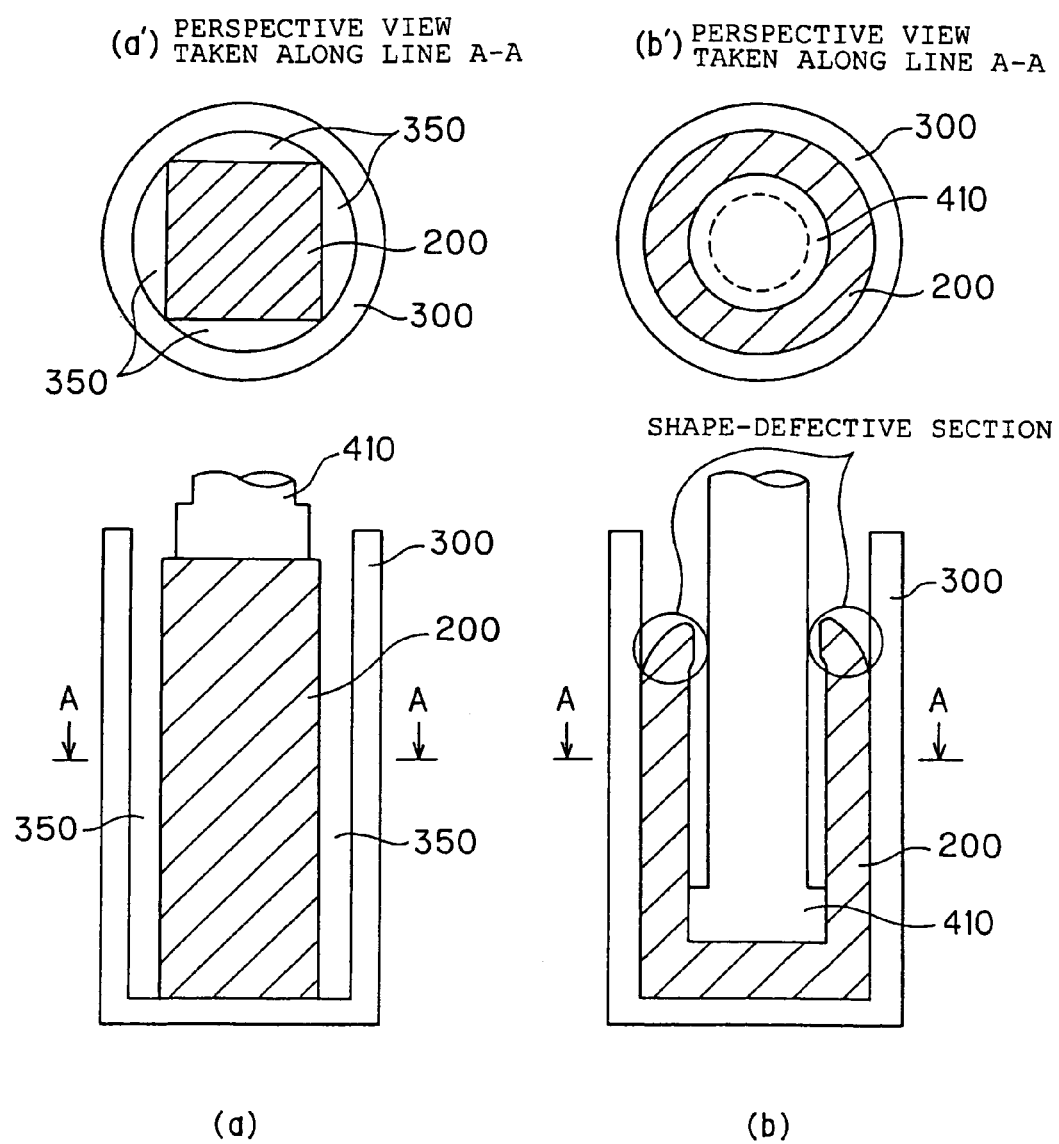

Next, similarly the metal billet W is conveyed out so that the spacer 57 is removed and the pressurizing platform 54 is mounted, and the metal billet W is conveyed in below the punch 55 again (not shown). Moreover, a second die 58 is mounted to the punch 55 side. In this state the punch 55 is lowered so as to upset and pressurize the metal billet W (FIG. 28(*c*)). The metal billet W is once conveyed out, and a plurality of spacers 59 are placed on the second die 58 and simultaneously the pressurizing platform 54 is removed, and the metal billet W is again conveyed in below the punch 55. In this state when the punch 55 is lowered and the pressurizes the metal billet W, as shown in FIG. 28(*d*), the bellied portion of the bottomed container 1 is drawn. The second dice 58 directly recedes downward.

Thereafter, similarly the metal billet W is conveyed out and the spacer 59 is removed, and the metal billet W is again conveyed in below the punch 55 (not shown). Moreover, a third die 60 and the pressurizing platform 54 are attached to the punch 55 side. In this state when the punch 55 is lowered so as to pressurize the metal billet W, as shown in FIG. 28(*e*), the metal billet W is further deformed. The metal billet W is once conveyed out and a plurality of spacers 61 are placed on the third die 60, and simultaneously the pressurizing platform 54 is removed so that the metal billet W is again conveyed in. When the punch 55 is lowered so as to pressurize the metal billet W in this state, as shown in FIG. 28(*f*), the bellied portion of the bottomed container 1 is drawn. The third die 60 recedes downward. Here, the material which can be used in the method according to this invention includes ferrous materials such as carbon steel, stainless steel and low-alloy steel, and also nonferrous metal such as nickel alloy, aluminum alloy, copper alloy and magnesium alloy.

There will be explained below concrete forming conditions. When a metal billet made of low carbon steel is heated to 1000° C. and a distortion speed is 0.1 to 1 s, the deformation resistance becomes 1.5 to 3 kgf/mm². For example, if a length of 1 cm is punched within 1 minute, in the case where the outer diameter is reduced from 2500 mm to 2200 mm by a die of 30°, when the inner diameter is 1420 mm, the distortion becomes:

$$1n((2500^2-1420^2)/(2200^2-1420^2))=0.4$$

and the metal billet is worked for time (2500−2200/2/tan 30°)/(1000/60)=15.6 sec. Therefore, the distortion speed becomes $0.025^{-1}$s.

Next, when the distortion resistance is 3 kgf/mm² and the friction coefficient is 0.3, the punching force becomes:

$$3\times\pi/4\times(2200^2-1420^2)\times 1n((2500^2-1420^2)/(2200^2-1420^2))\times(1+0.1\times 0.3/\tan 30°)+4\pi/(6\cdot 3\cdot\sqrt{3})$$
$$=5460640 \text{ kgf}$$

However, since the temperature is initially high, the punching force is reduced to half, namely, becomes 2730 tonf. Moreover, the final thickness which prevents the bottom from dropping off at the time of punching is:

$$54640/(3/\sqrt{3})/\pi/1420=7.7 \text{ mm}$$

Therefore, the thickness of more than this value is required.

When a length of a product is 4885 mm, since a length of a material is:

$$4885\times(2200^2-1420^2)/2200^2=2850 \text{ nm},$$

an upsetting amount for one time is reduced to ⅓, namely, 950 mm and a height up to the mold constraining portion is set to the final bottom thickness of 700 mm, a necessary upsetting force becomes:

$$3\times\pi/4\times 1420^2\times(1+0.3\times 1420/700/2)=61967$$

With the pressure of this value, the bottomed container can be formed by pressing of 8000 ton which has usage accomplishment.

On the contrary, since the extruding force in the case of the backward extrusion forming becomes:

$$3\times\pi/4\times 2200^2\times 1n((2200^2/(2200^2-1420^2))\times(1+2\times 0.5/\tan 45°))+4\pi/(4\cdot 3\cdot\sqrt{3})=19186103 \text{ kgf}$$

the pressing force of 20000 ton is required.

As mentioned above, in the radioactive substance container and the container of the present invention, the bottomed container in which the bottom and the body are formed integrally is used so that the conventional welding of a bottom plate is not required, and the heating treatment thereafter can be omitted. As a result, troublesome manufacturing steps can be reduced greatly. Moreover, since the bottomed container is formed by the hot dilation, only a press pressure, which is lower than that at the time of hot backward extrusion forming, for example, is required.

In addition, as for the radioactive substance container and the container of the present invention, the bottomed container was formed by using the metal billet having a polygonal section vertical to the axial direction and the container for forming having a circular internal shape of the section vertical to the axial direction. For this reason, since the conventional welding of a bottom plate is not required, troublesome steps required for the manufacturing can be reduced. Further in the dilation forming, the bottomed container can be formed with a lower pressure than conventional one due to a function which bends one side of the polygon of the metal billet.

In addition, as for the radioactive substance container and the container of the present invention, the bottomed container was formed by the metal billet having a polygonal section vertical to the axial direction and the container for forming having polygonal internal shape of the section vertical to the axial direction. For this reason, since the conventional welding of a bottom plate is not required, troublesome steps required for the manufacturing can be reduced. Further in the dilation forming, the bottomed container can be formed with a lower pressure than conventional one due to the function which bends one side of the polygon of the metal billet. Further, bottomed containers having external shapes according to various applications can be formed easily.

In addition, as for the radioactive substance container of the present invention, the bottomed container, which is enough long in the axial direction to contain the basket of used nuclear fuel aggregate used as fuel of nuclear reactor and has large inner diameter, namely, is thick, was formed by the hot dilation forming in the container for forming so that the bottom and the body were integral. For this reason, since the conventional welding of a bottom plate is not required and the post-welding heat treatment can be omitted, troublesome steps required for the manufacturing can be reduced. Particularly in the bottomed container whose thickness is thick and dimension in the axial direction is a several meters and inner diameter reaches 2 to 2.5 meters, the effect which can omit the steps is extremely great.

In addition, since the radioactive substance container of the present invention has a dimension such that the section of the boring punch is approximate to the section of the basket for used nuclear fuel aggregate, an operation for cutting the inside of the container becomes easy after the hot dilation forming, and the manufacturing does not require the troublesome steps.

In addition, as for the radioactive substance container of the present invention, in the case where radioactive substance is stored in the bottomed container in which the bottom and the body are formed integrally by the hot dilation forming in the container for forming, a dosage equivalent factor of the γ rays is not more than 200 μSv/h. In order to satisfy the requirement that a dosage equivalent factor of the γ rays is not more than 200 μSv/h on the surface of an external wall on the substantially center of the side surface of the container, it is necessary to manufacture the container whose thickness reaches several dozens cm using stainless steel, carbon steel or the like. Since the body and the bottom of such a thick container were formed integrally, the conventional welding of a bottom plate is not required, and since the post-welding heat treatment can be omitted, the manufacturing does not require troublesome steps. Particularly in such a thick bottomed container, the effect which can omit the steps is extremely great.

In addition, as for the radioactive substance container of the present invention, in the above-mentioned radioactive substance container and the container, the outer diameter of the bottomed container was not less than 1000 mm to not more than 3000 mm, and the thickness was not less than 150 mm not more than 300 mm. Since the thick container was formed so that the bottom and the body were integral, the conventional welding of a bottom plate is not required, and since the post-welding heat treatment is omitted, the manufacturing does not require troublesome steps. Particularly in the thick bottomed container whose axial dimension is large, the effect which can omit the above-mentioned steps is extremely great.

In addition, as for the radioactive substance container and the container of the present invention, the metal billet, whose section vertical to the axial direction on the pressing forward side was at least formed into polygonal shape, was set into the container for forming, and the boring punch is pushed into the metal billet so that the metal billet is hot-dilated. For this reason, the conventional welding of a bottom plate is not required, and the post-welding heat treatment can be omitted. In addition, since a number of defects caused on the end portion and the surface of the bottomed container is small, only less troublesome steps of correcting these defects are required after the forming, and thus the manufacturing does not require troublesome steps.

In addition, in the radioactive substance container of the present invention, the bottom and the body were formed integrally by hot press working. Moreover, in the radioactive substance container of the present invention, the metal billet was heated and was upset and drawn so that the bottom and the body were formed integrally. For this reason, since the welding step and the heat treating step after that can be omitted, the manufacturing does not require troublesome steps.

In addition, the radioactive substance container of the present invention, the spot facing section was provided integrally with the bottom section of the bottomed container. Since in the bottomed container the spot facing section is also formed integrally at the time of the hot dilation forming, the step of providing the spot facing section can be omitted, and thus the manufacturing does not require troublesome steps.

In addition, as for the radioactive substance container of the present invention, since the flange was provided integrally with the body of the bottomed container, the welding step and the post-welding heat treating step can be omitted, and troublesome steps for the manufacturing can be omitted.

Moreover, the sealing performance and the strength of the container itself can be secured.

In addition, as for the radioactive substance container and the container of the present invention, at least one of the section outside the body and the section inside the body of the bottomed container was polygonal. For this reason, when the bottomed container is dilated to be formed, the internal section of the container can be formed into a shape according to a basket. As a result, the step of cutting the inside of the container which has been conventionally required can be omitted, and thus the manufacturing does not require troublesome steps.

In addition, the metal billet for the hot dilation forming according to the present invention was formed so that at least the section vertical to the axial direction on the pressing forward side was polygonal. For this reason, the performance for bending a side of the polygon and the function for restraining the upsetting of the metal billet accrue. Because of these functions, the thick container, in which a ratio of the length to the diameter in the axial direction is not less than 1, can be formed with a lower press pressure than conventional one. Moreover, the defects caused on the end portion and the surface of the container after the forming can be suppressed.

In addition, the metal billet for the hot dilation forming of the present invention was provided with at least one plane on at least one of the side surface on the pressing forward side and the side surface of the pressing backward side. At the time of the hot dilation forming, since the metal billet is dilated to be formed by the function for bending this plane, a force required for the hot dilation forming is weaker than the case where the side surface is a curbed surface. Therefore, the thick container which is long in the axial direction can be formed with a lower press pressure than conventional one. Moreover, in comparison with the case where the side surface is a curved surface, defects on the inner side such as a crack can be reduced.

In addition, the metal billet for the hot dilation forming of the present invention was further provided with a taper which becomes thinner toward the pressing direction on the pressing forward side of the metal billet in the above-mentioned metal billet for the hot dilation forming. Moreover, in the metal billet for the hot dilation forming of the present invention, at least one or more step sections were provided so that the pressing forward side of the metal billet becomes thinner gradationally towards the pressing direction. As for the metal billet, timing at which the metal fills the vicinity of the bottom of the container for forming can be delayed at the final stage of the hot dilation forming. For this reason, the upsetting is suppressed at the final stage of the hot dilation forming, and thus the press pressure can be reduced at the time of the hot dilation forming.

In addition, since the metal billet for the hot dilation forming of the present invention is provided with the extended section at the end portion on the pressing backward side, the metal billet is engaged with the end portion of the container by the extended section at the time of the hot dilation forming. With this function, constraint of the container on the metal billet becomes stronger so that the upsetting on the pressing forward side can be suppressed. Moreover, since the side surface is provided with at least one plane, the function for bending this plane and the function for suppressing the upsetting of the metal billet accrue. Therefore, due to their interaction, the press pressure can be suppressed to be small. Moreover, since the metal billet is previously provided with the extended section on the pressing backward side at the time of the manufacturing, the step of manufacturing the container can be simplified.

In addition, since the metal billet for the hot dilation forming of the present invention is provided with the extended section on the pressing backward side, this extended section engages the metal billet with the end portion of the container at the time of the hot dilation forming. With this function, the constraint of the container on the metal billet becomes stronger, and the upsetting on the pressing forward side can be suppressed. Moreover, since at least the section vertical to the axial direction on the pressing forward side was formed into a polygonal shape, the function for bending each side of the polygonal section and the function for suppressing the upsetting of the metal billet accrue. Therefore, the press pressure can be suppressed to be small by their interaction. Moreover, since he metal billet is previously provided with the extended section on the pressing backward side at the time of the manufacturing, the step of forming the extended section on the pressing backward side is not required, and thus the steps of manufacturing the container can be simplified.

In addition, since the metal billet for the hot dilation forming of the present invention was provided with the extended section on the pressing backward side, this extended section engages the metal billet with the end portion of the container at the time of the hot dilation forming. With this function, the constraint of the container on the metal billet becomes stronger, and the upsetting on the pressing forward side can be suppressed. Moreover, since at least the section vertical to the axial direction on the pressing forward side was formed into a polygonal shape, the bending function and the function for suppressing flow of the metal accrue. Further, the pressing forward side was set to be thinner gradationally towards the pressing direction, the upsetting phenomenon is suppressed at the final stage of the hot dilation forming, and an increase in the press pressure can be suppressed. Therefore, the press pressure can be suppressed to be small due to their interaction. Moreover, since the metal billet is previously provided with the extended section on the pressing backward side at the time of the manufacturing, the step of forming the extended section on the pressing backward side is not required.

In addition, since the metal billet for the hot dilation forming of the present invention is provided with the extended section on the pressing backward side, the extended section latches the metal billet with the end portion of the container at the time of the hot dilation forming. With this function, the constraint of the container on the metal billet becomes stronger, and the upsetting on the pressing forward side can be suppressed. Moreover, since at least one plane is provided on at least one of the side surfaces of the metal billet, the bending function and the function for suppressing the flow of the metal accrue further, since the pressing forward side becomes thinner gradationally, the upsetting phenomenon is suppressed at the final stage of the hot dilation forming, and an increase in the press pressure can be suppressed. Therefore, the press pressure can be suppressed to be small by their interaction. Moreover, since the metal billet is previously provided with the extended section on the pressing backward end at the time of the manufacturing, the step of forming the extended section on the pressing backward side is not required.

In addition, in the above-mentioned radioactive substance container and the container, the bottomed container of the present invention has an outer diameter of not less than 200 mm to not more than 4000 mm and a thickness of not less than 20 mm to not more than 400 mm. Since such a thick container is formed so that the bottom and the body are integral, the conventional welding of a bottom plate is not required, and the post-welding heat treatment can be can be omitted so that the manufacturing does not require troublesome steps. Particularly in the thick bottomed container having a large axial dimension, the effect which can omit the above-mentioned steps is extremely great.

In addition, since the container manufacturing apparatus of the present invention is provided with the container for forming, whose body and the bottom can relatively move with respect to the axial direction of the body of the container, and the boring punch which is attached to the pressing machine and pressurizes the metal billet set in the container for forming. For this reason, since the body of the container and the metal billet hardly relatively move at the time of hot dilation forming, increase in the press pressure can be suppressed at the time of the hot dilation forming.

In addition, in the method of manufacturing a container of the present invention the body section of the container for forming is divided in the axial direction. For this reason, even in the case where the metal billet which is long in the axial direction is formed, the deformation of the metal billet in the axial direction at the time of hot dilation forming can be absorbed by the whole container. Therefore, an increase in the press pressure can be suppressed.

In addition, according to the manufacturing method of the radioactive substance container of the present invention, the container in which the bottom and body are formed integrally is finished by cutting its external side, and its internal side is cut into a stepped shape so that a portion for containing a basket for used nuclear fuel aggregate is provided, or the internal section is cut to be finished so that the radioactive substance container is manufactured. For this reason, the internal side of the bottomed container can be cut and finished easily.

In addition, according to the manufacturing method of the radioactive substance container of the present invention, the bottomed container is formed by hot dilation forming so that the bottom and the body are integral, and the external side of the bottomed container is cut to be finished, and the internal section is cut into a stepped shape so that a portion for storing a basket for used fuel aggregate is provided, or the internal side is cut to be finished so that the radioactive substance container is manufactured. For this reason, the inner side of the bottomed container can be cut and finished easily.

In addition, according to the method of manufacturing a bottomed container of the present invention, the boring punch is pushed into the metal billet, and the plane of the metal billet is bent by the force directing to the inner wall of the container so that the metal billet is dilated to a gap existing between the container for forming and the metal billet.

In this method of manufacturing a container, the metal billet is dilated to the inner wall side of the container for forming by function for bending the plane of the metal billet on the side surface. Moreover, since the metal billet is dilated to the space existing between the metal billet and the inner wall of the container for forming, the upsetting phenomenon of the metal billet can be suppressed. With these functions, in this method of manufacturing a container, only lower press pressure than the conventional one is required, and defects caused on the end portion and the surface of the container after the forming can be suppressed.

In addition, according to the method of manufacturing a bottomed container of the present invention, the metal billet provided with the extended section engaging with the end portion of the opening of the container for forming is used for the end portion of the pressing backward side. For this reason, the extended section engages the metal billet with the end portion of the container at the time of hot dilation forming. With this function, the constraint of the container on the metal billet becomes stronger, and the upsetting of the pressing forward side can be suppressed. Moreover, since at least one plane is provided on the side surface, the bending function and the function for suppressing the phenomenon that the metal flows to the opposite side to the pressing direction accrue. Therefore, the press pressure can be suppressed small by their interaction. Further, the defects which are caused on the end portion and the surface of the container after the forming can be also suppressed.

In addition, in the method of manufacturing a bottomed container of the present invention, the metal billet, in which at least the section vertical to the axial direction on the pressing forward side is formed into polygonal, is hot-dilated. For this reason, on the pressing forward side, since the metal billet is dilated in the space existing between the pressing forward side and the body of the container, the upsetting phenomenon of the metal billet can be suppressed. Therefore, in this method of manufacturing a container, only lower press pressure than conventional one is required, and the defects which are caused on the end portion and the surface of the container after the forming can be suppressed.

In addition, in the method of manufacturing a bottomed container of the present invention, the metal billet, which is provided with at least one plane on at least one of the side surface of the pressing forward side and the side surface of the pressing backward side, is hot-dilated. For this reason, only a weak force suffices for the hot dilation forming in comparison with the case where the side surface is a curved surface. Therefore, a lower press pressure is required in comparison with the conventional method of manufacturing a container, and internal defects such as a crack can be also reduced.

In addition, in the hot pressing method of the thick metal cylinder or the cylindrical container of the present invention, a metal billet without joint of different diameter sections, in which its pressing forward side is composed of a member having a section with an outer diameter smaller than the inner diameter of the container or an outer diameter equal with the diagonal length, or a member having a section with an outer diameter of the diagonal length equal with the inner diameter of the container, and its pressing backward side is composed of a member having a section with an outer diameter or a diagonal length equal with the inner diameter of the container, is heated to a pressing temperature and is set into the container for press forming, and thereafter while the center of the workpiece as the metal billet without joint is being bored by the punch, the billet is pressed. For this season, the metal billet without joint reduces a press forming load and improves yield of the product. Further, a press formed product having excellent end surface shape can be obtained.

In addition, in the method of manufacturing a drum or a container of the present invention, the metal billet, in which its pressing forward side has a section with an outer diameter smaller than the inner diameter of the container and its backward side has a section with an outer diameter substantially equal with the inner diameter of the container, is hot-dilated. For this reason, the thick container can be formed with lower press pressure than conventional one, and a number of defects caused on the end portion or the surface of the container is small. As a result, less steps are suffice for correcting the defects after the forming. Moreover, since both the pressing forward side and backward side have angular section, the metal billet can be worked comparatively easily in comparison with a billet having a circular sectional. Therefore, the manufacturing does not require troublesome steps.

In addition, in the method of manufacturing a drum or a container of the present invention, the metal billet, in which the pressing forward side has a section with a diagonal length smaller than the inner diameter of the container and the backward side has a section with a diagonal length substantially equal with the inner diameter of the container, is hot-dilated. For this reason, the thick container can be formed with lower press pressure than conventional one, and a number of defects caused on the end portion and the container surface is small. As a result, less troublesome steps suffice for correcting the defects after the forming. Moreover, since both the pressing forward side and backward side have angular sections, the metal billet can be worked comparatively easily in comparison with a metal billet having a round section.

In addition, in the method of manufacturing a drum or a container of the present invention, the metal billet, in which the pressing forward side has a section with an outer diameter smaller than the inner diameter of the container and the backward side has a section with an outer diameter substantially equal with the inner diameter of the container, is hot-dilated. For this reason, the press pressure can be lower than conventional one, and a number of defects caused on the end portion and the container surface is small. As a result, only less troublesome steps suffice for correcting these defects after the forming.

In addition, the method of manufacturing a container of the present invention includes the step of extending the pressing backward side of the metal billet to above the body of the container before hot dilation forming. Moreover, in this container forming method, the metal billet is dilated by the function for bending the plane of the metal billet towards the inner wall of the container for forming. Since the extended section has the function for engaging the metal billet with the container end portion at the time of the hot dilation forming, the constraint of the container on the metal billet becomes strong, and the upsetting on the pressing forward side can be suppressed. Moreover, the press pressure can be reduced by the function for bending the plane of the metal billet towards the inner wall of the container for forming. With their interaction, this method of manufacturing a container can form the thick container with lower press pressure than the backward extrusion method or the like.

In addition, in the method of manufacturing a container of the present invention, the metal billet, which is previously provided with the extended section engaging with the opening end portion of the container for forming on the end portion of the pressing backward side, is hot-dilated. For this reason, since the step of extending the pressing backward side of the metal billet to above the body of the container is not required before the hot dilation forming, time required for the hot dilation becomes short. As a result, since the forming can be finished until the temperature of the metal billet drops, the shape of the end portion becomes satisfactory. Moreover, since the extending step can be also omitted, the manufacturing does not require troublesome steps.

In addition, the method of manufacturing a container of the present invention includes the step of extending the pressing backward side of the metal billet to above the body of the container before the hot dilation forming. Since the extended section has the function for engaging the metal billet with the container end portion at the time of the hot dilation forming, the constraint of the container on the metal billet becomes strong, and the upsetting on the pressing forward side can be suppressed. Moreover, since the metal billet, in which at least the section vertical to the axial direction on the pressing forward side is formed into a polygonal shape, is dilated to be formed, the function for bending each side of the polygon towards the inner wall of the container for forming acts. With their interaction, the thick container can be formed with lower press pressure than the backward extrusion method or the like.

In addition, the method of manufacturing a container of the present invention includes the step of extending the pressing backward side of the metal billet to above the body of the container before the hot dilation forming. Since the extended section has the function for engaging the metal billet with the container end portion at the time of the hot dilation forming, the constraint of the container on the metal billet becomes strong, and the upsetting on the pressing forward side can be suppressed. Moreover, since the metal billet, which is provided at least one plane on at least one side, is dilated to be formed, the function for bending the plane of the metal billet towards the inner wall of the container for forming acts. With the interaction, this method of manufacturing a container can form the thick container with lower press pressure than the backward extrusion method or the like.

In addition, the thick metal-made cylinder or drum container hot pressing method includes the step of extending the pressing backward side of the metal billet to the body of the container before the hot dilation forming. Since this extended section has the function for engaging the metal billet wit the container end portion at the time of the hot dilation forming, the constraint of the container on the metal billet becomes stronger, and the upsetting on the pressing forward side can be suppressed. Moreover, the pressing forward side is a member having a section with an outer diameter smaller than the inner diameter of the container or an outer diameter of the diagonal length, or a member having a section with an outer diameter of the diagonal length equal with the inner diameter of the container. For this reason, as the metal is supplied from the pressing backward side and due to the function of the satisfactory plastic working of steel heated to high temperature, the metal billet is pushed to be spread sideways and simultaneously is worked, and is formed to fill the space of the container. As a result, the metal billet without joint is manufactured into a press product having a predetermined shape. With these interaction, the thick container can be formed with lower press pressure than the backward extrusion method or the like.

In addition, the method of manufacturing a drum or a container of the present invention includes the step of extending the pressing backward side of the metal billet to above the body of the container before the hot dilation forming. Since this extended section has the function for engaging the metal billet wit the container end portion at the time of the hot dilation forming, the constraint of the container on the metal billet becomes stronger, and the upsetting on the pressing forward side can be suppressed. Moreover, since the metal billet, in which the pressing forward side is a tetragonal section with its diagonal length is smaller than the inner diameter of the container, is used, the metal billet is dilated by the function for bending each side of the tetragonal section. Moreover, the pressing backward side of the metal billet suppresses the upsetting on the pressing forward side. With their interaction, in this manufacturing method, the thick container can be formed with lower press pressure than the backward extrusion method or the like.

In addition, the method of manufacturing a drum or a container of the present invention includes the step of extending the pressing backward side of the metal billet to above the body of the container before the hot dilation forming. Since this extended section has the function for engaging the metal billet with the container end portion at the time of hot dilation forming, the constraint of the container on the metal billet becomes stronger, and upsetting on the pressing forward side can be suppressed. Moreover, since the metal billet, in which the pressing forward side is a tetragonal section with a sectional length smaller than the internal diameter of the container, is used, the metal billet is dilated to be formed by the function for bending each side of the tetragonal section. Moreover, the pressing backward side of the metal billet suppresses upsetting on the pressing forward side. With their interaction, in this manufacturing method, the thick container can be formed with lower press pressure than the backward extrusion method or the like. Further, the metal billet to be used in this method is worked comparatively easier than the metal billet having one round section.

In addition, the method of manufacturing a drum or a container of the present invention includes the step of extending the pressing backward side of the metal billet to above the body of the container before the hot dilation forming. Since this extended section has the function for engaging the metal billet with the container end portion at the time of hot dilation forming, the constraint of the container on the metal billet becomes stronger, and upsetting on the pressing forward side can be suppressed. Moreover, since the pressing backward side of the metal billet has a diameter substantially equal with the inner diameter of the container for forming, upsetting on the pressing forward side can be suppressed. With their interaction, in this manufacturing method, the thick container can be formed with lower press pressure than the backward extrusion method or the like. Further, the metal billet to be used in this method can be worked comparatively easier than the metal billet having different sectional shapes.

Moreover, in the method of manufacturing a container of the present invention, the metal billet is formed by the forging step, and this method includes the step of forming at least the pressing forward side of the metal billet so as to provide an angular section. Moreover, the container manufacturing method of the present invention includes the step of providing a taper which becomes narrower towards the pressing direction on the pressing forward side of the metal billet. Further, in the method of manufacturing a container of the present invention, the forging step includes the step of providing at least one stepped section so that the pressing forward side of the metal billet becomes narrow gradationally towards the pressing direction. In this method of manufacturing a container, at the final stage of the hot dilation forming, timing at which the metal fills the vicinity of the bottom of the container for forming can be delayed. For this reason, the upsetting phenomenon of the metal billet can be suppressed, and the press pressure at the final stage of the hot dilation forming can be low.

In addition, in the method of manufacturing a container of the present invention, the bottomed container is formed by a drum-shaped member provided at the bottom of the metal billet, and simultaneously a spot facing section is formed on the bottom of the bottomed container. Since the spot facing section has been conventional provided by cutting, the working requires troublesome steps. However, since a pillar-shaped section which remains on the bottom of the container is only removed after the dilation forming, the working does not require less troublesome steps than the conventional method.

In addition, in the method of manufacturing a container of the present invention, the bottomed container is formed by the pillar-shaped member provided at the bottom of the metal billet, and simultaneously the spot facing section is formed on the bottomed container. For this reason, since the metal billet can be dilated and the spot facing section can be formed simultaneously, the working requires less troublesome steps than the conventional method. Moreover, since the step of removing the pillar-shaped member can be omitted, troublesome steps are not required for forming the spot facing section in comparison with the method where the spot facing section is formed.

In addition, in the method of manufacturing a container of the present invention, the aforementioned method of manufacturing a container can relatively move the body of the container for forming with respect to the bottom of the container for forming. For this reason, since the body of the container and the metal billet to be formed hardly move relatively at the time of the hot dilation forming, an increase in the press pressure can be suppressed.

In addition, in the method of manufacturing a container of the present invention, the aforementioned method of manufacturing a container divides the body of the container for forming in the axial direction. For this reason, even in the case where the metal billet which is long in the axial direction is formed, an increase in the press pressure can be suppressed.

In addition, the radioactive substance container manufacturing method of the present invention includes the upsetting step of setting the pressurizing platform in a ring-shaped die provided with an opening on its inner end portion and putting the metal billet into the mold composed of the die and the pressurizing platform so as to pressurize the metal billet by means of the boring punch, and the metal billet drawing step of setting a spacer to the lower portion of the mold and pushing the metal billet by means of the boring punch. For this reason, the bottomed container is easily formed.

In addition, this radioactive substance container manufacturing method includes the upsetting preparation step of stacking a plurality of ring-shaped dies provided with an opening on its inner end portion and stacking a plurality of pressurizing platforms in the dies and putting the metal billet into the mold composed of the die and the pressurizing platform, the upsetting step of pressurizing the metal billet from above the mold using the boring punch operated by the pressing machine, and the receding step of allowing the whole metal billet including the boring punch and the upper die to recede, the drawing preparation step of removing the used pressurizing platform and setting the drum-shaped spacer onto the next die and placing the whole metal billet including the receded die onto the spacer, the drawing step of pushing the metal billet using the boring punch and drawing the metal billet by means of the die, and the repeating step of repeating the above-mentioned steps using the next pressurizing platform and die and a spacer with a length according to deformation of the metal billet. For this reason, the pressurizing force can be suppressed small, and thus the manufacturing becomes easy.

Industrial Applicability

As mentioned above, the radioactive substance container, the radioactive substance container manufacturing apparatus and manufacturing method of the present invention are practical for a thick container such as a cask for containing, transporting and storing used nuclear fuel aggregate and substances contaminated with radioactive rays, and are suitable for providing a container such that manufacturing does not require troublesome steps and suppressing defects generated on an end portion of a cylinder and a surface of the container.

The invention claimed is:

1. A radioactive substance container comprising:
   a forged bottomed container being made of a forgeable material, the bottomed container having a bottom section and a body section being configured integrally such that the bottom section and the body section have continuous metal flow for shielding rays generated from a radioactive substance;
   a neutron shielding material including resin and silicon rubber provided on an outer side of the bottomed container for shielding neutron generated from the radioactive substance;
   an outer drum configured as an outer surface of the radioactive substance container; and
   a cover for covering an opening of the bottomed container.

2. The radioactive substance container according to claim 1, wherein a spot facing section is further forged integrally with the bottom section at the time of forging the bottomed container.

3. The radioactive substance container according to claim 1, wherein a flange is further forged integrally with the body section of the bottomed container.

4. The radioactive substance container according to claim 1, wherein at least any one of an external section and an internal section of the bottomed container vertical to the axial direction is polygonal.

5. A radioactive substance container comprising:
   a forged bottomed container being made of a forgeable metal containing a radioactive substance into a body section with a bottom section and for shielding rays generated from the radioactive substance, the bottom section and the body section being configured integrally such that the bottom section and the body section have continuous metal flow; and
   a neutron shielding material including resin and silicon rubber arranged around an outer side of the bottomed container for shielding neutron generated from the radioactive substance,
   wherein the bottom section and the body section are forged from a metal billet of the forgeable metal.

6. The radioactive substance container according to claim 5, wherein a spot facing section is further formed integrally with the bottom section at the time of forming the bottomed container.

7. The radioactive substance container according to claim 5, wherein a flange is further provided integrally with the body section of the bottomed container.

8. The radioactive substance container according to claim 5, wherein at least any one of an external section and an internal section of the bottomed container vertical to the axial direction is polygonal.

9. The radioactive substance container according to claim 1, wherein the container is made of steel.

10. The radioactive substance container according to claim 5, wherein the container is made of steel.

* * * * *

UNITED STATES PATENT AND TRADEMARK OFFICE
CERTIFICATE OF CORRECTION

| | | |
|---|---|---|
| PATENT NO. | : 7,176,472 B2 | Page 1 of 1 |
| APPLICATION NO. | : 11/010351 | |
| DATED | : February 13, 2007 | |
| INVENTOR(S) | : Funakoshi et al. | |

It is certified that error appears in the above-identified patent and that said Letters Patent is hereby corrected as shown below:

On the title page, Item (30), the Foreign Application Priority Data information is incorrect. Item (30) should read:

-- (30)     Foreign Application Priority Data

Apr. 25, 2000 (JP) ...................... 2000-124778
         Jun. 5, 2000 (JP) ........................ 2000-205872 --

Signed and Sealed this

Tenth Day of April, 2007

JON W. DUDAS
*Director of the United States Patent and Trademark Office*